(12) United States Patent
Tanaka et al.

(10) Patent No.: US 12,710,664 B2
(45) Date of Patent: Aug. 18, 2026

(54) LENS DEVICE, IMAGING APPARATUS, OPERATION METHOD OF LENS DEVICE, OPERATION METHOD OF IMAGING APPARATUS, AND PROGRAM

(71) Applicant: FUJIFILM Corporation, Tokyo (JP)

(72) Inventors: Koichi Tanaka, Saitama (JP); Shinichi Shimotsu, Saitama (JP); Taro Asami, Saitama (JP); Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/337,029

(22) Filed: Jun. 18, 2023

(65) Prior Publication Data

US 2023/0333400 A1 Oct. 19, 2023

Related U.S. Application Data

(63) Continuation of application No. PCT/JP2021/047182, filed on Dec. 21, 2021.

(30) Foreign Application Priority Data

Dec. 25, 2020 (JP) ................................ 2020-217841

(51) Int. Cl.
*G02B 27/64* (2006.01)
*H04N 23/54* (2023.01)
(Continued)

(52) U.S. Cl.
CPC ........... *G02B 27/646* (2013.01); *H04N 23/54* (2023.01); *H04N 23/55* (2023.01); *H04N 23/683* (2023.01); *H04N 23/687* (2023.01)

(58) Field of Classification Search
USPC ........................................................... 396/55
See application file for complete search history.

(56) References Cited

U.S. PATENT DOCUMENTS 10,277,819 B2 4/2019 Murakami et al.
10,965,871 B2 * 3/2021 Song ..................... H04N 23/63
(Continued)

FOREIGN PATENT DOCUMENTS

JP H10260444 9/1998
JP 2008145662 6/2008
(Continued)

OTHER PUBLICATIONS

International Search Report (Form PCT/ISA/210) of PCT/JP2021/047182, mailed on Mar. 22, 2022, with English translation thereof, pp. 1-5.

(Continued)

*Primary Examiner* — Walter L Lindsay, Jr.
*Assistant Examiner* — Warren K Fenwick
(74) *Attorney, Agent, or Firm* — JCIPRNET

(57) ABSTRACT

A processor of a lens device is configured to acquire inclination information related to at least one of an inclination of a first drive axis of a drive mechanism with respect to a first axis of an image sensor or an inclination of a second drive axis of the drive mechanism with respect to a second axis of the image sensor, and perform, with respect to the drive mechanism, control of moving a movement lens along at least one of the first axis or the second axis based on the inclination information.

23 Claims, 27 Drawing Sheets

(51) Int. Cl.
*H04N 23/55* (2023.01)
*H04N 23/68* (2023.01)

(56) References Cited

U.S. PATENT DOCUMENTS

| | | | | |
|---|---|---|---|---|
| 2009/0040321 | A1 | 2/2009 | Nakamura | |
| 2012/0038784 | A1 | 2/2012 | Irisawa et al. | |
| 2016/0373643 | A1 | 12/2016 | Abe | |
| 2017/0142338 | A1 | 5/2017 | Tanaka et al. | |
| 2019/0377166 | A1* | 12/2019 | Komatsu | G02B 15/173 |
| 2020/0404182 | A1 | 12/2020 | Song et al. | |
| 2023/0333399 | A1* | 10/2023 | Shimotsu | G02B 27/646 |
| 2023/0333401 | A1* | 10/2023 | Aoi | G03B 19/06 |
| 2024/0323542 | A1* | 9/2024 | Yanagisawa | H04N 23/698 |

FOREIGN PATENT DOCUMENTS

| | | |
|---|---|---|
| JP | 2010011302 | 1/2010 |
| JP | 2010231168 | 10/2010 |
| JP | 2014053720 | 3/2014 |
| JP | 2016035543 | 3/2016 |
| JP | 2017009640 | 1/2017 |
| JP | 2018105938 | 7/2018 |
| JP | 2018106038 | 7/2018 |
| JP | 2018200457 | 12/2018 |
| JP | 2019028340 | 2/2019 |
| JP | 2019153880 | 9/2019 |
| WO | WO-2020022026 A1 * | 1/2020 |

OTHER PUBLICATIONS

"Written Opinion of the International Searching Authority (Form PCT/ISA/237) of PCT/JP2021/047182", mailed on Mar. 22, 2022, with English translation thereof, pp. 1-6.

"Office Action of China Counterpart Application", issued on Sep. 25, 2025, with English translation thereof, p. 1-p. 19.

"Notice of reasons for refusal of Japan Counterpart Application", issued on Feb. 3, 2026, with English translation thereof, pp. 1-3.

"The Second Office Action of China Counterpart Application", issued on Feb. 2, 2026, with English translation thereof, pp. 1-17.

"Decision of Refusal of China Counterpart Application", issued on Apr. 30, 2026, with English translation thereof, pp. 1-21.

"Notice of reasons fo refusal of Japan Counterpart Application", issued on May 26, 2026, with English translation thereof, pp. 1-3.

* cited by examiner

FIG. 1

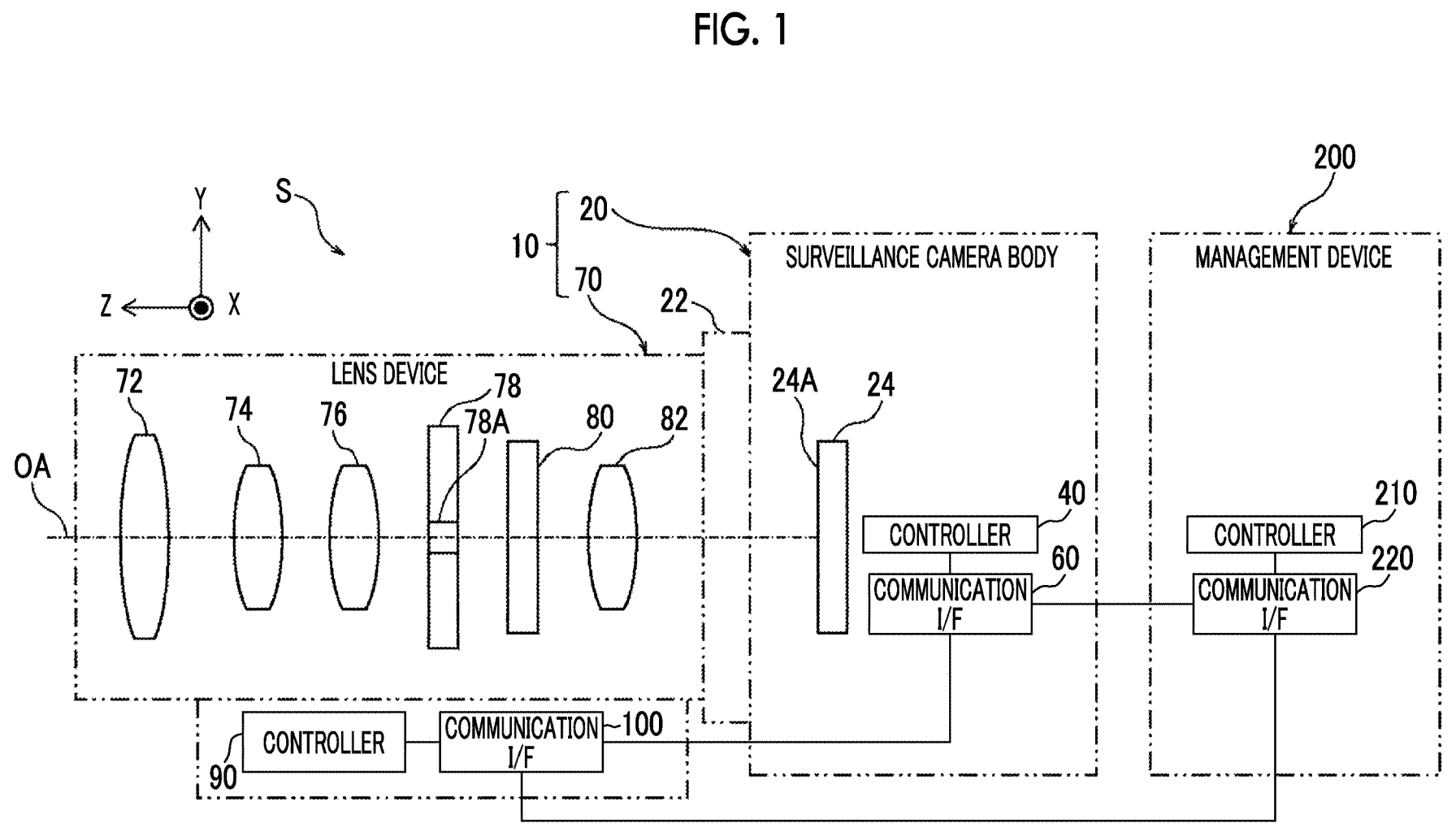

MANAGEMENT DEVICE
200
210
220
CONTROLLER
COMMUNICATION I/F
SURVEILLANCE CAMERA BODY
40
60
CONTROLLER
COMMUNICATION I/F
24
24A
20
22
10
70
LENS DEVICE
82
80
78
78A
76
74
72
100
COMMUNICATION I/F
CONTROLLER
90
S
X
Y
Z
OA

| OPTICAL FILTER NAME | RANGE |
|---|---|
| Ir CUT FILTER | – |
| FIRST BPF | 1000 nm |
| SECOND BPF | 1250 nm |
| THIRD BPF | 1550 nm |
| FOURTH BPF | 2150 nm |

NEAR-INFRARED LIGHT IMAGE
64
VISIBLE LIGHT IMAGE
62
GENERATION AND OUTPUT
24
26
28
R
G
Ir
B
32G
32R
32B
30
32

20
SURVEILLANCE CAMERA BODY
Y
Z
X
24
24A
NEAR-INFRARED LIGHT IMAGE
VISIBLE LIGHT IMAGE
TIMING CONTROL SIGNAL
52
54
56
50
60
IMAGE SENSOR DRIVER
SIGNAL PROCESSING DEVICE
SHAKE AMOUNT DETECTION SENSOR
UI SYSTEM DEVICE
COMMUNICATION I/F
48
CPU
NVM
RAM
40
CONTROLLER
42
44
46

FIG. 5

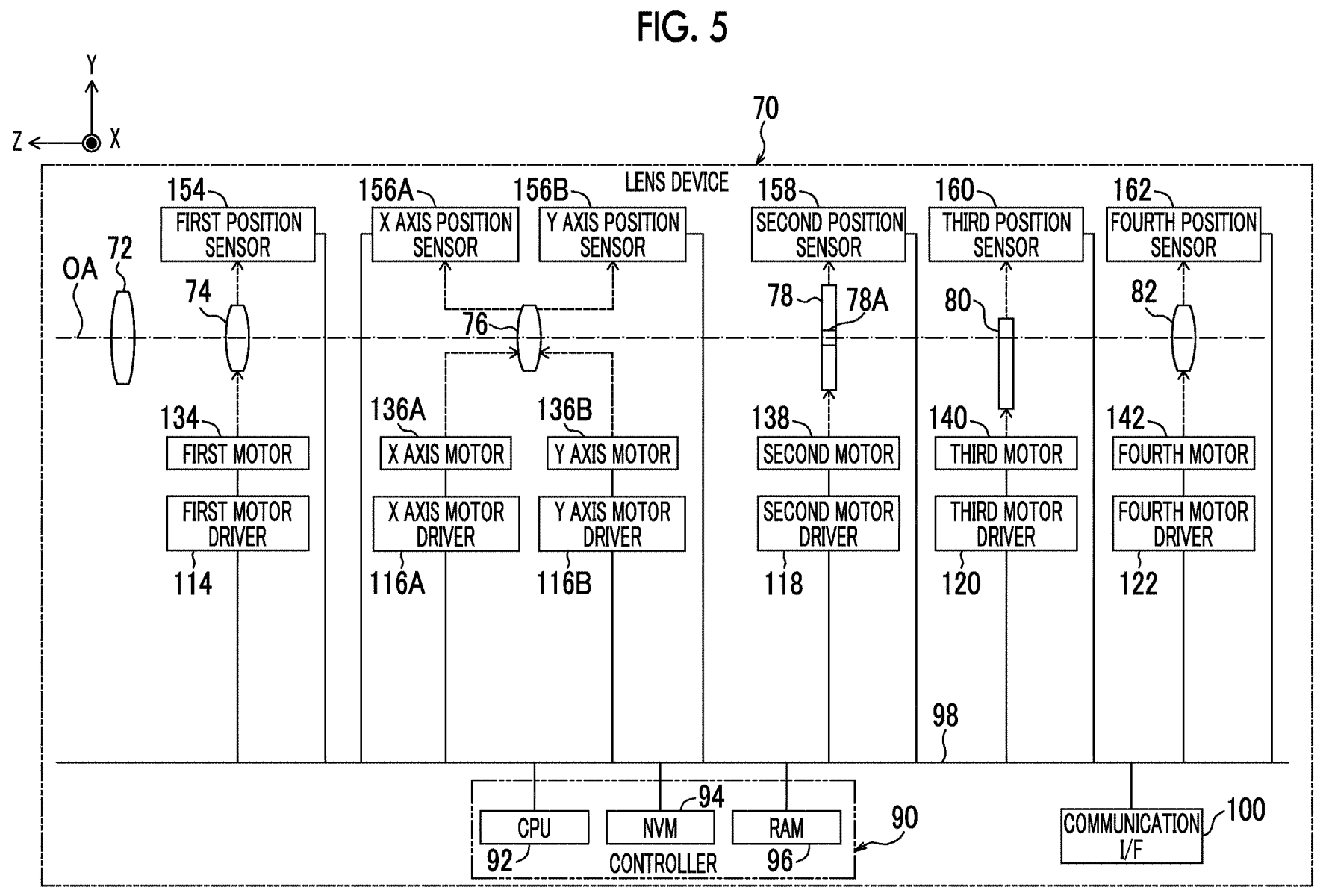

70
LENS DEVICE
FIRST POSITION SENSOR
154
74
FIRST MOTOR
134
FIRST MOTOR DRIVER
114
X AXIS POSITION SENSOR
156A
X AXIS MOTOR
136A
X AXIS MOTOR DRIVER
116A
76
Y AXIS POSITION SENSOR
156B
Y AXIS MOTOR
136B
Y AXIS MOTOR DRIVER
116B
SECOND POSITION SENSOR
158
78A
78
SECOND MOTOR
138
SECOND MOTOR DRIVER
118
THIRD POSITION SENSOR
160
80
THIRD MOTOR
140
THIRD MOTOR DRIVER
120
FOURTH POSITION SENSOR
162
82
FOURTH MOTOR
142
FOURTH MOTOR DRIVER
122
98
COMMUNICATION I/F
100
CONTROLLER
90
CPU
92
NVM
94
RAM
96
72
OA
X
Y
Z 10
20
70
X
Y
Z
X1
X2
θx
Y1
Y2
θy
OA
24
76

200
MANAGEMENT DEVICE
NVM
214
INCLINATION INFORMATION OUTPUT PROCESSING PROGRAM
230
RAM
216
CPU
INCLINATION INFORMATION OUTPUT PROCESSING
212
CPU
INCLINATION INFORMATION GENERATION UNIT
232
INCLINATION INFORMATION OUTPUT UNIT
234
212

S
200
MANAGEMENT DEVICE
232
212
CPU
INCLINATION INFORMATION GENERATION UNIT
220
COMMUNICATION I/F
70
LENS DEVICE
OA
76
136A
X AXIS MOTOR
X AXIS MOTOR DRIVER
116A
136B
Y AXIS MOTOR
Y AXIS MOTOR DRIVER
116B
CPU
92
COMMUNICATION I/F
100
20
SURVEILLANCE CAMERA BODY
24A
24
52
IMAGE SENSOR DRIVER
SIGNAL PROCESSING DEVICE
54
CPU
42
COMMUNICATION I/F
60
FIRST CONTROL COMMAND
FIRST IMAGING COMMAND
θy
Y2
Y1
X2
θx
X1
76A
76
Y1
25A
(0, 0)
X1
262

S
200
MANAGEMENT DEVICE
232
212
CPU
INCLINATION INFORMATION GENERATION UNIT
220
COMMUNICATION I/F
SECOND CONTROL COMMAND
70
LENS DEVICE
OA
76
136A
X AXIS MOTOR
X AXIS MOTOR DRIVER
116A
136B
Y AXIS MOTOR
Y AXIS MOTOR DRIVER
116B
CPU
92
COMMUNICATION I/F
100
SECOND IMAGING COMMAND
20
SURVEILLANCE CAMERA BODY
24A
24
52
IMAGE SENSOR DRIVER
SIGNAL PROCESSING DEVICE
54
CPU
42
COMMUNICATION I/F
60
θy
Y2
Y1
76A
X2
θx
X1
76
Y1
(a1, b1)
25A
X1
(0, 0)
264

262
264
θy
θx
Y1
Y2
X1
X2
(0, 0)
25A
(a1, b1)
COMPARISON
200
MANAGEMENT DEVICE
212
CPU
232
INCLINATION INFORMATION GENERATION UNIT

S
200
MANAGEMENT DEVICE
232
212
CPU
INCLINATION INFORMATION GENERATION UNIT
220
COMMUNICATION I/F
THIRD CONTROL COMMAND
70
LENS DEVICE
Y
Z
X
OA
76
136A
X AXIS MOTOR
X AXIS MOTOR DRIVER
116A
136B
Y AXIS MOTOR
Y AXIS MOTOR DRIVER
116B
CPU
92
COMMUNICATION I/F
100
THIRD IMAGING COMMAND
20
SURVEILLANCE CAMERA BODY
24A
24
52
IMAGE SENSOR DRIVER
SIGNAL PROCESSING DEVICE
54
CPU
42
COMMUNICATION I/F
60
θy
Y2
Y1
76A
X2
θx
X1
76
Y1
(a2, b2)
25A
(a1, b1)
X1
266

FIG. 14

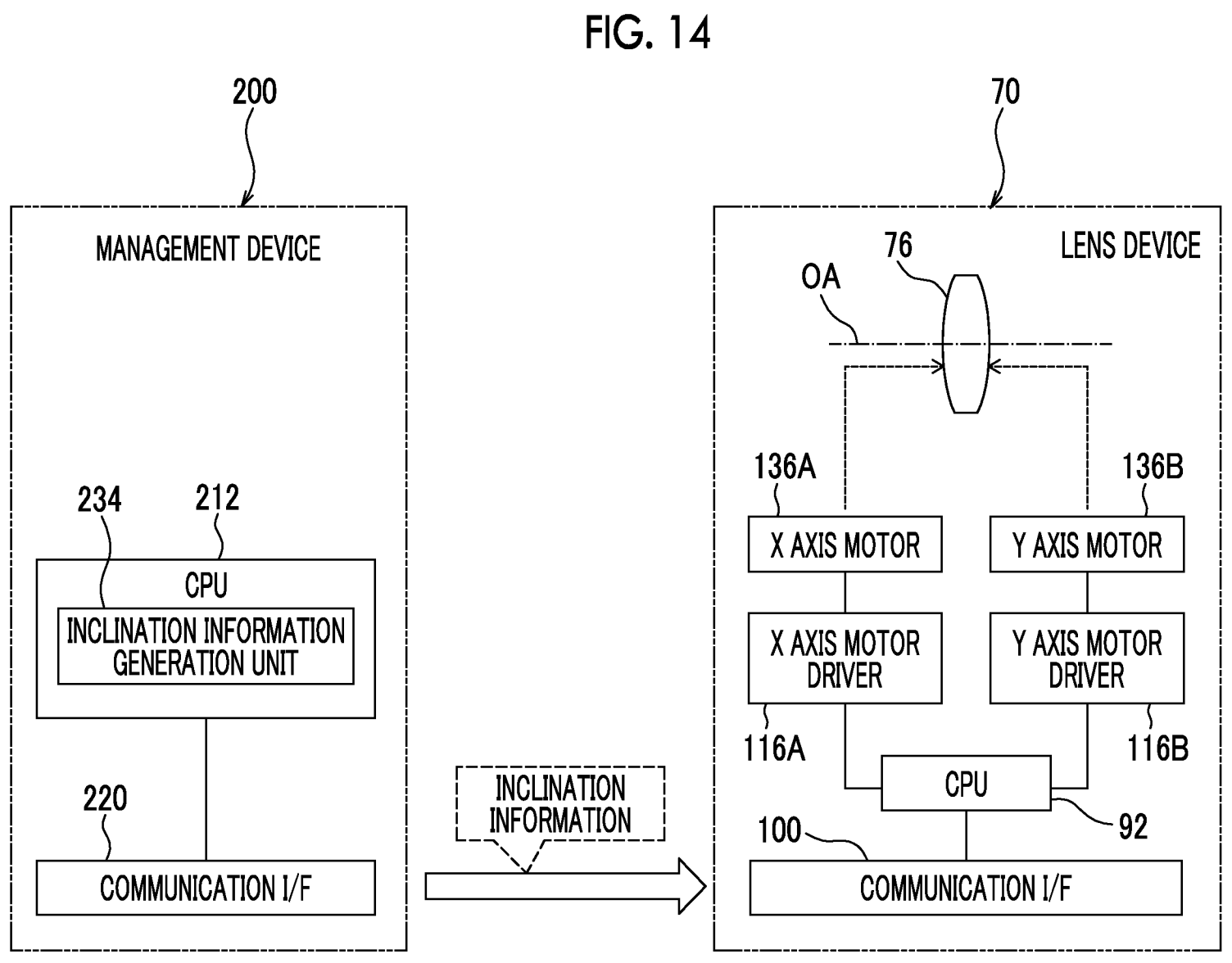

70
LENS DEVICE
OA
76
136A
X AXIS MOTOR
136B
Y AXIS MOTOR
116A
X AXIS MOTOR DRIVER
116B
Y AXIS MOTOR DRIVER
92
CPU
100
COMMUNICATION I/F

INCLINATION INFORMATION

200
MANAGEMENT DEVICE
212
CPU
234
INCLINATION INFORMATION GENERATION UNIT
220
COMMUNICATION I/F

70
LENS DEVICE
94
NVM
110
SHAKE CORRECTION
· SHIFT PROCESSING PROGRAM
96
RAM
92
CPU
SHAKE CORRECTION
· SHIFT PROCESSING
92
CPU
172
ACQUISITION UNIT
174
CALCULATION UNIT
176
CONTROL UNIT

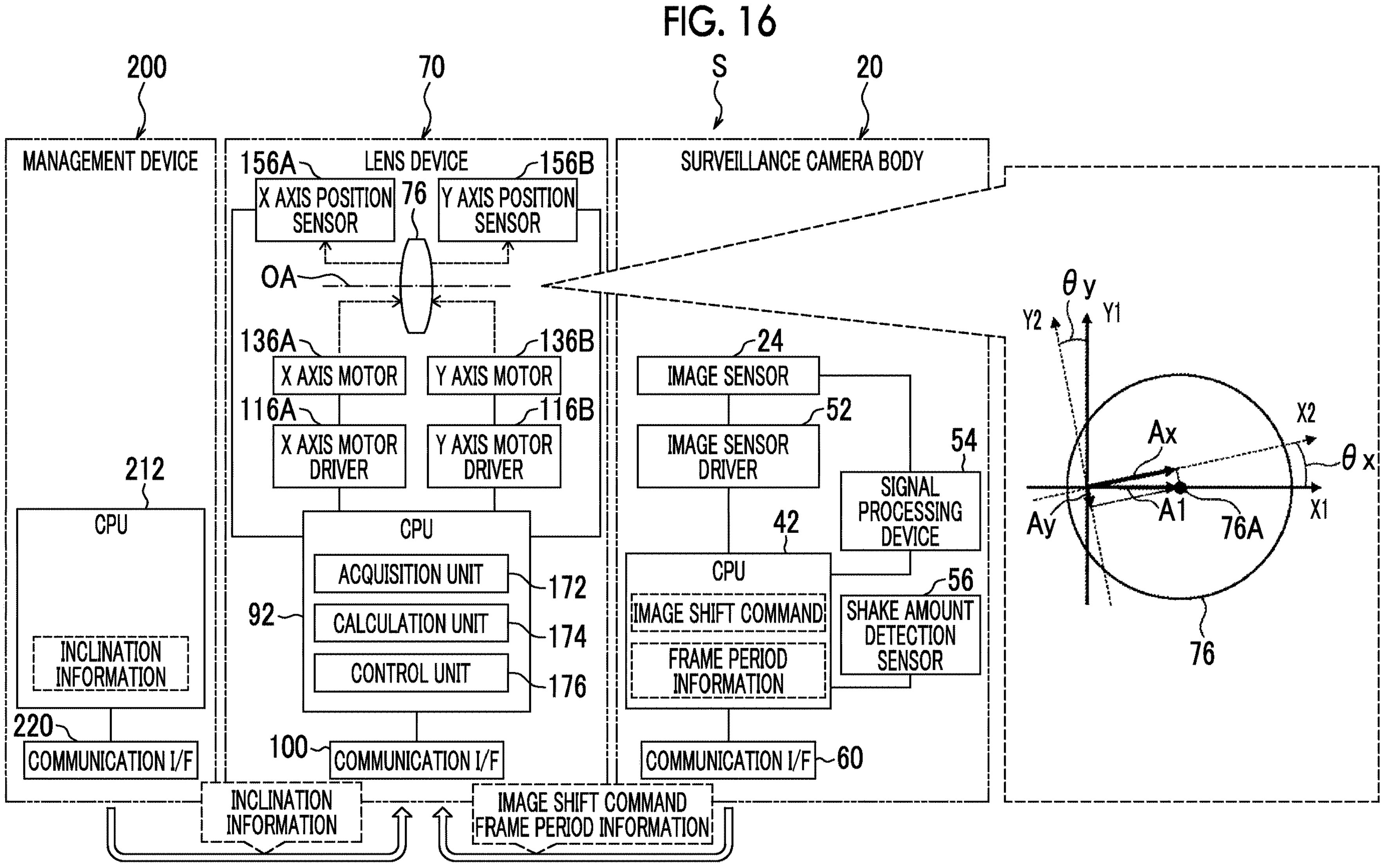
FIG. 16
200
70
S
20
MANAGEMENT DEVICE
LENS DEVICE
SURVEILLANCE CAMERA BODY
156A
X AXIS POSITION SENSOR
76
156B
Y AXIS POSITION SENSOR
OA
136A
X AXIS MOTOR
136B
Y AXIS MOTOR
116A
X AXIS MOTOR DRIVER
116B
Y AXIS MOTOR DRIVER
CPU
ACQUISITION UNIT
172
CALCULATION UNIT
174
CONTROL UNIT
176
92
100
COMMUNICATION I/F
212
CPU
INCLINATION INFORMATION
220
COMMUNICATION I/F
24
IMAGE SENSOR
52
IMAGE SENSOR DRIVER
54
SIGNAL PROCESSING DEVICE
42
CPU
IMAGE SHIFT COMMAND
FRAME PERIOD INFORMATION
56
SHAKE AMOUNT DETECTION SENSOR
COMMUNICATION I/F
60
INCLINATION INFORMATION
IMAGE SHIFT COMMAND
FRAME PERIOD INFORMATION
θy
Y2
Y1
Ax
X2
θx
Ay
A1
76A
X1
76

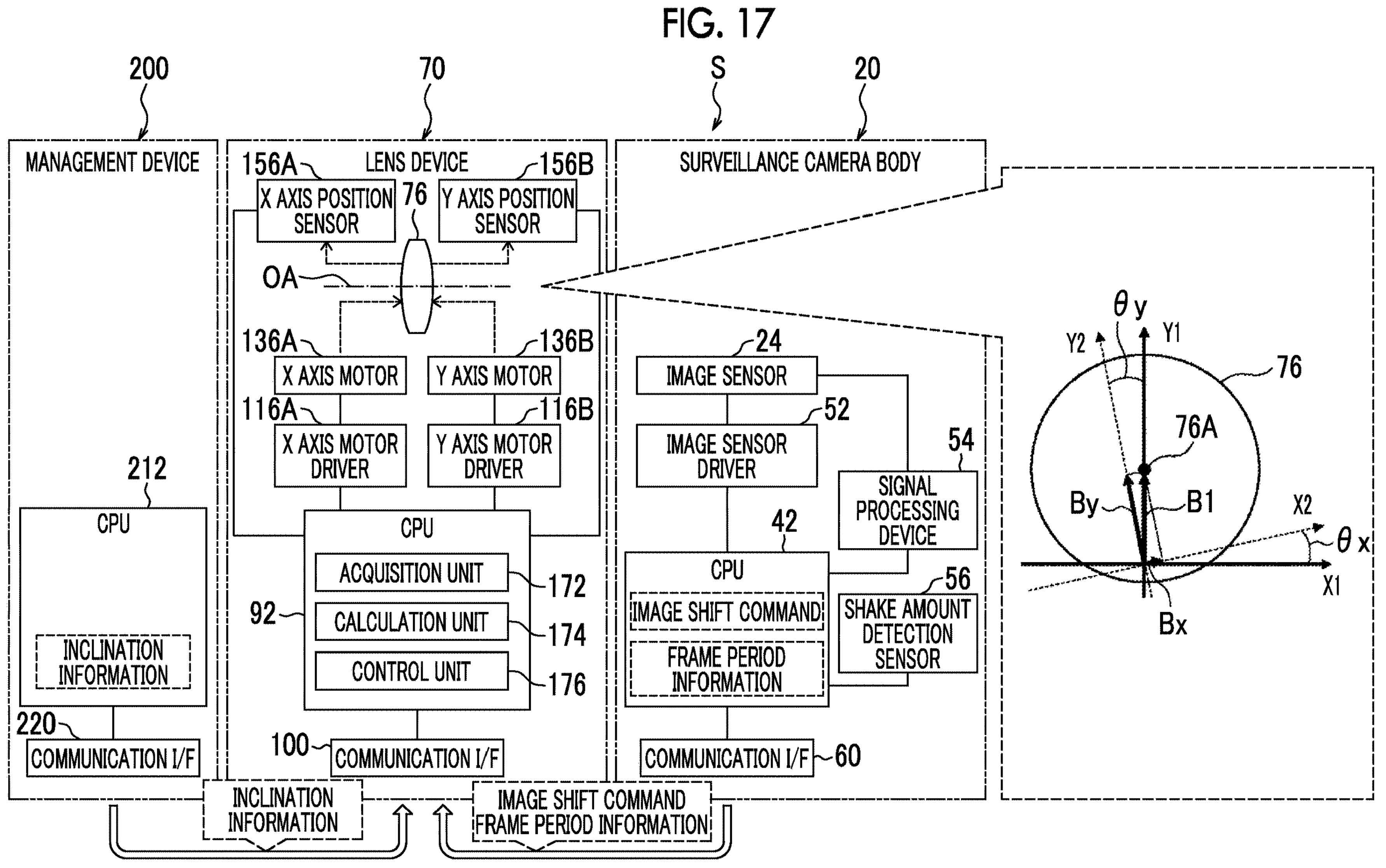
FIG. 17
200
70
S
20
MANAGEMENT DEVICE
LENS DEVICE
SURVEILLANCE CAMERA BODY
156A
X AXIS POSITION SENSOR
76
156B
Y AXIS POSITION SENSOR
OA
136A
X AXIS MOTOR
136B
Y AXIS MOTOR
116A
X AXIS MOTOR DRIVER
116B
Y AXIS MOTOR DRIVER
CPU
ACQUISITION UNIT
172
CALCULATION UNIT
174
CONTROL UNIT
176
92
100
COMMUNICATION I/F
212
CPU
INCLINATION INFORMATION
220
COMMUNICATION I/F
24
IMAGE SENSOR
52
IMAGE SENSOR DRIVER
54
SIGNAL PROCESSING DEVICE
42
CPU
IMAGE SHIFT COMMAND
FRAME PERIOD INFORMATION
56
SHAKE AMOUNT DETECTION SENSOR
COMMUNICATION I/F
60
INCLINATION INFORMATION
IMAGE SHIFT COMMAND
FRAME PERIOD INFORMATION
θy
Y2
Y1
76
76A
By
B1
X2
θx
X1
Bx

FIG. 18

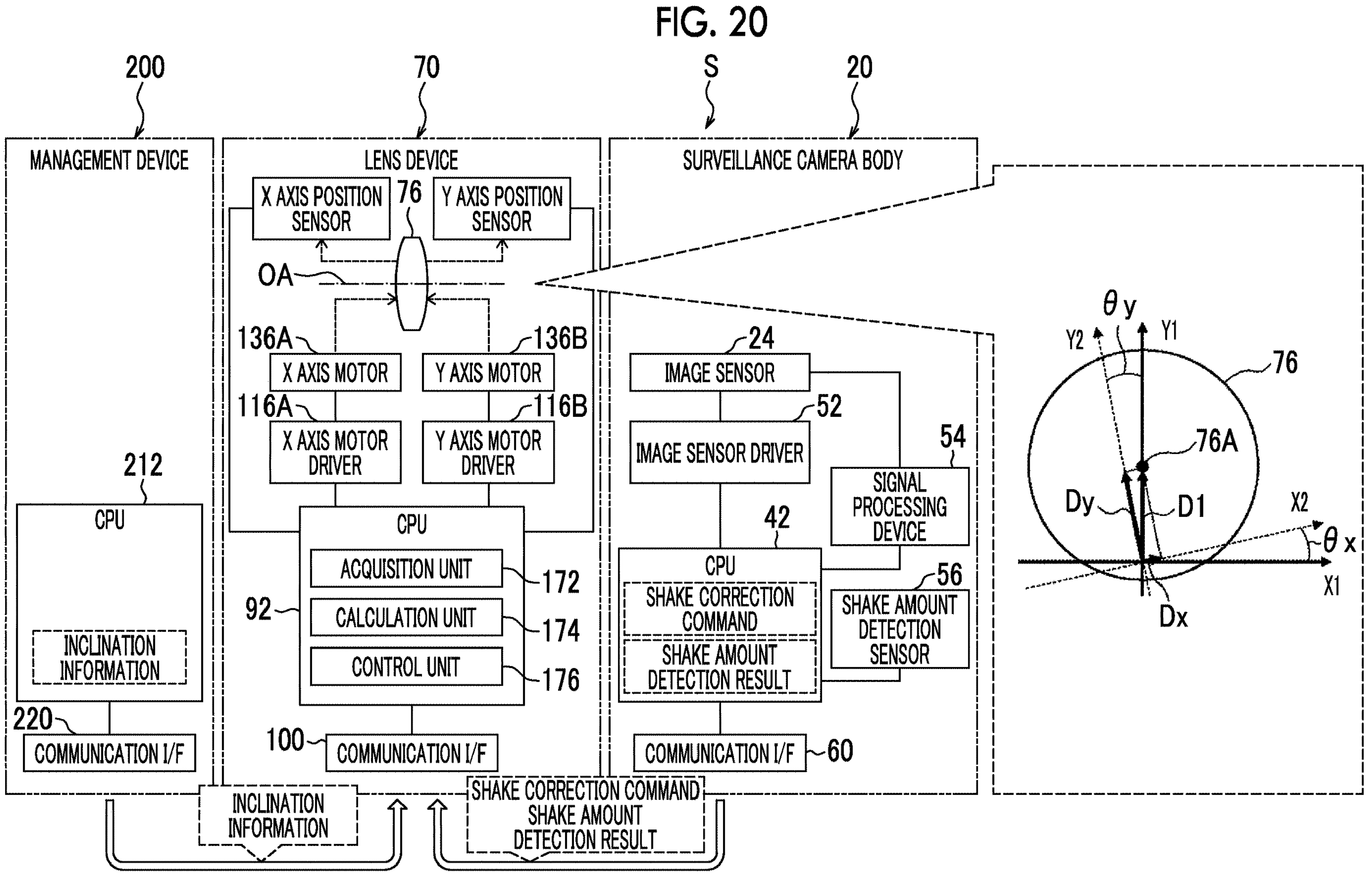
FIG. 20
200
70
S
20
MANAGEMENT DEVICE
LENS DEVICE
SURVEILLANCE CAMERA BODY
X AXIS POSITION SENSOR
76
Y AXIS POSITION SENSOR
OA
136A
X AXIS MOTOR
136B
Y AXIS MOTOR
116A
X AXIS MOTOR DRIVER
116B
Y AXIS MOTOR DRIVER
CPU
ACQUISITION UNIT
172
CALCULATION UNIT
174
CONTROL UNIT
176
92
100
COMMUNICATION I/F
212
CPU
INCLINATION INFORMATION
220
COMMUNICATION I/F
24
IMAGE SENSOR
52
IMAGE SENSOR DRIVER
54
SIGNAL PROCESSING DEVICE
42
CPU
SHAKE CORRECTION COMMAND
SHAKE AMOUNT DETECTION RESULT
56
SHAKE AMOUNT DETECTION SENSOR
COMMUNICATION I/F
60
INCLINATION INFORMATION
SHAKE CORRECTION COMMAND
SHAKE AMOUNT DETECTION RESULT
θy
Y2
Y1
76
76A
Dy
D1
X2
θx
X1
Dx

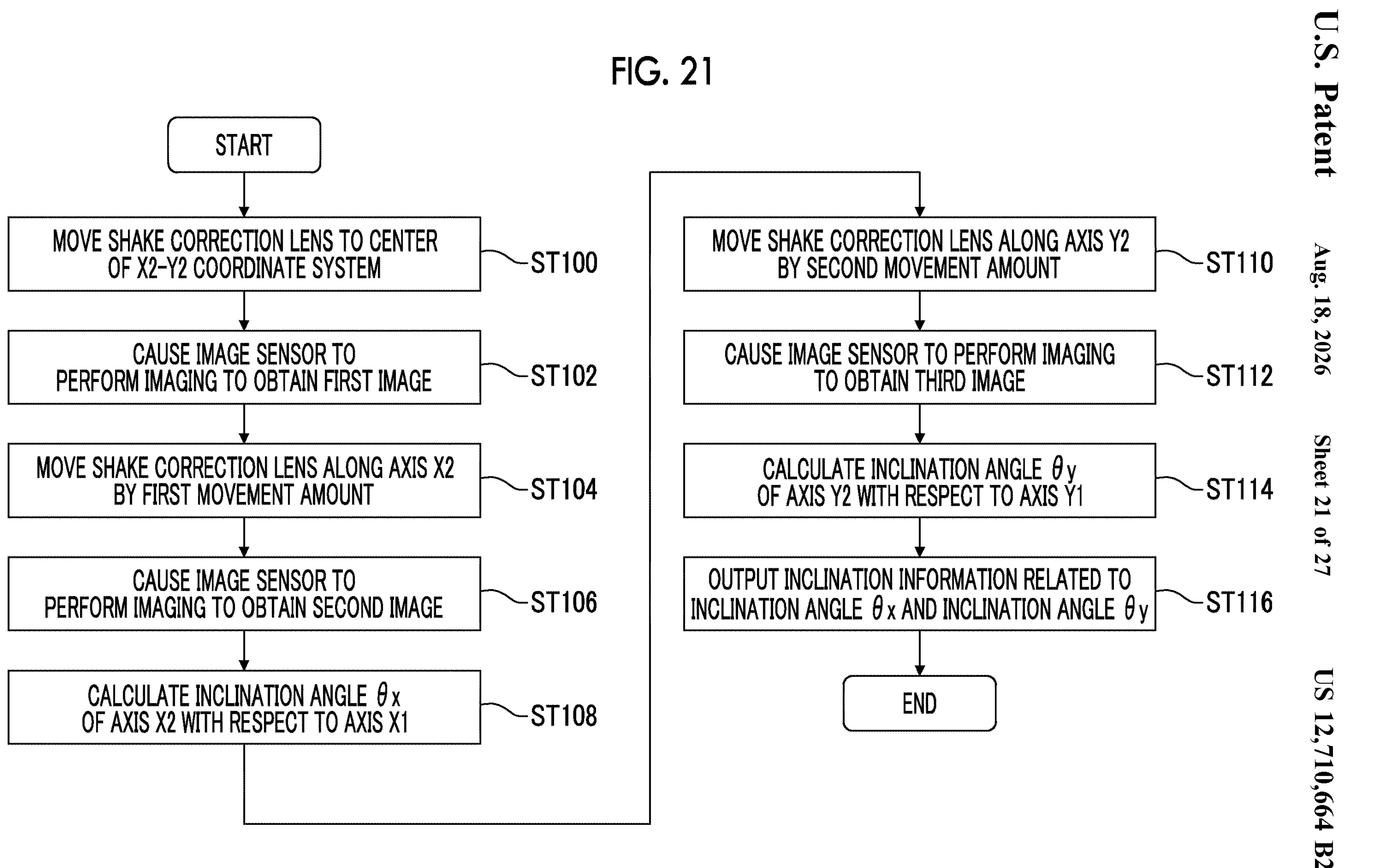
FIG. 21
START
MOVE SHAKE CORRECTION LENS TO CENTER OF X2-Y2 COORDINATE SYSTEM
ST100
CAUSE IMAGE SENSOR TO PERFORM IMAGING TO OBTAIN FIRST IMAGE
ST102
MOVE SHAKE CORRECTION LENS ALONG AXIS X2 BY FIRST MOVEMENT AMOUNT
ST104
CAUSE IMAGE SENSOR TO PERFORM IMAGING TO OBTAIN SECOND IMAGE
ST106
CALCULATE INCLINATION ANGLE θx OF AXIS X2 WITH RESPECT TO AXIS X1
ST108
MOVE SHAKE CORRECTION LENS ALONG AXIS Y2 BY SECOND MOVEMENT AMOUNT
ST110
CAUSE IMAGE SENSOR TO PERFORM IMAGING TO OBTAIN THIRD IMAGE
ST112
CALCULATE INCLINATION ANGLE θy OF AXIS Y2 WITH RESPECT TO AXIS Y1
ST114
OUTPUT INCLINATION INFORMATION RELATED TO INCLINATION ANGLE θx AND INCLINATION ANGLE θy
ST116
END

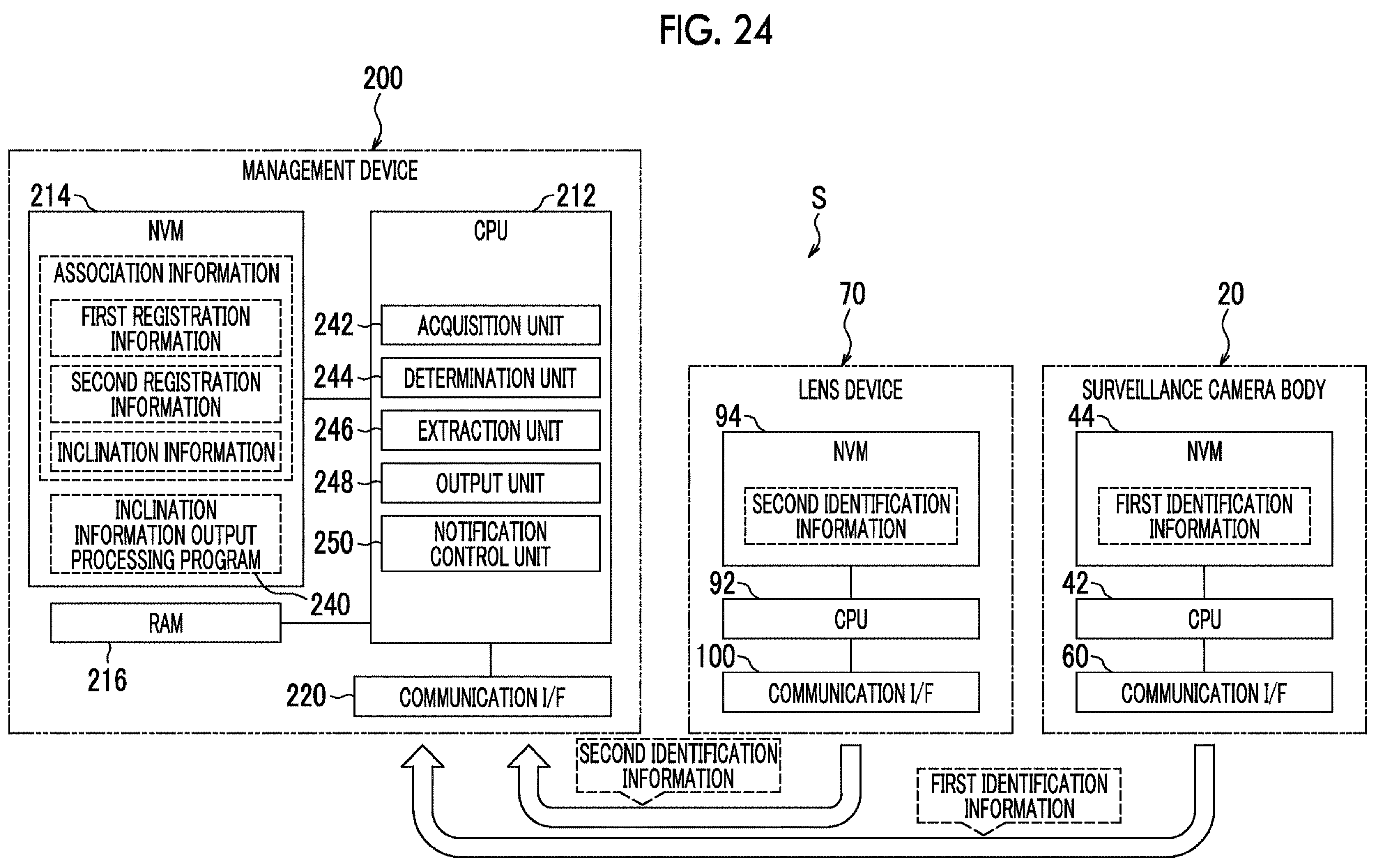
FIG. 24
200
MANAGEMENT DEVICE
214
NVM
ASSOCIATION INFORMATION
FIRST REGISTRATION INFORMATION
SECOND REGISTRATION INFORMATION
INCLINATION INFORMATION
INCLINATION INFORMATION OUTPUT PROCESSING PROGRAM
240
RAM
216
212
CPU
242
ACQUISITION UNIT
244
DETERMINATION UNIT
246
EXTRACTION UNIT
248
OUTPUT UNIT
250
NOTIFICATION CONTROL UNIT
220
COMMUNICATION I/F
S
70
LENS DEVICE
94
NVM
SECOND IDENTIFICATION INFORMATION
92
CPU
100
COMMUNICATION I/F
20
SURVEILLANCE CAMERA BODY
44
NVM
FIRST IDENTIFICATION INFORMATION
42
CPU
60
COMMUNICATION I/F
SECOND IDENTIFICATION INFORMATION
FIRST IDENTIFICATION INFORMATION

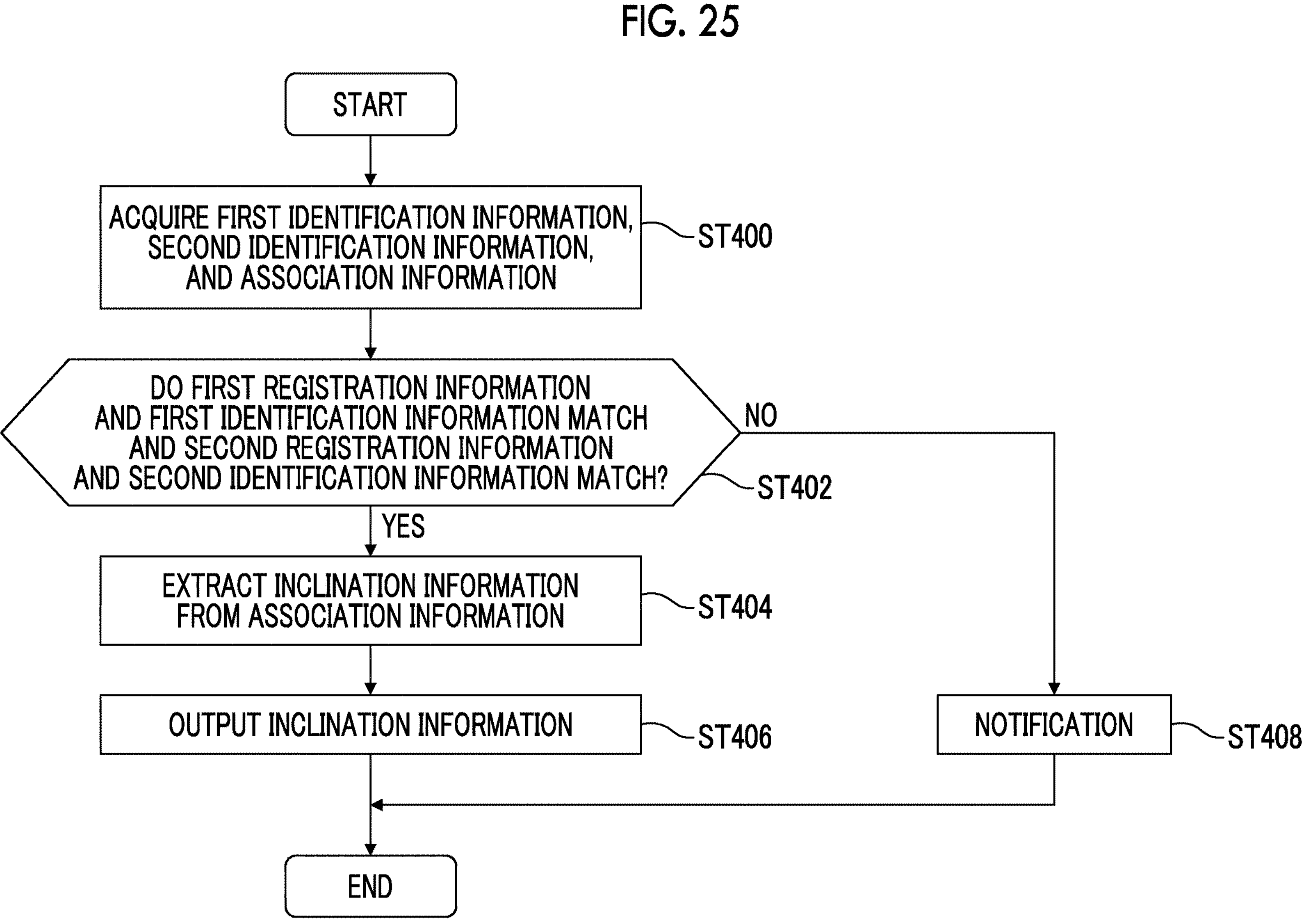
FIG. 25
START
ACQUIRE FIRST IDENTIFICATION INFORMATION, SECOND IDENTIFICATION INFORMATION, AND ASSOCIATION INFORMATION
ST400
DO FIRST REGISTRATION INFORMATION AND FIRST IDENTIFICATION INFORMATION MATCH AND SECOND REGISTRATION INFORMATION AND SECOND IDENTIFICATION INFORMATION MATCH?
ST402
NO
YES
EXTRACT INCLINATION INFORMATION FROM ASSOCIATION INFORMATION
ST404
OUTPUT INCLINATION INFORMATION
ST406
NOTIFICATION
ST408
END

S2
S1
24(24A)
OA
F2
F1
E
76
76

LENS DEVICE, IMAGING APPARATUS, OPERATION METHOD OF LENS DEVICE, OPERATION METHOD OF IMAGING APPARATUS, AND PROGRAM

CROSS-REFERENCE TO RELATED APPLICATIONS

This application is a continuation application of International Application No. PCT/JP2021/047182, filed Dec. 21, 2021, the disclosure of which is incorporated herein by reference in its entirety. Further, this application claims priority under 35 USC 119 from Japanese Patent Application No. 2020-217841 filed Dec. 25, 2020, the disclosure of which is incorporated by reference herein.

BACKGROUND OF THE INVENTION

1. Field of the Invention

The technology of the present disclosure relates to a lens device, an imaging apparatus, an operation method for a lens device, an operation method for an imaging apparatus, and a program.

2. Description of the Related Art

JP2017-9640A discloses an imaging apparatus to and from which a lens device can be attached and detached, the imaging apparatus including an imaging unit that includes a plurality of photoelectric conversion units that receive a luminous flux passing through and being incident on each of different pupil regions in an imaging optical system of the lens device and output a plurality of signals, a calculation unit that acquires the signals output from the plurality of photoelectric conversion units and calculates a defocus amount, and a correction unit that corrects the defocus amount calculated by the calculation unit. The correction unit corrects an imaging plane by correcting the defocus amount using correction information related to an optical characteristic of the lens device and correction information related to an inclination of the imaging plane of the imaging unit.

JP2019-153880A discloses an imaging apparatus comprising a lens barrel including a lens, an imaging element for receiving light transmitted through the lens to generate an imaging signal, a driving unit that inclines any of the imaging element or the lens with respect to a plane orthogonal to an optical axis of the lens, a stop unit that adjusts an amount of light passing through the lens barrel, and a control unit that controls, in a case in which a stop value of the stop unit or the brightness of an image captured by the imaging element is changed, the driving unit to incline at least one of the lens or the imaging element based on the stop value after change or the brightness after change.

JP2010-231168A discloses an image shake correction device comprising an imaging optical system, and an imaging element that transforms a subject image guided from the imaging optical system into an electrical signal, in which an image shake is corrected by moving the imaging element. The image shake correction device comprises a fixing unit, an imaging element holding unit that holds the imaging element and is moved with the imaging element in a predetermined plane substantially orthogonal to an optical axis of the imaging optical system, a position regulation unit that regulates a position of the imaging element holding unit in an optical axis direction of the imaging optical system, a guide unit that guides the imaging element holding unit to be movable in the predetermined plane substantially orthogonal to the optical axis of the imaging optical system, and a driving unit that applies a biasing force to the imaging element holding unit.

SUMMARY OF THE INVENTION

One embodiment according to the technology of the present disclosure provides a lens device, an imaging apparatus, an operation method for a lens device, an operation method for an imaging apparatus, and a program capable of moving an image along at least one of a first axis or a second axis even in a case in which there is at least one of an inclination of a first drive axis of a drive mechanism with respect to the first axis of the image sensor or an inclination of a second drive axis of the drive mechanism with respect to the second axis of the image sensor, for example.

A first aspect according to the technology of the present disclosure relates to a lens device mounted on an imaging apparatus body including an image sensor, the lens device comprising a processor, a memory coupled to or integrated with the processor, a lens that includes a movement lens and images incident light on the image sensor, and a drive mechanism that moves the movement lens by applying power to the movement lens along each of a first drive axis intersecting an optical axis of the lens and a second drive axis intersecting each of the optical axis of the lens and the first drive axis, in which the processor is configured to acquire inclination information related to at least one of an inclination of the first drive axis with respect to a first axis of the image sensor viewed along the optical axis or an inclination of the second drive axis with respect to a second axis of the image sensor viewed along the optical axis, and perform, with respect to the drive mechanism, control of moving the movement lens along at least one of the first axis or the second axis based on the inclination information.

A second aspect according to the technology of the present disclosure relates to the lens device according to the first aspect, in which the processor is configured to perform, with respect to the drive mechanism, control of moving the movement lens in a direction in which an image obtained by imaging the light on the image sensor is shifted.

A third aspect according to the technology of the present disclosure relates to the lens device according to the first or second aspect, in which the processor is configured to perform, with respect to the drive mechanism, control of moving the movement lens in a direction in which a shake of an image obtained by imaging the light on the image sensor is corrected.

A fourth aspect according to the technology of the present disclosure relates to the lens device according to any one of the first to third aspects, further comprising a communication interface that communicates with at least one of an external control device provided in an outside of an imaging apparatus including the imaging apparatus body and the lens device or the imaging apparatus body, in which the processor is configured to acquire the inclination information that is transmitted from at least one of the external control device or the imaging apparatus body, and is received by the communication interface.

A fifth aspect according to the technology of the present disclosure relates to the lens device according to any one of the first to fourth aspects, further comprising a non-volatile memory, in which the processor is configured to cause the acquired inclination information in the non-volatile memory, and perform, with respect to the drive mechanism, control of moving the movement lens based on the inclination information stored in the non-volatile memory.

A sixth aspect according to the technology of the present disclosure relates to the lens device according to any one of the first to fifth aspects, in which the inclination information is information calculated based on a control command for moving the movement lens along at least one of the first drive axis or the second drive axis and a plurality of images obtained by being captured by the image sensor before and after the movement lens is moved based on the control command.

A seventh aspect according to the technology of the present disclosure relates to the lens device according to any one of the first to sixth aspects, in which the inclination information is information calculated based on a plurality of images obtained by performing imaging by the image sensor under an imaging condition in which an image having less noise than an image obtained by normal imaging is obtained.

An eighth aspect according to the technology of the present disclosure relates to the lens device according to any one of the first to seventh aspects, in which the inclination information is information calculated based on a plurality of images obtained by performing imaging by the image sensor to which a sensitivity lower than a sensitivity of the image sensor that performs normal imaging is applied.

A ninth aspect according to the technology of the present disclosure relates to the lens device according to any one of the first to eighth aspects, in which the inclination information is information related to at least one of a first inclination angle of the first drive axis with respect to the first axis viewed along the optical axis or a second inclination angle of the second drive axis with respect to the second axis viewed along the optical axis.

A tenth aspect according to the technology of the present disclosure relates to the lens device according to the ninth aspect, in which the processor is configured to calculate a first movement amount for moving the movement lens along the first drive axis and a second movement amount for moving the movement lens along the second drive axis based on the inclination information, and perform, with respect to the drive mechanism, control of moving the movement lens along the first drive axis by the first movement amount and moving the movement lens along the second drive axis by the second movement amount.

An eleventh aspect according to the technology of the present disclosure relates to the lens device according to any one of the first to eighth aspects, in which the inclination information includes a first movement amount for moving the movement lens along the first drive axis and a second movement amount for moving the movement lens along the second drive axis, and the first movement amount and the second movement amount are movement amounts calculated based on at least one of the inclination of the first drive axis with respect to the first axis viewed along the optical axis or the inclination of the second drive axis with respect to the second axis viewed along the optical axis.

A twelfth aspect according to the technology of the present disclosure relates to the lens device according to any one of the first to eleventh aspects, further comprising a non-volatile memory, in which the processor is configured to cause the non-volatile memory to store association information in which first registration information related to the imaging apparatus body, second registration information related to the lens device, and the inclination information are associated with each other.

A thirteenth aspect according to the technology of the present disclosure relates to the lens device according to the twelfth aspect, in which the processor is configured to acquire first identification information related to the imaging apparatus body on which the lens device is mounted, second identification information related to the lens device, and the association information, and extract the inclination information from the association information in a case in which the first registration information and the first identification information are matched, and the second registration information and the second identification information are matched.

A fourteenth aspect according to the technology of the present disclosure relates to the lens device according to the thirteenth aspect, in which the processor is configured to performs processing that contributes to update of the inclination information in a case in which the first registration information and the first identification information are different from each other or in a case in which the second registration information and the second identification information are different from each other.

A fifteenth aspect according to the technology of the present disclosure relates to the lens device according to the thirteenth or fourteenth aspect, in which the processor is configured to performs control of giving a notification in a case in which the first registration information and the first identification information are different from each other or in a case in which the second registration information and the second identification information are different from each other.

A sixteenth aspect according to the technology of the present disclosure relates to the lens device according to any one of the first to fifteenth aspects, in which the processor is configured to acquire image height position designation information for designating an image height position indicating a height position of a center of an image obtained by imaging the light on the image sensor on a light-receiving surface of the image sensor, image shift amount designation information for designating a shift amount for shifting the image, and the inclination information, and perform, with respect to the drive mechanism, control of moving the movement lens by a movement amount in which the shift amount is obtained at the image height position based on the image height position designation information, the image shift amount designation information, and the inclination information.

A seventeenth aspect according to the technology of the present disclosure relates to the lens device according to any one of the first to sixteenth aspects, further comprising an optical filter that is disposed on a subject side with respect to the image sensor and transmits near-infrared light included in the light.

An eighteenth aspect according to the technology of the present disclosure relates to an imaging apparatus comprising an imaging apparatus body including an image sensor, and a lens device mounted on the imaging apparatus body, in which the lens device includes a processor, a memory coupled to or integrated with the processor, a lens that includes a movement lens and that images incident light on the image sensor, and a drive mechanism that moves the movement lens by applying power to the movement lens along each of a first drive axis intersecting an optical axis of the lens and a second drive axis intersecting each of the optical axis of the lens and the first drive axis, and the processor is configured to acquire inclination information related to at least one of an inclination of the first drive axis with respect to a first axis of the image sensor viewed along the optical axis or an inclination of the second drive axis with respect to a second axis of the image sensor viewed along the optical axis, and perform, with respect to the drive mechanism, control of moving the movement lens along at least one of the first axis or the second axis based on the inclination information.

A nineteenth aspect according to the technology of the present disclosure relates to the imaging apparatus according to the eighteenth aspect, in which the processor is configured to perform, with respect to the drive mechanism, control of moving the movement lens to a position at which an image obtained by imaging the light on the image sensor is shifted at a pitch equal to or larger than a pixel pitch of the image sensor or a pitch smaller than the pixel pitch of the image sensor, cause the image sensor to perform imaging according to the shift of the image, and combine images of a plurality of frames obtained by the imaging.

A twentieth aspect according to the technology of the present disclosure relates to an operation method for a lens device that is mounted on an imaging apparatus body and includes a lens that includes a movement lens and images incident light on an image sensor of the imaging apparatus body, and a drive mechanism that moves the movement lens by applying power to the movement lens along each of a first drive axis intersecting an optical axis of the lens and a second drive axis intersecting each of the optical axis of the lens and the first drive axis, the operation method comprising acquiring inclination information related to at least one of an inclination of the first drive axis with respect to a first axis of the image sensor viewed along the optical axis or an inclination of the second drive axis with respect to a second axis of the image sensor viewed along the optical axis, and performing, with respect to the drive mechanism, control of moving the movement lens along at least one of the first axis or the second axis based on the inclination information.

A twenty-first aspect according to the technology of the present disclosure relates to an operation method for an imaging apparatus including an imaging apparatus body including an image sensor, and a lens device mounted on the imaging apparatus body, in which the lens device includes a lens that includes a movement lens and that images incident light on the image sensor, and a drive mechanism that moves the movement lens by applying power to the movement lens along each of a first drive axis intersecting an optical axis of the lens and a second drive axis intersecting each of the optical axis of the lens and the first drive axis, the operation method comprising acquiring inclination information related to at least one of an inclination of the first drive axis with respect to a first axis of the image sensor viewed along the optical axis or an inclination of the second drive axis with respect to a second axis of the image sensor viewed along the optical axis, and performing, with respect to the drive mechanism, control of moving the movement lens along at least one of the first axis or the second axis based on the inclination information.

A twenty-second aspect according to the technology of the present disclosure relates to a non-transitory computer-readable storage medium storing a program causing a computer applied to a lens device that is mounted on an imaging apparatus body and includes a lens that includes a movement lens and images incident light on an image sensor of the imaging apparatus body, and a drive mechanism that moves the movement lens by applying power to the movement lens along each of a first drive axis intersecting an optical axis of the lens and a second drive axis intersecting each of the optical axis of the lens and the first drive axis, the program being executable by the computer to perform a process comprising acquiring inclination information related to at least one of an inclination of the first drive axis with respect to a first axis of the image sensor viewed along the optical axis or an inclination of the second drive axis with respect to a second axis of the image sensor viewed along the optical axis, and performing, with respect to the drive mechanism, control of moving the movement lens along at least one of the first axis or the second axis based on the inclination information.

A twenty-third aspect according to the technology of the present disclosure relates to a non-transitory computer-readable storage medium storing a program causing a computer applied to an imaging apparatus including an imaging apparatus body including an image sensor, and a lens device mounted on the imaging apparatus body, in which the lens device includes a lens that includes a movement lens and images incident light on the image sensor, and a drive mechanism that moves the movement lens by applying power to the movement lens along each of a first drive axis intersecting an optical axis of the lens and a second drive axis intersecting each of the optical axis of the lens and the first drive axis, the program being executable by the computer to perform a process comprising acquiring inclination information related to at least one of an inclination of the first drive axis with respect to a first axis of the image sensor viewed along the optical axis or an inclination of the second drive axis with respect to a second axis of the image sensor viewed along the optical axis, and performing, with respect to the drive mechanism, control of moving the movement lens along at least one of the first axis or the second axis based on the inclination information.

BRIEF DESCRIPTION OF THE DRAWINGS

FIG. 1 is a block diagram showing an example of a configuration of a surveillance system according to a first embodiment of the technology of the present disclosure.

FIG. 5 is a block diagram showing an example of a configuration of a lens device according to a first embodiment of the technology of the present disclosure.

FIG. 14 is a block diagram showing an example in which inclination information is transmitted and received between the management device and the lens device according to the first embodiment of the technology of the present disclosure.

FIG. 16 is a block diagram showing an example of a configuration for executing shift processing of shifting an image according to the first embodiment of the technology of the present disclosure in an X1 axis direction.

FIG. 17 is a block diagram showing an example of a configuration for executing shift processing of shifting the image according to the first embodiment of the technology of the present disclosure in a Y1 axis direction.

FIG. 18 is a block diagram showing an example in which a composite image is obtained from a plurality of images by a CPU of the surveillance camera body according to the first embodiment of the technology of the present disclosure.

FIG. 20 is a block diagram showing an example of a configuration for executing shake correction processing of correcting a shake of the image according to the first embodiment of the technology of the present disclosure in the Y1 axis direction.

FIG. 21 is a flowchart showing an example of a flow of inclination information output processing according to the first embodiment of the technology of the present disclosure.

FIG. 24 is a block diagram showing an example of a configuration of a surveillance system according to a second embodiment of the technology of the present disclosure.

FIG. 25 is a flowchart showing an example of a flow of inclination information output processing according to the second embodiment of the technology of the present disclosure.

DESCRIPTION OF THE PREFERRED EMBODIMENTS

Figure 2:
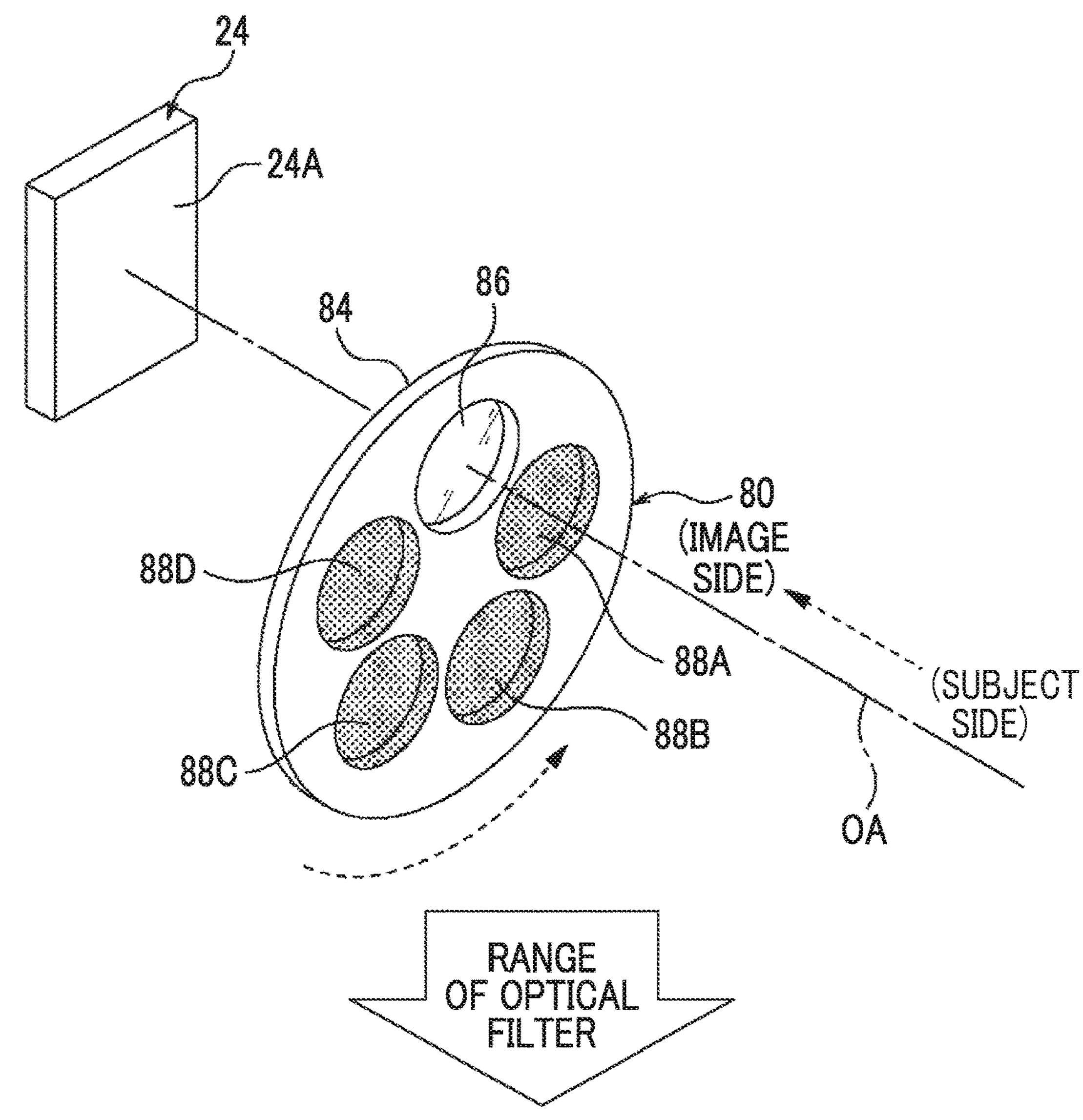
FIG. 2 is a perspective view showing an example of a configuration of a filter unit and an image sensor according to the first embodiment of the technology of the present disclosure.

Hereinafter, examples of embodiments of a lens device, an imaging apparatus, an operation method for a lens device, an operation method for an imaging apparatus, and a program according to the technology of the present disclosure will be described with reference to the accompanying drawings.

The terms used in the following description will be described first.

The CPU refers to an abbreviation of "Central Processing Unit". GPU refers to an abbreviation of "Graphics Processing Unit". NVM refers to an abbreviation of "Non-Volatile Memory". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-Chip". SSD refers to an abbreviation of "Solid State Drive". HDD refers to an abbreviation of "Hard Disk Drive". EEPROM refers to an abbreviation of "Electrically Erasable and Programmable Read Only Memory". SRAM refers to an abbreviation of "Static Random Access Memory". I/F refers to an abbreviation of "Interface". The UI refers to an abbreviation of "User Interface". USB refers to an abbreviation of "Universal Serial Bus". CMOS refers to an abbreviation of "Complementary Metal Oxide Semiconductor". CCD refers to an abbreviation of "Charge Coupled Device". LAN refers to an abbreviation of "Local Area Network". WAN refers to an abbreviation of "Wide Area Network". BPF refers to an abbreviation of "Band Pass Filter". Ir refers to an abbreviation of "Infrared Rays".

In the description of the present specification, "vertical/perpendicular" refers to the verticality/perpendicularity in the sense of including an error generally allowed in the technical field to which the technology of the present disclosure belongs, that is, an error to the extent that it does not contradict the gist of the technology of the present disclosure, in addition to the exact verticality/perpendicularity. In the description of the present specification, "horizontal" refers to the horizontality in the sense of including an error generally allowed in the technical field to which the technology of the present disclosure belongs, that is, an error to the extent that it does not contradict the gist of the technology of the present disclosure, in addition to the exact horizontality. In the description of the present specification, "parallel" refers to the parallelism in the sense of including an error generally allowed in the technical field to which the technology of the present disclosure belongs, that is, an error to the extent that it does not contradict the gist of the technology of the present disclosure, in addition to the exact parallelism. In the description of the present specification, "orthogonal" refers to the orthogonality in the sense of including an error generally allowed in the technical field to which the technology of the present disclosure belongs, that is, an error to the extent that it does not contradict the gist of the technology of the present disclosure, in addition to the exact orthogonality. In the description of the present specification, "match" refers to the match in the sense of including an error generally allowed in the technical field to which the technology of the present disclosure belongs, that is, an error to the extent that it does not contradict the gist of the technology of the present disclosure, in addition to the exact match. In the description of the present specification, "equal interval" refers to the equal interval in the sense of including an error generally allowed in the technical field to which the technology of the present disclosure belongs, that is, an error to the extent that it does not contradict the gist of the technology of the present disclosure, in addition to the exact equal interval.

First Embodiment

A first embodiment will be described first.

(Surveillance System)

As an example, as shown in FIG. 1, a surveillance system S comprises a surveillance camera 10 and a management device 200. The surveillance camera 10 is an example of an "imaging apparatus" according to the technology of the present disclosure, and the management device 200 is an example of an "external control device".

The surveillance camera 10 is installed on, for example, a pillar, a wall, or the like indoors or outdoors. The management device 200 is provided in an outside of the imaging apparatus, and is installed, for example, in a management room in a management building. The surveillance camera 10 comprises a surveillance camera body 20 and a lens device 70. The surveillance camera body 20 is an example of the "imaging apparatus body" according to the technology of the present disclosure. The surveillance camera body 20 comprises a lens mount 22. The lens device 70 is a separate body from the surveillance camera body 20, and is attachably and detachably mounted on the lens mount 22.

The surveillance camera body 20 comprises a controller 40 and a communication I/F 60, the lens device 70 comprises a controller 90 and a communication I/F 100, and the management device 200 comprises a controller 210 and a communication I/F 220. Each of the communication I/Fs comprises, for example, a USB interface, a wired LAN, a wireless LAN, a Bluetooth (registered trademark) interface, or the like. The communication I/F 220 of the management device 200 is connected to the communication I/F 60 of the surveillance camera body 20 and the communication I/F 100 of the lens device 70 by wire or wirelessly in a communicable manner. In addition, in a state in which the lens device 70 is mounted on the lens mount 22 of the surveillance camera body 20, a connector (not shown) provided in the surveillance camera body 20 and a connector (not shown) provided in the lens device 70 are connected to each other. Then, the communication I/F 60 of the surveillance camera body 20 and the communication I/F 100 of the lens device 70 are connected to each other in a communicable manner.

It should be noted that an X axis shown in FIG. 1 corresponds to a pitch axis of the surveillance camera 10, a Y axis corresponds to a yaw axis of the surveillance camera 10, and a Z axis corresponds to a roll axis of the surveillance camera 10. Hereinafter, a direction along the X axis will be referred to as an X axis direction, a direction along the Y axis will be referred to as a Y axis direction, and a direction along the Z axis will be referred to as a Z axis direction. The X axis direction, the Y axis direction, and the Z axis direction are orthogonal to each other.

(Surveillance Camera 10)

The surveillance camera body 20 comprises an image sensor 24. The image sensor 24 is, for example, a CMOS image sensor, which performs photoelectric conversion of received light and outputs an electrical signal corresponding to the received light. The CMOS image sensor is merely an example, and the image sensor 24 may be an image sensor having an operation system different from the CMOS image sensor, such as a CCD image sensor.

The image sensor 24 has a light-receiving surface 24A. Imaging region light incident on the lens device 70 is imaged on the light-receiving surface 24A by the lens device 70. An image is obtained by imaging the imaging region light on the light-receiving surface 24A. A plurality of photodiodes are disposed in a matrix on the light-receiving surface 24A. Each photodiode receives the imaging region light. The image sensor 24 images the imaging region by receiving the imaging region light. As an example, the plurality of photodiodes include a silicon photodiode having sensitivity to visible light and an indium gallium arsenide photodiode having sensitivity to near-infrared light. The image sensor 24 performs the imaging on each of the visible light and the near-infrared light included in the imaging region light imaged on the light-receiving surface 24A.

The lens device 70 has an optical axis OA. As an example, the optical axis OA is an axis that passes through the center of the light-receiving surface 24A and is perpendicular to the light-receiving surface 24A. The optical axis OA is parallel to the Z axis. As an example, the lens device 70 comprises an objective lens 72, a zoom lens 74, a shake correction lens 76, a stop 78, a filter unit 80, and a master lens 82. The objective lens 72, the zoom lens 74, the shake correction lens 76, the stop 78, the filter unit 80, and the master lens 82 are disposed in order along the optical axis OA from a subject side to an image side.

The shake correction lens 76 is an example of a "movement lens" according to the technology of the present disclosure. In addition, the plurality of lenses including the objective lens 72, the zoom lens 74, the shake correction lens 76, the filter unit 80, and the master lens 82 are examples of a "lens" according to the technology of the present disclosure. The optical axis OA is an axis that passes through the center of each lens of the objective lens 72, the zoom lens 74, the shake correction lens 76, and the master lens 82. The optical axis OA is also the optical axis OA of each lens of the objective lens 72, the zoom lens 74, the shake correction lens 76, and the master lens 82. The optical axis OA is an example of a "lens optical axis" according to the technology of the present disclosure.

The imaging region light is incident on the objective lens 72. The incident imaging region light is guided by the objective lens 72 to the zoom lens 74. The zoom lens 74 consists of a lens group including the plurality of lenses that are movable along the optical axis OA, and is used for zooming of the imaging region.

As described below, the shake correction lens 76 is a lens for correcting the shake of the image obtained by imaging the imaging region light on the image sensor 24, and is a lens for shifting the image along the light-receiving surface 24A of the image sensor 24.

The stop 78 has an aperture 78A. The imaging region light guided by the zoom lens 74 passes through the aperture 78A. The stop 78 is a movable stop 78 in which a diameter of the aperture 78A can be changed. That is, an amount of light in the imaging region light is changed by the stop 78.

The filter unit 80 is disposed on the subject side with respect to the image sensor 24. For example, the filter unit 80 is disposed between the stop 78 and the master lens 82. The imaging region light transmitted through the stop 78 is incident on the filter unit 80. Although the details will be described below, the filter unit 80 includes a plurality of optical filters having translucency, and selectively transmits light in a plurality of wavelength ranges included in the imaging region light (for example, the visible light, the near-infrared light in different wavelength ranges in a near-infrared wavelength range) by switching the optical filter that transmits the light among the plurality of optical filters.

The imaging region light transmitted through the filter unit 80 is incident on the master lens 82, and the imaging region light incident on the master lens 82 is imaged on the light-receiving surface 24A. In this way, the imaging region light incident on the lens device 70 is guided to the image sensor 24 by the plurality of lenses provided in the lens device 70, and is imaged on the light-receiving surface 24A of the image sensor 24.

It should be noted that the arrangement order of the objective lens 72, the zoom lens 74, the shake correction lens 76, the stop 78, the filter unit 80, and the master lens 82 may be the arrangement order other than the above. In addition, each of the objective lens 72, the zoom lens 74, the shake correction lens 76, and the master lens 82 may be a single lens or may be a lens group including the plurality of lenses. In addition, the lens device 70 may comprise other lenses in addition to the objective lens 72, the zoom lens 74, the shake correction lens 76, and the master lens 82.

(Filter Unit)

As shown in FIG. 2 as an example, the filter unit 80 comprises a disk 84. As an example, the disk 84 is provided with an Ir cut filter 86, a first BPF 88A, a second BPF 88B, a third BPF 88C, and a fourth BPF 88D as the plurality of optical filters at equal intervals along a circumferential direction. In the following description, in a case in which the distinction is not necessary, the Ir cut filter 86, the first BPF 88A, the second BPF 88B, the third BPF 88C, and the fourth BPF 88D will be referred to as the optical filter. In addition, in the following description, in a case in which the distinction is not necessary, the first BPF 88A, the second BPF 88B, the third BPF 88C, and the fourth BPF 88D will be referred to as the BPF 88.

The filter unit 80 selectively inserts and removes the plurality of optical filters by a turret system into and from an optical path of the imaging region light in the lens device 70 (hereinafter, simply referred to as the "optical path"). Specifically, by rotating the disk 84 along the circumferential direction (for example, a direction of an arc broken line arrow shown in FIG. 2), the Ir cut filter 86, the first BPF 88A, the second BPF 88B, the third BPF 88C, and the fourth BPF 88D are selectively inserted into and removed from the optical path (in the example shown in FIG. 2, the optical axis OA). As a result, the Ir cut filter 86, the first BPF 88A, the second BPF 88B, the third BPF 88C, and the fourth BPF 88D transmit light in different wavelength ranges, respectively.

In a case in which the optical filter is inserted into the optical path, the optical axis OA penetrates the center of the optical filter, and the center of the optical filter inserted into the optical path matches the center of the light-receiving surface 24A. In the example shown in FIG. 2, since the Ir cut filter 86 is inserted into the optical path, the optical axis OA penetrates the center of the Ir cut filter 86, and the center of the Ir cut filter 86 matches the center of the light-receiving surface 24A.

The Jr cut filter 86 is an optical filter that cuts infrared rays and transmits only light other than the infrared rays. The BPF 88 is an optical filter that transmits the near-infrared light. The first BPF 88A, the second BPF 88B, the third BPF 88C, and the fourth BPF 88D transmit the near-infrared light in different wavelength ranges, respectively.

The first BPF 88A is an optical filter corresponding to a range in the vicinity of 1000 nm (nanometers). That is, the first BPF 88A transmits only the near-infrared light in a range in the vicinity of 1000 nm. The second BPF 88B is an optical filter corresponding to a range in the vicinity of 1250 nm. That is, the second BPF 88B transmits only the near-infrared light in a range in the vicinity of 1250 nm. The third BPF 88C is an optical filter corresponding to a range in the vicinity of 1550 nm. That is, the third BPF 88C transmits only the near-infrared light in a range in the vicinity of 1550 nm. The fourth BPF 88D is an optical filter corresponding to a range in the vicinity of 2150 nm. That is, the fourth BPF 88D transmits only the near-infrared light in a range in the vicinity of 2150 nm. It should be noted that each of the ranges described herein includes an error that is generally allowed in the technical field to which the technology of the present disclosure belongs, that is, an error in a range that does not contradict the gist of the technology of the present disclosure. In addition, each of the wavelength ranges described herein is merely an example, and the wavelength ranges need only be different from each other.

(Image Sensor 24)

Figure 3:
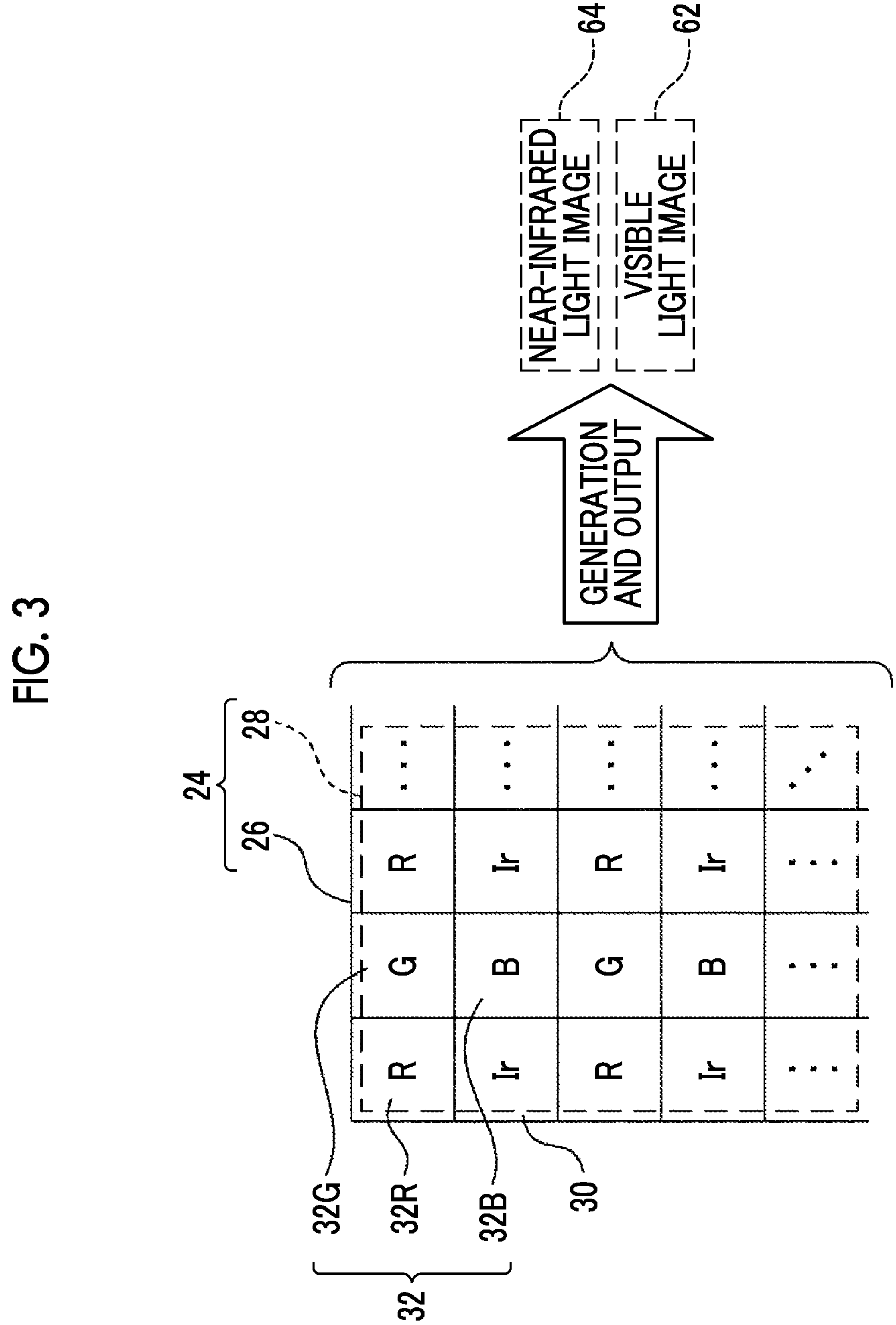
FIG. 3 is a front view showing an example of a configuration of a main part of the image sensor according to the first embodiment of the technology of the present disclosure.

As shown in FIG. 3 as an example, the image sensor 24 includes a light reception unit 26 and a color filter unit 28. The light reception unit 26 includes a plurality of first light-receiving elements 30 and a plurality of second light-receiving elements 32. Examples of the first light-receiving element 30 include an indium gallium arsenide photodiode. Examples of the second light-receiving element 32 include a silicon photodiode.

The color filter unit 28 is disposed on the plurality of first light-receiving elements 30 and the plurality of second light-receiving elements 32. The color filter unit 28 includes an Jr filter, an R filter, a G filter, and a B filter. The Jr filter is a filter that transmits light having a near-infrared (Jr) component. The R filter is a filter that transmits light having a red (R) component. The G filter is a filter that transmits light having a green (G) component. The B filter is a filter that transmits light having a blue (B) component.

The first light-receiving element 30 is a light-receiving element having sensitivity to the light having the Jr component. The second light-receiving element 32 is roughly classified into a light-receiving element 32R having sensitivity to the light having the R component, a light-receiving element 32G having sensitivity to the light having the G component, and a light-receiving element 32B having sensitivity to the light having the B component.

The Ir filter is disposed on the first light-receiving element 30. The R filter is disposed on the light-receiving element 32R. The G filter is disposed on the light-receiving element 32G The B filter is disposed on the light-receiving element 32B. It should be noted that a filter that blocks the near-infrared light is further disposed in each of the light-receiving elements 32R, 36G, and 36B.

In the image sensor 24 configured as described above, the plurality of first light-receiving elements 30 receive the near-infrared light transmitted through any of a plurality of BPFs 88, generate a near-infrared light image 64 based on the received near-infrared light, and output the generated near-infrared light image 62, and the plurality of second light-receiving elements 32 receive the visible light transmitted through the Ir cut filter 86, generate a visible light image 62 based on the received visible light, and output the visible light image 62.

(Surveillance Camera Body)

Figure 4:
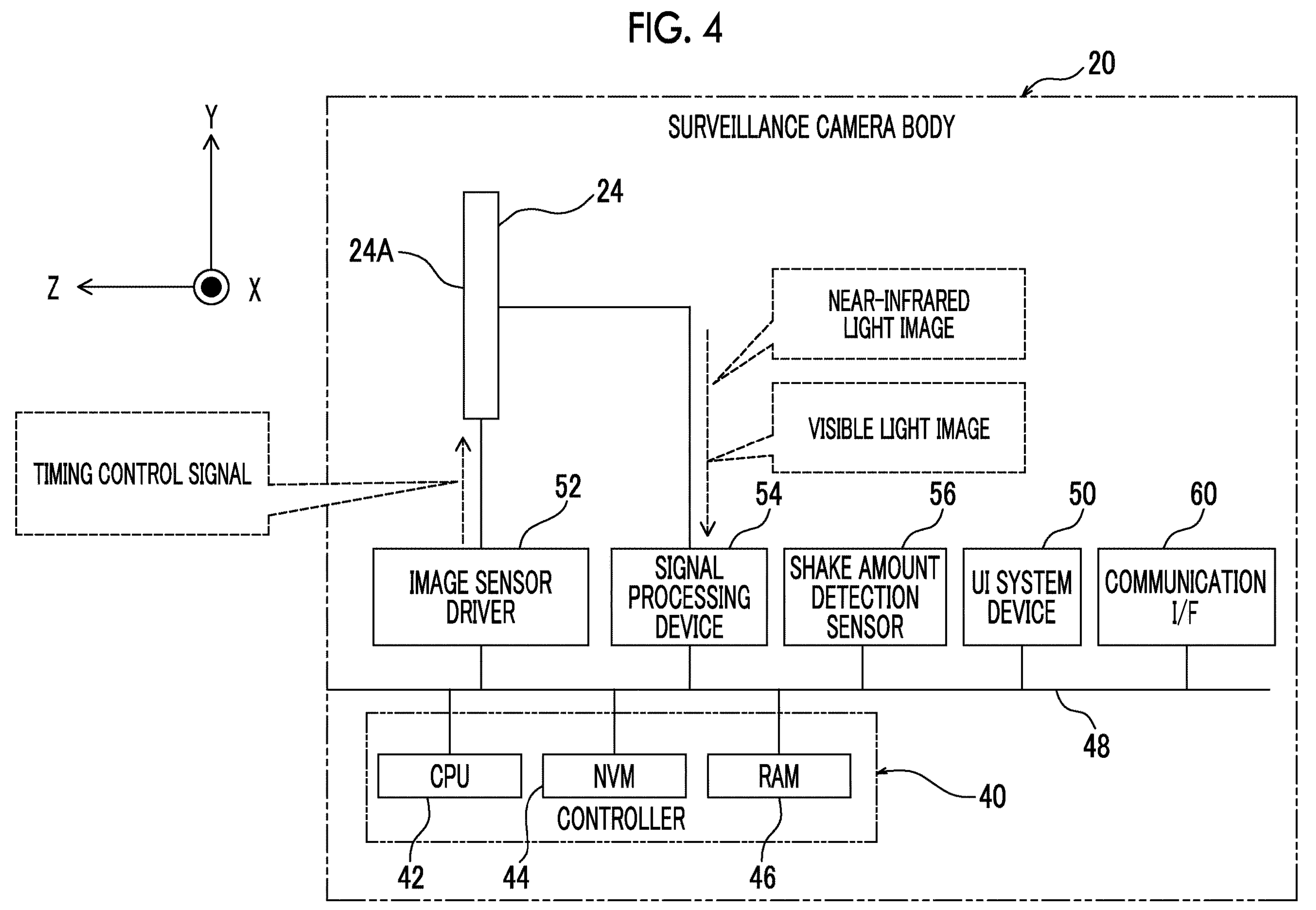
FIG. 4 is a block diagram showing an example of a configuration of a surveillance camera body according to the first embodiment of the technology of the present disclosure.

As an example, as shown in FIG. 4, the surveillance camera body 20 comprises a controller 40 and a UI system device 50. The controller 40 controls an operation of the surveillance camera body 20. The controller 40 comprises a CPU 42, an NVM 44, and a RAM 46. The CPU 42, the NVM 44, and the RAM 46 are connected to a bus 48. The CPU 42 of the surveillance camera body 20 and a CPU 212 (see FIG. 6) of the management device 200, which will be described below, are connected to each other via the communication I/F 60 of the surveillance camera body 20, the communication I/F 220 (see FIG. 6) of the management device 200, or the like in a communicable manner. The CPU 42 of the surveillance camera body 20 controls the operation of the surveillance camera body 20 in response to an instruction given from the CPU 212 of the management device 200.

Various parameters and various programs are stored in the NVM 44. Examples of the NVM 44 include an EEPROM (for example, a flash type EEPROM). The EEPROM is merely an example of the NVM 44. The NVM 44 need only be various non-volatile storage devices, such as an SSD and/or an HDD. The RAM 46 transitorily stores various types of information and is used as a work memory. Examples of the RAM 46 include a DRAM. The DRAM is merely an example of the RAM 46. The RAM 46 may be an SRAM, and need only be various volatile storage devices.

The NVM 44 stores various programs. The CPU 42 reads out a necessary program from the NVM 44 and executes the read out program on the RAM 46. The CPU 42 executes various types of processing according to the program executed on the RAM 46.

The UI system device 50 is also connected to the bus 48. Under the control of the CPU 42, the UI system device 50 receives an instruction given by a user, or presents various types of information obtained by being processed by the surveillance camera body 20 to the user.

In addition, the surveillance camera body 20 comprises an image sensor driver 52, a signal processing device 54, a shake amount detection sensor 56, and the communication I/F 60. The image sensor driver 52, the signal processing device 54, the shake amount detection sensor 56, and the communication I/F 60 are connected to the bus 48.

As an example, as shown in FIG. 1, the image sensor 24 is positioned on the optical axis OA in the rear part of the master lens 82, that is, on the image side with respect to the master lens 82. As shown in FIG. 2 as an example, in a state in which the Ir cut filter 86 is disposed on the optical axis OA, the image sensor 24 images the imaging region based on the visible light imaged on the light-receiving surface 24A by the master lens 82 to generate the visible light image 62 shown in FIG. 3, and outputs the generated visible light image 62 to the rear part. The visible light image 62 is an image showing the imaging region by the visible light.

In a state in which the BPF 88 (see FIG. 2) is disposed on the optical axis OA, the image sensor 24 images the imaging region based on the near-infrared light imaged on the light-receiving surface 24A by the master lens 82 to generate the near-infrared light image 64 shown in FIG. 3, and outputs the generated near-infrared light image 64 to the rear part. The near-infrared light image 64 is an image showing the imaging region by the near-infrared light. It should be noted that, in the following description, in a case in which the distinction is not necessary, the near-infrared light image 64 and the visible light image 62 will be referred to as a "captured image" without reference numerals.

As an example, as shown in FIG. 4, the image sensor driver 52 and the signal processing device 54 are connected to the image sensor 24. Under the control of the CPU 42, the image sensor driver 52 outputs a timing control signal to the image sensor 24. The timing control signal is a signal for controlling the imaging by the image sensor 24. A frame rate of imaging by the image sensor 24 is defined by the timing control signal.

The timing control signal includes a vertical synchronizing signal and a horizontal synchronizing signal. The vertical synchronizing signal is a signal for defining a timing at which transmission of an analog image for one frame is started. The horizontal synchronizing signal is a signal for defining a timing at which output of the analog image for one horizontal line is started. The image sensor 24 starts the output of the captured image in units of frames to the signal processing device 54 in response to the vertical synchronizing signal input from the image sensor driver 52. In addition, the image sensor 24 starts the output of the captured image in units of horizontal lines to the signal processing device 54 in response to the horizontal synchronizing signal input from the image sensor driver 52.

Under the control of the CPU 42, the signal processing device 54 performs signal processing, such as demosaicing processing, noise removal processing, gradation correction processing, and color correction processing, on the captured image input from the image sensor 24. The captured image that has been subjected to the signal processing is output to the CPU 42 by the signal processing device 54. The CPU 42 stores the captured image input from the signal processing device 54 in a predetermined storage region (for example, the NVM 44 and/or the RAM 46).

The shake amount detection sensor 56 detects, for example, an amount of the shake of the surveillance camera 10 shown in FIG. 1 (hereinafter, also simply referred to as the "shake amount"). The shake of the surveillance camera 10 refers to a phenomenon in which a positional relationship between the optical axis OA and the light-receiving surface 24A is changed in the surveillance camera 10. In a case in which the shake of the surveillance camera 10 occurs, the shake of the image occurs. Examples of the image include an image obtained by being captured by the image sensor 24 and/or an optical image obtained by being imaged on the light-receiving surface 24A (hereinafter, also simply referred to as an "image" or a "subject image"). The "shake of the image" means a phenomenon in which the subject image deviates from a reference position due to the inclination of the optical axis OA due to a vibration phenomenon, that is, a phenomenon in which the subject image deviates from the reference position due to the relative movement of the optical axis OA with respect to the subject. The vibration phenomenon refers to a phenomenon in which vibration generated from the outside of the surveillance camera 10 (for example, a hand, a wind, and/or a vehicle) and/or the inside of the surveillance camera 10 (for example, a motor mounted on the surveillance camera 10) is transmitted to the lens device 70 to cause the lens device 70 to vibrate. In addition, "inclination of the optical axis OA" means that, for example, the optical axis OA is inclined with respect to a reference axis (for example, the optical axis OA before the vibration phenomenon occurs (that is, the optical axis OA in a case in which the surveillance camera 10 is stationary)). In addition, the "reference position" refers to, for example, a position of the subject image obtained in a state in which the vibration is not applied to the lens device 70 (for example, a position of the subject image in the light-receiving surface 24A).

The shake amount detection sensor 56 shown in FIG. 4 is a gyro sensor, for example. The gyro sensor detects an amount of rotational shake about each of the X axis, the Y axis, and the Z axis. The shake amount detection sensor 56 transforms the amount of rotational shake about the X axis and the amount of rotational shake about the Y axis detected by the gyro sensor into the shake amount in a two-dimensional plane parallel to the X axis and the Y axis to detect the shake amount of the surveillance camera 10. It should be noted that the meaning of parallelism includes the meaning of substantially parallelism including an error allowed in design and manufacturing, in addition to the meaning of the exact parallelism.

Here, the gyro sensor is shown as an example of the shake amount detection sensor 56, but this is merely an example, and the shake amount detection sensor 56 may be an acceleration sensor. The acceleration sensor detects the shake amount in a two-dimensional plane parallel to the X axis and the Y axis. The shake amount detection sensor 56 outputs the detected shake amount to the CPU 42.

In addition, although the form example is shown in which the shake amount is detected by a physical sensor called the shake amount detection sensor 56, the technology of the present disclosure is not limited to this. For example, a movement vector obtained by comparing the captured images before and after in time series, which are stored in the NVM 44 or the RAM 46, may be used as the shake amount. In addition, the shake amount to be finally used may be derived based on the shake amount detected by the physical sensor and the movement vector obtained by the image processing.

The communication I/F 60 includes, for example, a network interface, and controls transmission of various types of information to and from the communication I/F 220 (see FIG. 6) of the management device 200 via a network. Examples of the network include a WAN, such as the Internet or a public communication network. Also, the communication I/F 60 controls transmission of various types of information to and from the communication I/F 100 (see FIG. 5) of the lens device 70.

The surveillance camera 10 having the configuration described above images a surveillance target, which is a subject, and generates a moving image by the imaging. The moving image includes images of a plurality of frames obtained by the imaging. The moving image obtained by being captured by the surveillance camera 10 is transmitted to the management device 200 shown in FIG. 1, and the management device 200 receives the moving image transmitted by the surveillance camera 10, and displays the received moving image on a display or stores the received moving image in an image storage device.

(Lens Device)

As an example, as shown in FIG. 5, the controller 90 of the lens device 70 comprises a CPU 92, an NVM 94, and a RAM 96. The controller 90 controls an operation of the lens device 70. The controller 90 is an example of a "computer applied to a lens device", the CPU 92 is an example of a "processor" according to the technology of the present disclosure, the NVM 94 is an example of a "non-volatile memory" according to the technology of the present disclosure, and the RAM 96 is an example of a "memory" according to the technology of the present disclosure. The CPU 92, the NVM 94, and the RAM 96 are connected to a bus 98.

The CPU 92 of the lens device 70 and the CPU 42 (see FIG. 4) of the surveillance camera body 20 are connected to each other via the communication I/F 100 of the lens device 70, the communication I/F 60 (see FIG. 4) of the surveillance camera body 20, and the like in a communicable manner. The CPU 92 of the lens device 70 and the CPU 212 (see FIG. 6) of the management device 200, which will be described below, are connected to each other via the communication I/F 100 of the lens device 70, the communication I/F 220 (see FIG. 6) of the management device 200, and the like in a communicable manner. The CPU 92 of the lens device 70 controls the operation of the lens device 70 in response to an instruction given from the CPU 42 of the surveillance camera body 20 and information given from the CPU 212 of the management device 200.

Various parameters and various programs are stored in the NVM 94. Examples of the NVM 94 include an EEPROM (for example, a flash type EEPROM). The EEPROM is merely an example of the NVM 94. The NVM 94 need only be various non-volatile storage devices, such as an SSD and/or an HDD. The RAM 96 transitorily stores various types of information and is used as a work memory. Examples of the RAM 96 include a DRAM. The DRAM is merely an example of the RAM 96. The RAM 96 may be an SRAM, and need only be various volatile storage devices.

The NVM 94 stores various programs. The CPU 92 reads out a necessary program from the NVM 94 and executes the read out program on the RAM 96. The CPU 92 executes various types of processing according to the program executed on the RAM 96. In addition, the "various programs" described herein also include a shake correction/shift processing program 110 (see FIG. 15), which will be described below.

The communication I/F 100 includes, for example, a network interface, and controls transmission of various types of information to and from the communication I/F 220 (see FIG. 6) of the management device 200 via a network. Also, the communication I/F 100 controls transmission of various types of information to and from the communication I/F 60 (see FIG. 4) of the surveillance camera body 20.

As an example, as shown in FIG. 5, the lens device 70 comprises a first motor driver 114, an X axis motor driver 116A, a Y axis motor driver 116B, a second motor driver 118, a third motor driver 120, and a fourth motor driver 122. Also, the lens device 70 comprises a first motor 134, an X axis motor 136A, a Y axis motor 136B, a second motor 138, a third motor 140, and a fourth motor 142. Further, the lens device 70 comprises a first position sensor 154, an X axis position sensor 156A, a Y axis position sensor 156B, a second position sensor 158, a third position sensor 160, and a fourth position sensor 162.

The first motor driver 114, the X axis motor driver 116A, the Y axis motor driver 116B, the second motor driver 118, the third motor driver 120, the fourth motor driver 122, the first position sensor 154, the X axis position sensor 156A, the Y axis position sensor 156B, the second position sensor 158, the third position sensor 160, and the fourth position sensor 162 are connected to the bus 98.

Examples of each of the first position sensor 154, the X axis position sensor 156A, the Y axis position sensor 156B, the second position sensor 158, the third position sensor 160, and the fourth position sensor 162 include a potentiometer.

The first position sensor 154 detects a position of the zoom lens 74 in the Z axis direction. The X axis position sensor 156A detects a position of the shake correction lens 76 in the X axis direction, and the Y axis position sensor 156B detects a position of the shake correction lens 76 in the Y axis direction. The second position sensor 158 detects a diameter of the aperture 78A formed in the stop 78. The third position sensor 160 detects a rotational position of the filter unit 80 with respect to the optical axis OA. The fourth position sensor 162 detects a position of the master lens 82 in the Z axis direction.

A detection result by the first position sensor 154 is output to the CPU 92 by the first position sensor 154. A detection result by the X axis position sensor 156A is output to the CPU 92 by the X axis position sensor 156A. A detection result by the Y axis position sensor 156B is output to the CPU 92 by the Y axis position sensor 156B. A detection result by the second position sensor 158 is output to the CPU 92 by the second position sensor 158. A detection result by the third position sensor 160 is output to the CPU 92 by the third position sensor 160. A detection result by the fourth position sensor 162 is output to the CPU 92 by the fourth position sensor 162.

The zoom lens 74 is attached to a first sliding mechanism (not shown). The first sliding mechanism is mechanically connected to a drive shaft of the first motor 134, and receives the power of the first motor 134 to move the zoom lens 74 along the Z axis direction. The first motor driver 114 is connected to the first motor 134, and controls the first motor 134 in response to an instruction from the CPU 92. By controlling the first motor 134 via the first motor driver 114 based on the detection result by the first position sensor 154, the CPU 92 controls the position of the zoom lens 74 in the Z axis direction.

The shake correction lens 76 is attached to an X axis sliding mechanism (not shown). The X axis sliding mechanism is mechanically connected to a movable member of the X axis motor 136A, and receives the power of the X axis motor 136A to move the shake correction lens 76 along the X axis direction. The X axis motor driver 116A is connected to the X axis motor 136A, and controls the X axis motor 136A in response to an instruction from the CPU 92. By controlling the X axis motor 136A via the X axis motor driver 116A based on the detection result of the X axis position sensor 156A, the CPU 92 controls the position of the shake correction lens 76 in the X axis direction. For example, the X axis motor 136A may be a voice coil motor or a small direct current motor. In addition, the X axis motor 136A may comprise a voice coil motor that moves the shake correction lens 76 in a direction for correcting the shake of the image, and a piezoelectric element or a small direct current motor that moves the shake correction lens 76 in a direction for shifting the image.

Also, the shake correction lens 76 is attached to a Y axis sliding mechanism (not shown). The Y axis sliding mechanism is mechanically connected to a movable member of the Y axis motor 136B, and receives the power of the Y axis motor 136B to move the shake correction lens 76 along the Y axis direction. The Y axis motor driver 116B is connected to the Y axis motor 136B, and controls the Y axis motor 136B in response to an instruction from the CPU 92. By controlling the Y axis motor 136B via the Y axis motor driver 116B based on the detection result of the Y axis position sensor 156B, the CPU 92 controls the position of the shake correction lens 76 in the Y axis direction. For example, the Y axis motor 136B may be a voice coil motor or a small direct current motor. In addition, the Y axis motor 136B may comprise a voice coil motor that moves the shake correction lens 76 in a direction for correcting the shake of the image, and a piezoelectric element or a small direct current motor that moves the shake correction lens 76 in a direction for shifting the image. The X axis motor 136A and the Y axis motor 136B are examples of a "drive mechanism" according to the technology of the present disclosure.

The stop 78 has a plurality of blades (not shown) capable of opening and closing the aperture 78A. The plurality of blades are mechanically connected to a drive shaft of the second motor 138, and receive the power of the second motor 138 to open and close the aperture 78A. The second motor driver 118 is connected to the second motor 138, and controls the second motor 138 in response to an instruction from the CPU 92. By controlling the second motor 138 via the second motor driver 118 shown in FIG. 5 based on the detection result by the second position sensor 158 and the amount of received light on the light-receiving surface 24A shown in FIG. 4, the CPU 92 adjusts an opening degree of the aperture 78A.

The filter unit 80 is attached to a rotation mechanism (not shown). The rotation mechanism is mechanically connected to a drive shaft of the third motor 140, and receives the power of the third motor 140 to rotate the filter unit 80 (see FIG. 3) in the circumferential direction, so that the plurality of optical filters are inserted into and removed from the optical path. The third motor driver 120 is connected to the third motor 140, and controls the third motor 140 in response to an instruction from the CPU 92. By controlling the third motor 140 via the third motor driver 120 based on the detection result by the third position sensor 160, the CPU 92 controls the rotational position of the filter unit 80 with respect to the optical axis OA.

The master lens 82 is attached to a fourth sliding mechanism (not shown). The fourth sliding mechanism is mechanically connected to a drive shaft of the fourth motor 142, and receives the power of the fourth motor 142 to move the master lens 82 along the Z axis direction. The fourth motor driver 122 is connected to the fourth motor 142, and controls the fourth motor 142 in response to an instruction from the CPU 92. By controlling the fourth motor 142 via the fourth motor driver 122 based on the detection result by the fourth position sensor 162, the CPU 92 controls the position of the master lens 82 in the Z axis direction.

(Management Device)

Figure 6:
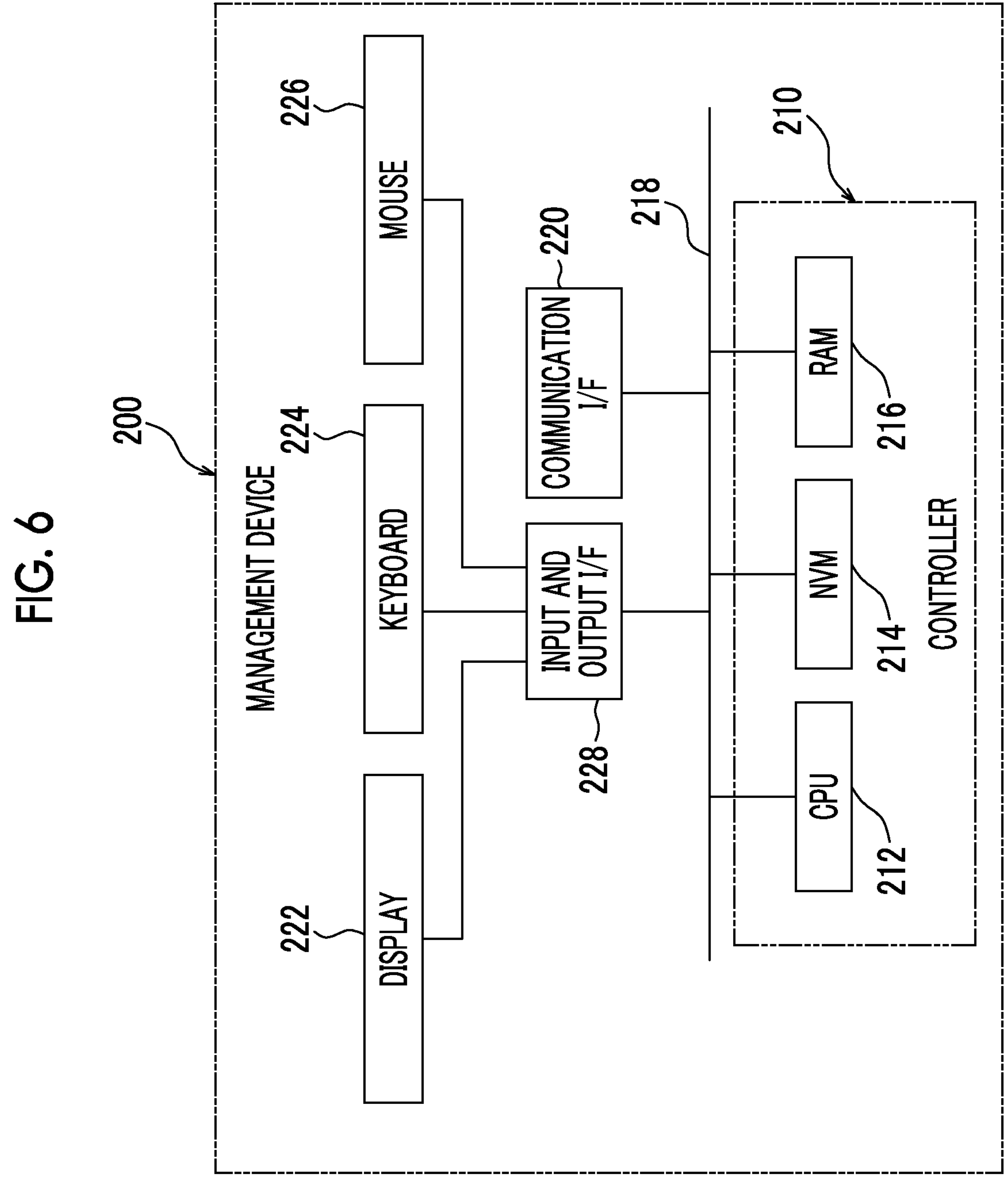
FIG. 6 is a block diagram showing an example of a configuration of a management device according to the first embodiment of the technology of the present disclosure.

As an example, as shown in FIG. 6 the controller 210 of the management device 200 controls an operation of the management device 200. The controller 210 comprises the CPU 212, an NVM 214, and a RAM 216. The CPU 212, the NVM 214, and the RAM 216 are connected to a bus 218.

Various parameters and various programs are stored in the NVM 214. Examples of the NVM 214 include an EEPROM (for example, a flash type EEPROM). The EEPROM is merely an example of the NVM 214. The NVM 214 need only be various non-volatile storage devices, such as an SSD and/or an HDD. The RAM 216 transitorily stores various types of information and is used as a work memory. Examples of the RAM 216 include a DRAM. The DRAM is merely an example of the RAM 216. The RAM 216 may be an SRAM, and need only be various volatile storage devices.

The NVM 214 stores various programs. The CPU 212 reads out a necessary program from the NVM 214 and executes the read out program on the RAM 216. The CPU 212 executes various types of processing according to the program executed on the RAM 216. In addition, the "various programs" described herein also include an inclination information output processing program 230 (see FIG. 8), which will be described below.

In addition, as shown in FIG. 6 as an example, the management device 200 comprises a display 222, a keyboard 224, a mouse 226, and an input and output I/F 228. The display 222, the keyboard 224, and the mouse 226 are connected to the input and output I/F 228. The input and output I/F 228 is connected to the bus 218. The information input by the keyboard 224 and the mouse 226 is given to the CPU 212 via the input and output I/F 228. The image information output from the CPU 212 is given to the display 222 via the input and output I/F 228, and the display 222 displays the image based on the given image information.

The communication I/F 220 includes a network interface, for example. The network interface of the communication I/F 220 is connected to the communication I/F 60 (see FIG. 4) of the surveillance camera body 20 via a network (not shown) in a communicable manner, and controls the exchange of various types of information between the CPU 212 and the CPU 42 (see FIG. 4) of the surveillance camera body 20. The network interface of the communication I/F 220 is connected to the communication I/F 100 (see FIG. 5) of the lens device 70 via a network in a communicable manner, and controls the exchange of various types of information between the CPU 212 and the CPU 92 (see FIG. 5) of the lens device 70.

(About Inclination of X Axis and Y Axis of Lens Device)

By the way, in a state in which the lens device 70 is mounted on the lens mount 22 of the surveillance camera body 20, there is a possibility that the X axis and the Y axis of the lens device 70 are inclined with respect to the X axis and the Y axis of the surveillance camera body 20, respectively, due to the influence of rattling and/or deformation of the lens mount 22. Hereinafter, in a case in which the X axis and the Y axis of the lens device 70 are distinguished from the X axis and the Y axis of the surveillance camera body 20, the X axis and the Y axis of the surveillance camera body 20 will be referred to as an X1 axis and a Y1 axis, respectively, and the X axis and the Y axis of the lens device 70 are referred to as an X2 axis and a Y2 axis, respectively. In addition, the X axis and the Y axis of the image sensor 24 are the X axis and the Y axis of the surveillance camera body 20. Hereinafter, the X axis and the Y axis of the image sensor 24 will be referred to as the X1 axis and the Y1 axis, respectively.

Figure 7:
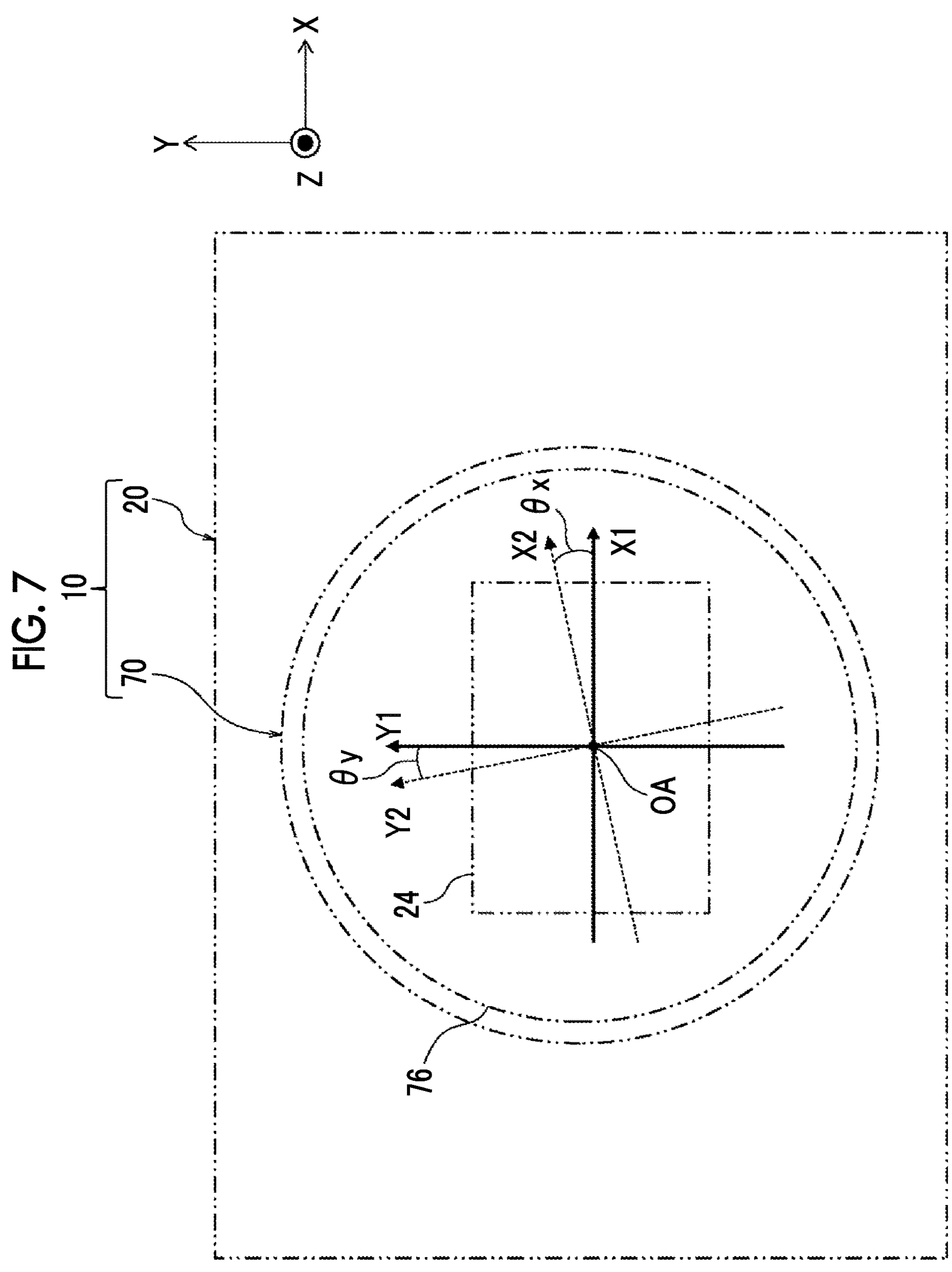
FIG. 7 is a front view showing an example in which an X2 axis and a Y2 axis of the lens device are respectively inclined with respect to an X1 axis and a Y1 axis of the surveillance camera body according to the first embodiment of the technology of the present disclosure.

For example, in the example shown in FIG. 7, the X2 axis is inclined with respect to the X1 axis at an inclination angle θx, and the Y2 axis is inclined with respect to the Y1 axis at an inclination angle θy. A value of the inclination angle θx may be the same as a value of the inclination angle θy or may be different from value of the inclination angle θy. Both the inclination angle θx and the inclination angle θy are angles viewed along the Z axis.

In the following description, as an example, an example will be described in which the X2 axis and the Y2 axis of the lens device 70 are respectively inclined with respect to the X1 axis and the Y1 axis of the surveillance camera body 20. It should be noted that, for convenience, it is assumed that the Z axis of the lens device 70 and the Z axis of the surveillance camera body 20 match each other, and the optical axis OA is parallel to the Z axis of the lens device 70.

As shown in FIG. 7, in a case in which the X2 axis and the Y2 axis of the lens device 70 are respectively inclined with respect to the X1 axis and the Y1 axis of the surveillance camera body 20, a direction in which the X axis motor 136A (see FIG. 5) moves the shake correction lens 76 is a direction along the X2 axis, and a direction in which the Y axis motor 136B (see FIG. 5) moves the shake correction lens 76 is a direction along the Y2 axis. The image obtained by imaging the light on the image sensor 24 is moved along the X2 axis in a case in which the X axis motor 136A moves the shake correction lens 76 along the X2 axis, and the image is moved along the Y2 axis in a case in which the Y axis motor 136B moves the shake correction lens 76 along the Y2 axis. Therefore, although it is originally desired to move the image along the X1 axis and the Y1 axis of the image sensor 24 with the movement of the shake correction lens 76, the image is moved along the X2 axis and the Y2 axis. Accordingly, even in a case in which the X2 axis and the Y2 axis of the lens device 70 are respectively inclined with respect to the X1 axis and the Y1 axis of the surveillance camera body 20, respectively, it is desired that the image is moved along the X1 axis and the Y1 axis of the image sensor 24 with the movement of the shake correction lens 76.

Hereinafter, the technology of moving the image along the X1 axis and the Y1 axis of the image sensor 24 with the movement of the shake correction lens 76 even in a case in which the X2 axis and the Y2 axis of the lens device 70 are respectively inclined with respect to the X1 axis and the Y1 axis of the surveillance camera body 20, respectively, will be described.

It should be noted that the X1 axis is an example of a "first axis" according to the technology of the present disclosure, the Y1 axis is an example of a "second axis" according to the technology of the present disclosure, the X2 axis is an example of a "first drive axis intersecting the optical axis of the lens" according to the technology of the present disclosure, and the Y2 axis is an example of a "second drive axis intersecting each of the optical axis of the lens and the first drive axis" according to the technology of the present disclosure. In addition, the inclination angle θx is an example of a "first inclination angle" according to the technology of the present disclosure, and the inclination angle θy is an example of a "second inclination angle" according to the technology of the present disclosure.

(Functional Configuration of CPU of Management Device)

Figure 8:
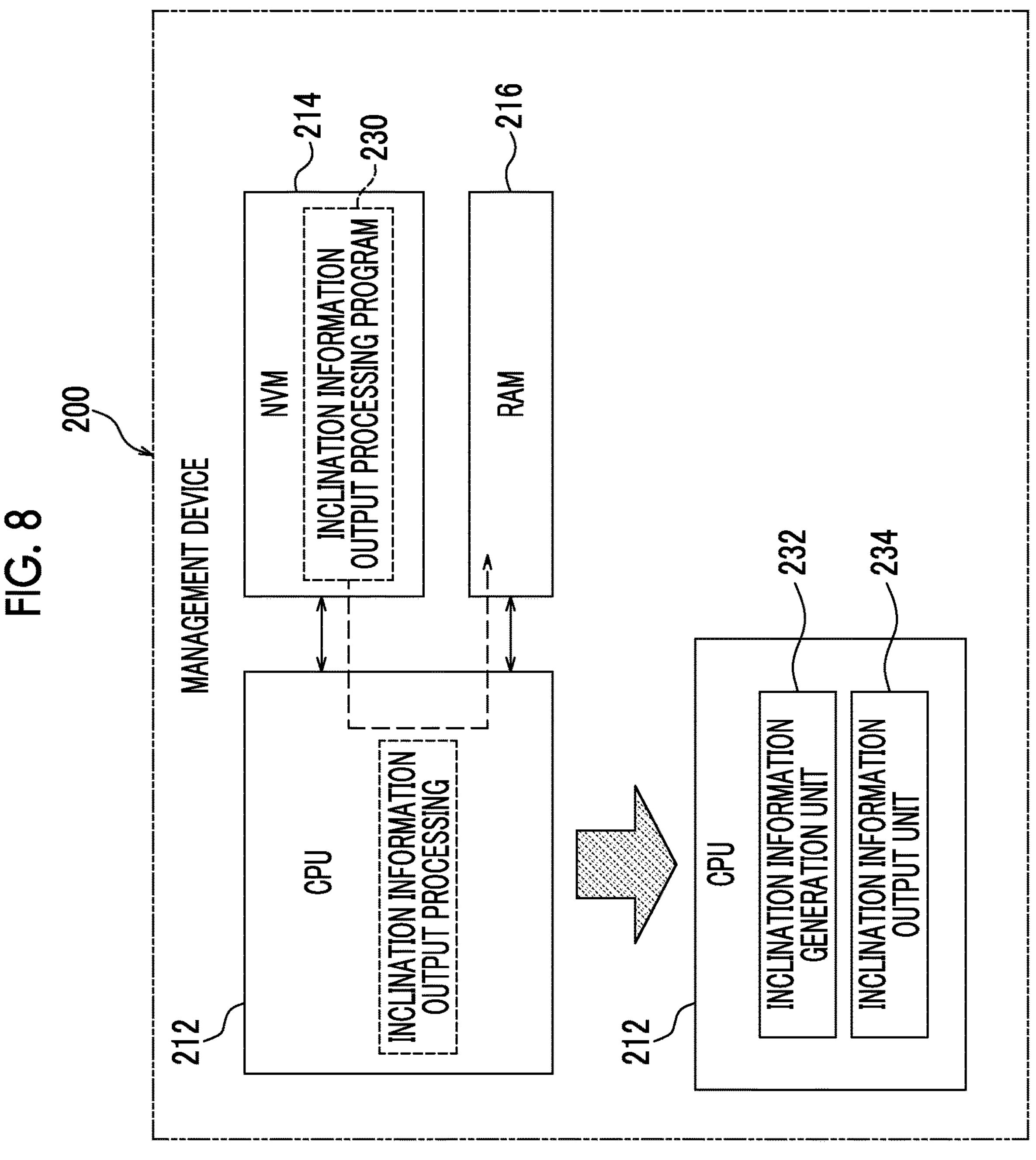
FIG. 8 is a block diagram showing an example of a functional configuration of a CPU of the management device according to the first embodiment of the technology of the present disclosure.

As shown in FIG. 8 as an example, inclination information output processing (see FIG. 21), which will be described below, is realized by executing the inclination information output processing program 230 by the CPU 212 of the management device 200. In the example shown in FIG. 8, the inclination information output processing program 230 is stored in the NVM 214, and the CPU 212 reads out the inclination information output processing program 230 from the NVM 214 and executes the read out inclination information output processing program 230 on the RAM 216.

The CPU 212 performs the inclination information output processing according to the inclination information output processing program 230 executed on the RAM 216. The CPU 212 is operated as an inclination information generation unit 232 and an inclination information output unit 234 by executing the inclination information output processing program 230 on the RAM 216.

Figure 9:
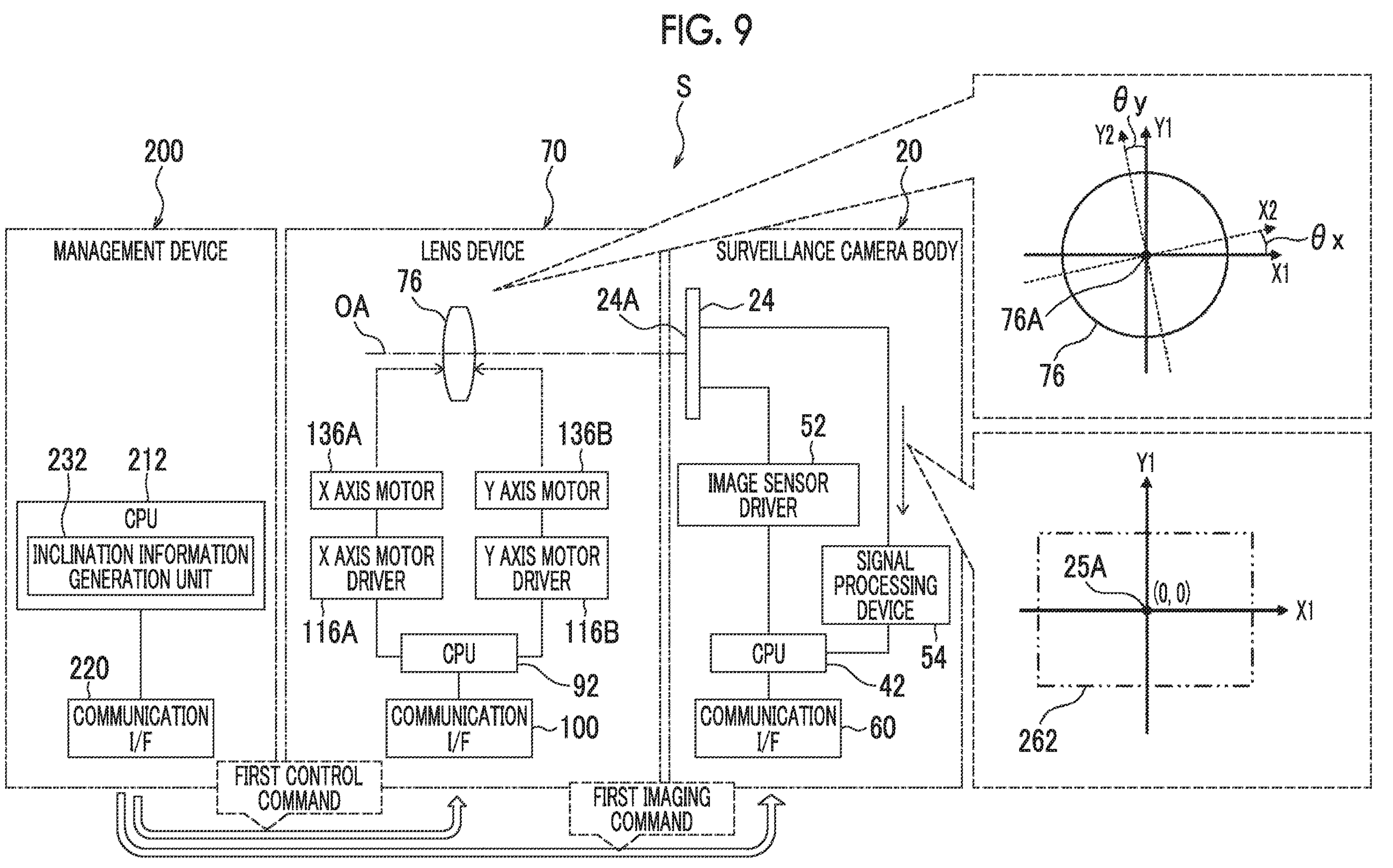
FIG. 9 is a block diagram showing an example of a configuration for acquiring a first image according to the first embodiment of the technology of the present disclosure.

As shown in FIG. 9 as an example, the center of an X2-Y2 coordinate system is a point at which the X2 axis and the Y2 axis intersect each other. The inclination information generation unit 232 moves the shake correction lens 76 to the center of the X2-Y2 coordinate system by controlling the X axis motor driver 116A and the Y axis motor driver 116B via the communication I/F 220 of the management device 200, the communication I/F 100 of the lens device 70, and the CPU 92 of the lens device 70. In this case, for example, the inclination information generation unit 232 outputs a first control command, which is a command for moving the shake correction lens 76 to the center of the X2-Y2 coordinate system, to the CPU 92 of the lens device 70 via the communication I/F 220 of the management device 200 and the communication I/F 100 of the lens device 70. The CPU 92 of the lens device 70 moves the shake correction lens 76 to the center of the X2-Y2 coordinate system by controlling the X axis motor 136A and the Y axis motor 136B via the X axis motor driver 116A and the Y axis motor driver 116B in response to the first control command input from the inclination information generation unit 232.

As a result, the shake correction lens 76 is moved to the center of the X2-Y2 coordinate system. It should be noted that the position of the shake correction lens 76 is defined with a center 76A of the shake correction lens 76 as a reference. Therefore, in a case in which the shake correction lens 76 is moved to the center of the X2-Y2 coordinate system, the center 76A of the shake correction lens 76 is positioned at the center of the X2-Y2 coordinate system. In a state in which the center 76A of the shake correction lens 76 is positioned at the center of the X2-Y2 coordinate system, a subject image 25A is positioned at coordinates (0, 0) of an X1-Y1 coordinate system. The coordinates (0, 0) of the X1-Y1 coordinate system are the center of the X1-Y1 coordinate system, and the center of the X1-Y1 coordinate system is a point at which the X1 axis and the Y1 axis intersect each other.

In addition, the inclination information generation unit 232 causes the image sensor 24 to perform the imaging by controlling the image sensor driver 52 via the communication I/F 220 of the management device 200, the communication I/F 60 of the surveillance camera body 20, and the CPU 42 of the surveillance camera body 20. In this case, for example, the inclination information generation unit 232 outputs a first imaging command, which is a command for causing the image sensor 24 to perform the imaging, to the CPU 42 of the surveillance camera body 20 via the communication I/F 220 of the management device 200 and the communication I/F 60 of the surveillance camera body 20. The CPU 42 of the surveillance camera body 20 causes the image sensor 24 to perform the imaging by controlling the image sensor driver 52 in response to the first imaging command input from the inclination information generation unit 232.

As a result, a first image 262 is obtained by capturing the image by the image sensor 24. The signal processing device 54 acquires the first image 262 from the image sensor 24. The signal processing device 54 performs signal processing with respect to the first image 262 acquired from the image sensor 24, and outputs the first image 262, which has been subjected to the signal processing, to the CPU 42. The CPU 42 stores the first image 262, which is input from the signal processing device 54, in the NVM 44 and/or the RAM 46 (see FIG. 4).

Figure 10:
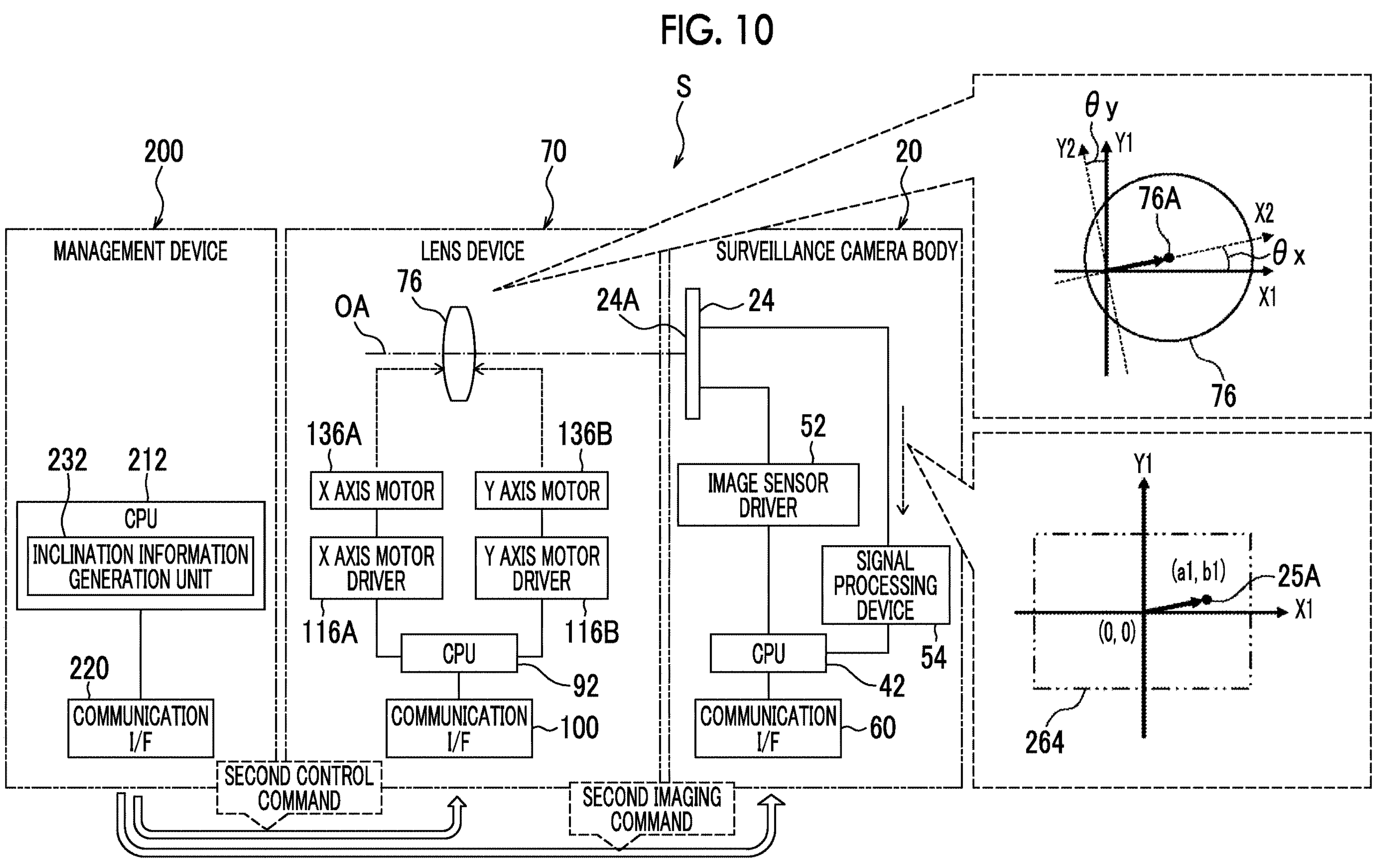
FIG. 10 is a block diagram showing an example of a configuration for acquiring a second image according to the first embodiment of the technology of the present disclosure.

As shown in FIG. 10 as an example, the inclination information generation unit 232 performs control of moving the shake correction lens 76 along the X2 axis. The inclination information generation unit 232 moves the shake correction lens 76 along the X2 axis by a predetermined first movement amount by controlling the X axis motor driver 116A. In this case, for example, the inclination information generation unit 232 outputs a second control command, which is a command for moving the shake correction lens 76 along the X2 axis by the predetermined first movement amount, to the CPU 92 of the lens device 70 via the communication I/F 220 of the management device 200 and the communication I/F 100 of the lens device 70. The CPU 92 of the lens device 70 moves the shake correction lens 76 along the X2 axis by the first movement amount by controlling the X axis motor 136A via the X axis motor driver 116A in response to the second control command input from the inclination information generation unit 232.

As a result, the center 76A of the shake correction lens 76 is moved from the center of the X2-Y2 coordinate system along the X2 axis by the first movement amount, and the subject image 25A is moved from the coordinates (0, 0) to coordinates (a1, b1) in the X1-Y1 coordinate system.

The inclination information generation unit 232 causes the image sensor 24 to perform the imaging by controlling the image sensor driver 52 via the communication I/F 220 of the management device 200, the communication I/F 60 of the surveillance camera body 20, and the CPU 42 of the surveillance camera body 20. In this case, for example, the inclination information generation unit 232 outputs a second imaging command, which is a command for causing the image sensor 24 to perform the imaging, to the CPU 42 of the surveillance camera body 20 via the communication I/F 220 of the management device 200 and the communication I/F 60 of the surveillance camera body 20. The CPU 42 of the surveillance camera body 20 causes the image sensor 24 to perform the imaging by controlling the image sensor driver 52 in response to the second imaging command input from the inclination information generation unit 232.

As a result, a second image 264 is obtained by capturing the image by the image sensor 24. The signal processing device 54 acquires the second image 264 from the image sensor 24. The signal processing device 54 performs signal processing with respect to the second image 264 acquired from the image sensor 24, and outputs the second image 264, which has been subjected to the signal processing, to the CPU 42. The CPU 42 stores the second image 264, which is input from the signal processing device 54, in the NVM 44 and/or the RAM 46 (see FIG. 4).

Figure 11:
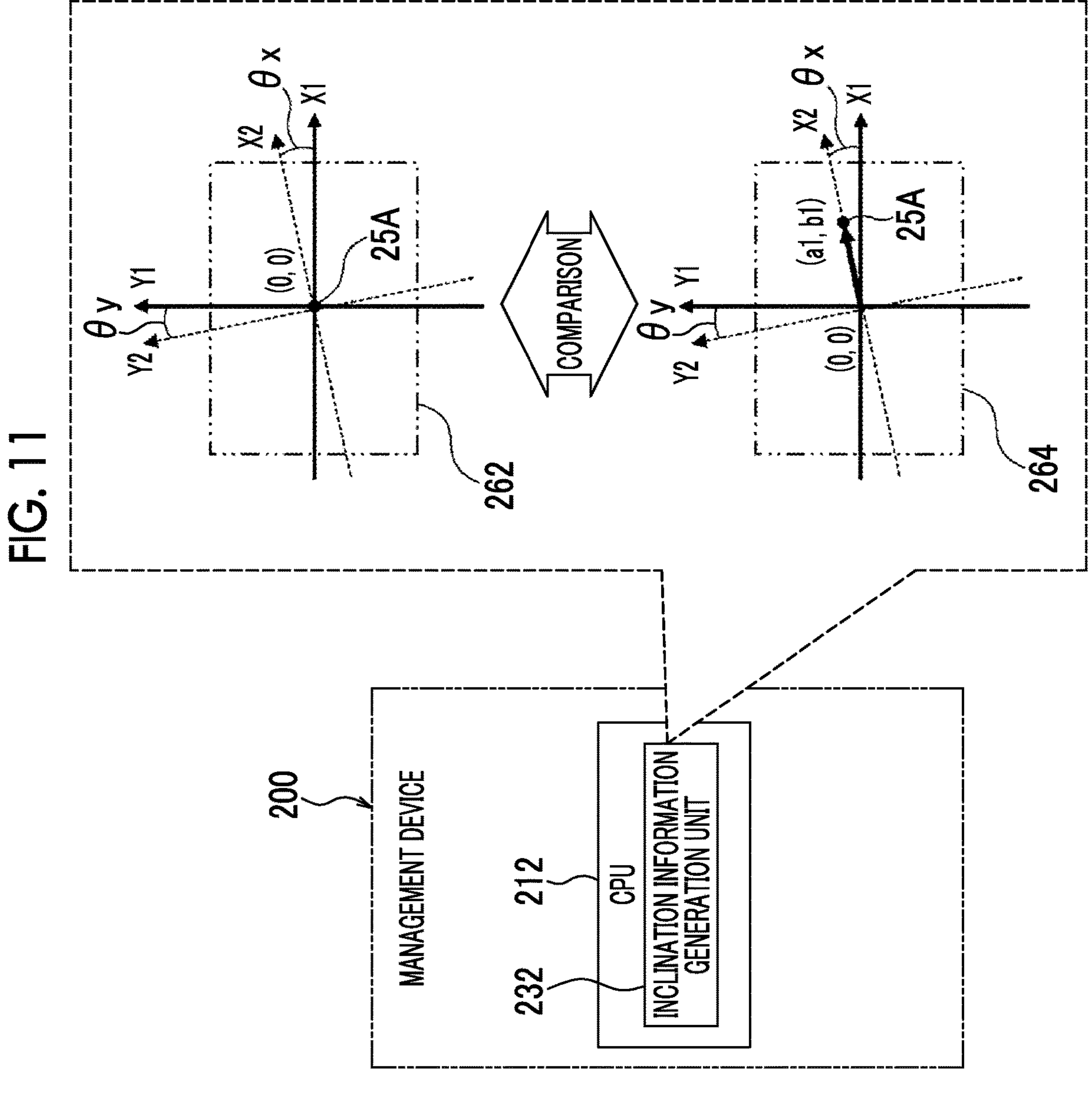
FIG. 11 is a block diagram showing an example of a configuration for calculating an inclination angle θx according to the first embodiment of the technology of the present disclosure.

As shown in FIG. 11 as an example, the inclination information generation unit 232 compares the first image 262 obtained based on the first imaging command described above with the second image 264 obtained based on the second imaging command described above. Then, the inclination information generation unit 232 calculates a position in the second image 264 to which the image corresponding to the subject image 25A positioned at a location corresponding to the coordinates (0, 0) of the first image 262 in the X1-Y1 coordinate system is moved, by a first image analysis based on the first image 262 and the second image 264. It is possible to apply various image analysis methods to the first image analysis. Hereinafter, for convenience, the description will be made on the assumption that the X1-Y1 coordinate system is also applied to the first image 262 and the second image 264. In the example shown in FIG. 11, as an example, the image corresponding to the subject image 25A is moved from the coordinates (0, 0) of the first image 262 to the coordinates (a1, b1) of the second image 264. Accordingly, the inclination information generation unit 232 calculates the inclination angle θx of the X2 axis with respect to the X1 axis by Expression (1).

$$\theta x=\tan^{-1}(b1/a1) \quad (1)$$

Figure 12:
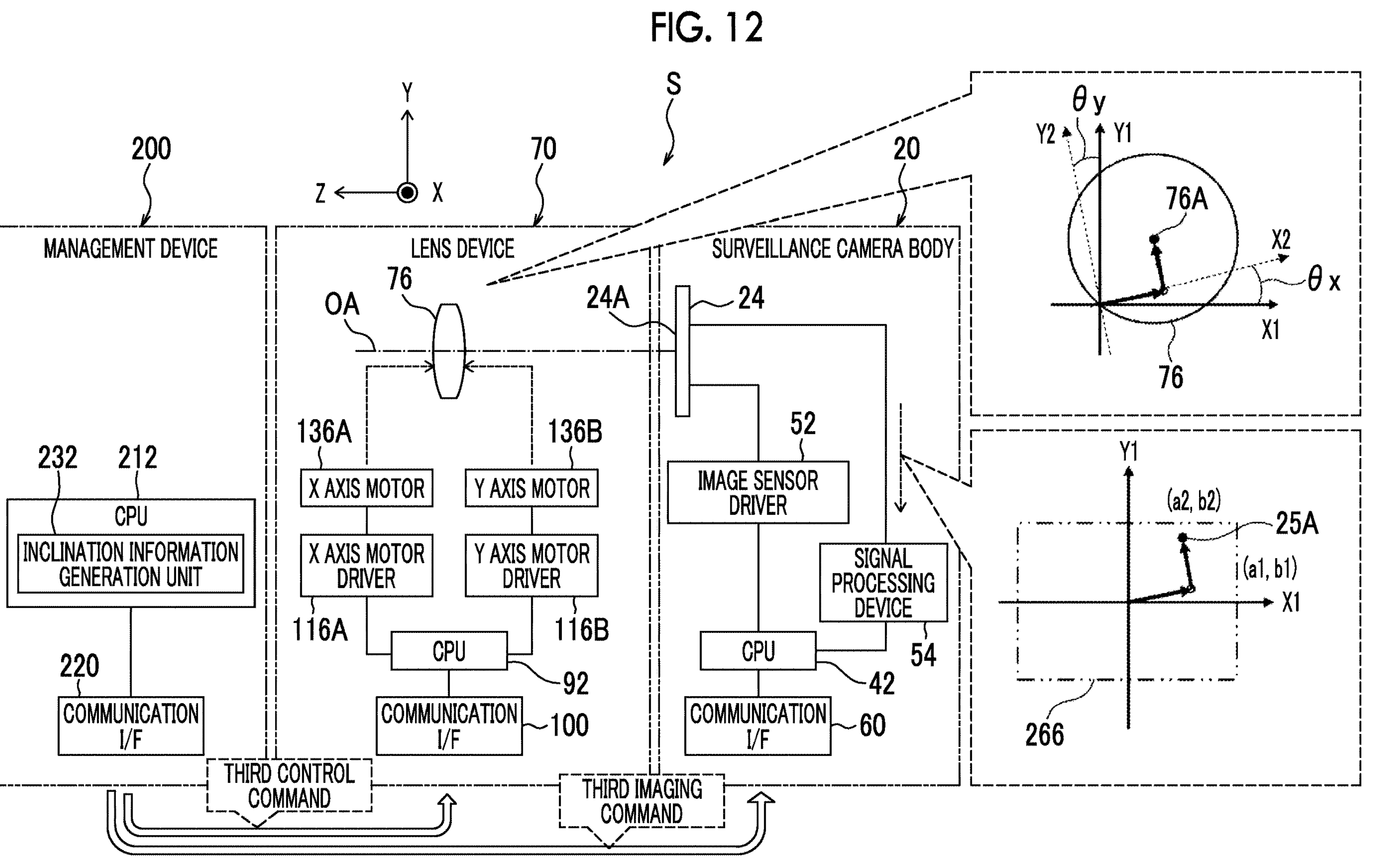
FIG. 12 is a block diagram showing an example of a configuration for acquiring a third image according to the first embodiment of the technology of the present disclosure.

As shown in FIG. 12 as an example, the inclination information generation unit 232 performs control of moving the shake correction lens 76 along the Y2 axis. The inclination information generation unit 232 moves the shake correction lens 76 along the Y2 axis by a predetermined second movement amount by controlling the Y axis motor driver 116B. In this case, for example, the inclination information generation unit 232 outputs a third control command, which is a command for moving the shake correction lens 76 along the Y2 axis by the predetermined second movement amount, to the CPU 92 of the lens device 70 via the communication I/F 220 of the management device 200 and the communication I/F 100 of the lens device 70. The CPU 92 of the lens device 70 moves the shake correction lens 76 along the Y2 axis by the second movement amount by controlling the Y axis motor 136B via the Y axis motor driver 116B in response to the third control command input from the inclination information generation unit 232.

As a result, the center 76A of the shake correction lens 76 is moved from the position on the X2 axis along the Y2 axis by the second movement amount, and the subject image 25A is moved from the coordinates (a1, b1) to coordinates (a2, b2) in the X1-Y1 coordinate system.

The inclination information generation unit 232 causes the image sensor 24 to perform the imaging by controlling the image sensor driver 52 via the communication I/F 220 of the management device 200, the communication I/F 60 of the surveillance camera body 20, and the CPU 42 of the surveillance camera body 20. In this case, for example, the inclination information generation unit 232 outputs a third imaging command, which is a command for causing the image sensor 24 to perform the imaging, to the CPU 42 of the surveillance camera body 20 via the communication I/F 220 of the management device 200 and the communication I/F 60 of the surveillance camera body 20. The CPU 42 of the surveillance camera body 20 causes the image sensor 24 to perform the imaging by controlling the image sensor driver 52 in response to the third imaging command input from the inclination information generation unit 232.

As a result, a third image 266 is obtained by capturing the image by the image sensor 24. The signal processing device 54 acquires third image 266 from the image sensor 24. The signal processing device 54 performs signal processing with respect to the third image 266 acquired from the image sensor 24, and outputs the third image 266, which has been subjected to the signal processing, to the CPU 42. The CPU 42 stores the third image 266, which is input from the signal processing device 54, in the NVM 44 and/or the RAM 46 (see FIG. 4).

Figure 13:
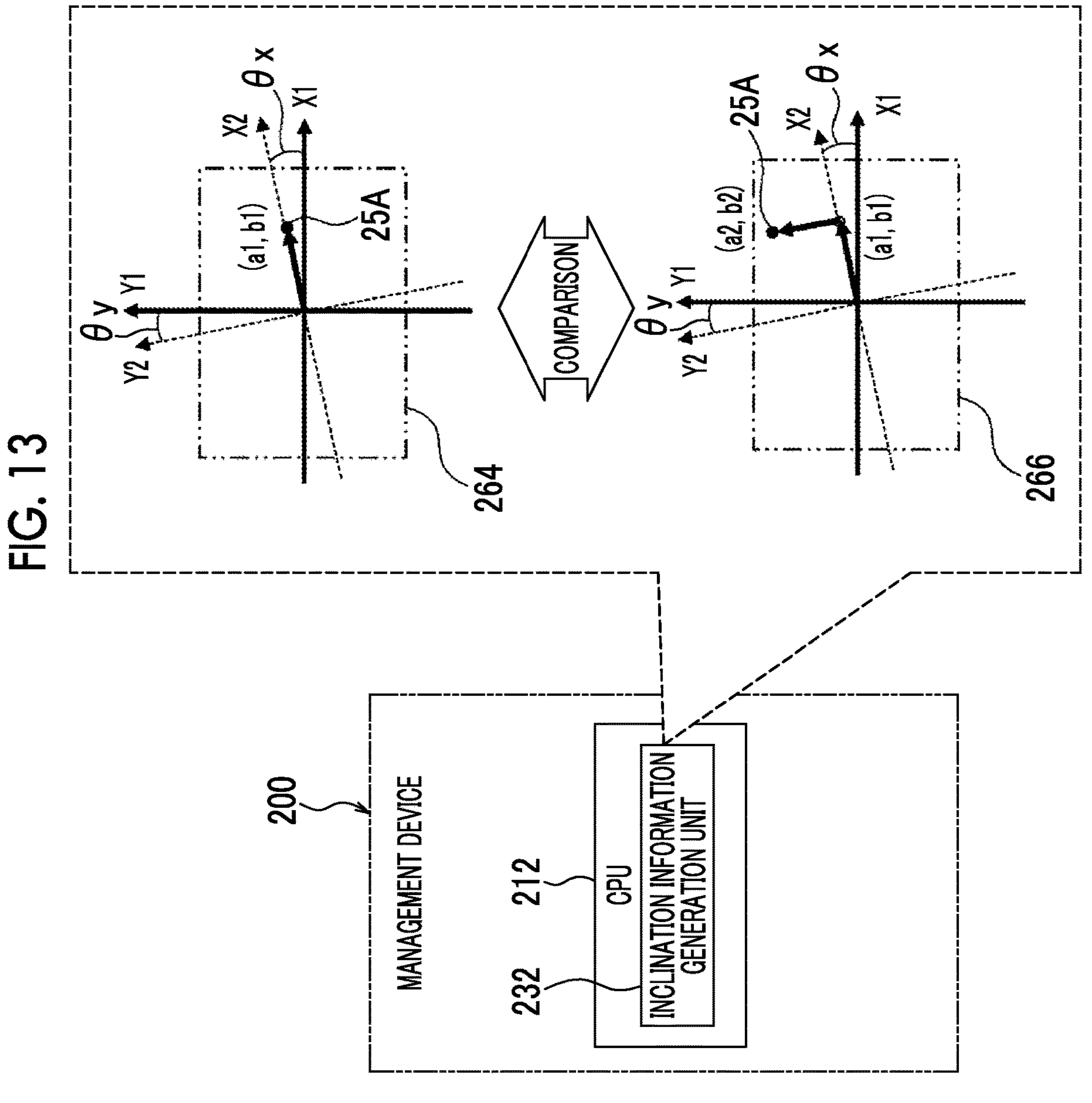
FIG. 13 is a block diagram showing an example of a configuration for calculating an inclination angle θy according to the first embodiment of the technology of the present disclosure.

As shown in FIG. 13 as an example, the inclination information generation unit 232 compares the second image 264 obtained based on the second imaging command described above with the third image 266 obtained based on the third imaging command described above. Then, the inclination information generation unit 232 calculates a position in the third image 266 to which the image corresponding to the subject image 25A positioned at a location corresponding to the coordinates (a1, b1) of the first image 262 in the X1-Y1 coordinate system is moved, by a second image analysis based on the second image 264 and the third image 266. It is possible to apply various image analysis methods to the second image analysis. Hereinafter, for convenience, the description will be made on the assumption that the X1-Y1 coordinate system is also applied to the first image 262 and the second image 264. In the example shown in FIG. 13, as an example, the image corresponding to the subject image 25A is moved from the coordinates (a1, b1) of the second image 264 to the coordinates (a2, b2) of the third image 266. Accordingly, the inclination information generation unit 232 calculates the inclination angle θy of the X2 axis with respect to the X1 axis by Expression (2).

$$\theta y=\tan^{-1}\{(b2-b1)/(a2-a1)\} \quad (2)$$

It should be noted that, for example, the first imaging command, the second imaging command, and the third imaging command are commands for causing the image sensor 24 to which the sensitivity lower than the sensitivity of the image sensor 24 that performs normal imaging is applied, to perform the imaging. The normal imaging is imaging performed based on a normal imaging command different from the first imaging command, the second imaging command, and the third imaging command. Examples of the normal imaging include imaging in a case in which a surveillance activity is performed by using the surveillance camera 10. As a result, the first image 262, the second image 264, and the third image 266 are obtained by performing the imaging by the image sensor 24 under an imaging condition in which an image having less noise than the image obtained by the normal imaging is obtained. In order to reduce the sensitivity of the image sensor 24, it is necessary to relatively lengthen an exposure time, but since the surveillance camera 10 and the subject are stationary during the calculation of the inclination angles θx and θy, the influence of lengthening the exposure time is small.

In the above manner, the inclination information generation unit 232 generates inclination information related to the inclination angle θx of the X2 axis with respect to the X1 axis and inclination information related to the inclination angle θy of the Y2 axis with respect to the Y1 axis. The inclination information related to the inclination angle θx is information calculated based on the second control command for moving the shake correction lens 76 along the X2 axis, and the first image 262 and the second image 264 obtained by being captured by the image sensor 24 before and after the shake correction lens 76 is moved based on the second control command. In addition, the inclination information related to the inclination angle θy is information calculated based on the third control command for moving the shake correction lens 76 along the Y2 axis, and the second image 264 and the third image 266 obtained by being captured by the image sensor 24 before and after the shake correction lens 76 is moved based on the third control command. It should be noted that the second control command and the third control command are examples of a "control command" according to the technology of the present disclosure, and the first image 262, the second image 264, and the third image 266 are examples of a "plurality of images" according to the technology of the present disclosure.

As an example, as shown in FIG. 14, the inclination information output unit 234 outputs the inclination information related to the inclination angle θx and the inclination angle θy to the CPU 92 of the lens device 70 via the communication I/F 220 of the management device 200 and the communication I/F 100 of the lens device 70.

(Functional Configuration of CPU of Lens Device)

Figure 15:
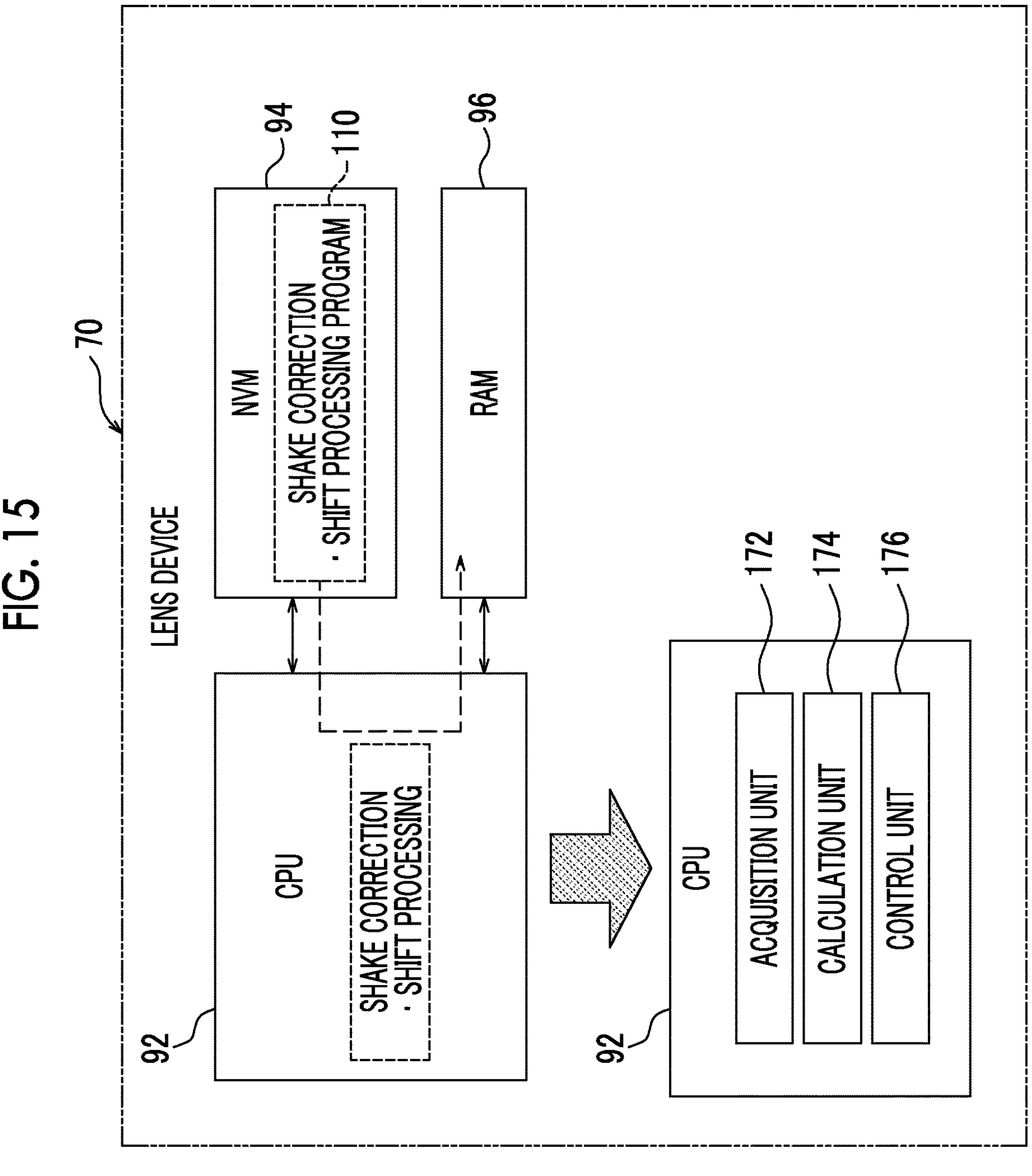
FIG. 15 is a block diagram showing an example of a functional configuration of a CPU of the lens device according to the first embodiment of the technology of the present disclosure.

As shown in FIG. 15 as an example, shake correction/shift processing (see FIGS. 22 and 23), which will be described below, is realized by the CPU 92 of the lens device 70 executing the shake correction/shift processing program 110. The shake correction/shift processing program 110 is an example of a "program" according to the technology of the present disclosure. In the example shown in FIG. 15, the shake correction/shift processing program 110 is stored in the NVM 94, and the CPU 92 reads out the shake correction/shift processing program 110 from the NVM 94 and executes the read out shake correction/shift processing program 110 on the RAM 96.

The CPU 92 performs the shake correction/shift processing according to the shake correction/shift processing program 110 executed on the RAM 96. By executing the shake correction/shift processing program 110 on the RAM 96, the CPU 92 is operated as an acquisition unit 172, a calculation unit 174, and a control unit 176. It should be noted that, although the details will be described below, the shake correction/shift processing is processing including shift processing (see FIG. 22) and shake correction processing (see FIG. 23).

As shown in FIG. 16 as an example, the CPU 42 of the surveillance camera body 20 outputs an image shift command and frame period information to the CPU 42 of the surveillance camera body 20 via the communication I/F 60 of the surveillance camera body 20 and the communication I/F 100 of the lens device 70. The acquisition unit 172 acquires the image shift command and the frame period information which are output from the CPU 42 of the surveillance camera body 20. The image shift command is command information for requesting the shift of the image. The image shift command is classified into an X axis image shift command indicating the shift and the shift amount of the image in the X axis direction, a Y axis image shift command indicating the shift and the shift amount of the image in the Y axis direction, and an XY axis image shift command indicating the shift and the shift amount of the image in the X axis direction and the Y axis direction.

The shift amount of the image is defined, for example, by a pitch equal to or larger than a pixel pitch of the image sensor 24 or a pitch smaller than the pixel pitch of the image sensor 24. The pitch equal to or larger than the pixel pitch of the image sensor 24 is, for example, 1 pitch, 1.5 pitches, 2.5 pitches, or 3.5 pitches. In a case in which the pixel pitch of the image sensor 24 is denoted by p, the natural number is denoted by n, and the pure decimal is denoted by d, the pitch larger than the pixel pitch of the image sensor 24 is defined by (n+d)×p. The pitch smaller than the pixel pitch of the image sensor 24 is, for example, 0.25 pitches, 0.5 pitches, or 0.75 pitches. In a case in which the pixel pitch of the image sensor 24 is denoted by p and the decimal smaller than 1 is denoted by D, the pitch smaller than the pixel pitch of the image sensor 24 is defined by D×p.

The frame period information is information defining a frame period synchronized with the timing control signal output from the CPU 42 to the image sensor driver 52. The frame period is a period in which the imaging is performed in units of frames.

Further, the CPU 212 of the management device 200 outputs the inclination information to the CPU 42 of the surveillance camera body 20 via the communication I/F 220 of the management device 200 and the communication I/F 100 of the lens device 70. The acquisition unit 172 acquires the inclination information output from the CPU 212 of the management device 200. The acquisition unit 172 stores the inclination information, which is acquired from the CPU 212 of the management device 200, in the NVM 94 (see FIG. 5). The inclination information includes the inclination information related to the inclination angle θx of the X2 axis with respect to the X1 axis and the inclination information related to the inclination angle θy of the Y2 axis with respect to the Y1 axis. Moreover, the acquisition unit 172 acquires the position detection result by the X axis position sensor 156A and the position detection result by the Y axis position sensor 156B.

In a case in which the X axis image shift command is acquired by the acquisition unit 172, the calculation unit 174 calculates a movement amount A1 of the shake correction lens 76 for each frame period based on the shift amount of the image indicated by the X axis image shift command, the frame period indicated by the frame period information, and the position detection result by the X axis position sensor 156A. For example, in a case in which the shift amount of the image indicated by the X axis image shift command is the same pitch as the pixel pitch of the image sensor 24, the calculation unit 174 calculates the movement amount A1 of the shake correction lens 76 that shifts the image by the same pitch as the pixel pitch of the image sensor 24. In addition, in a case in which the shift amount of the image indicated by the X axis image shift command is the pitch larger than the pixel pitch of the image sensor 24, the calculation unit 174 calculates the movement amount A1 of the shake correction lens 76 that shifts the image in an X1 axis direction by (n+d)×p. In addition, in a case in which the shift amount of the image indicated by the X axis image shift command is the pitch smaller than the pixel pitch of the image sensor 24, the calculation unit 174 calculates the movement amount A1 of the shake correction lens 76 that shifts the image in an X1 axis direction by D×p.

By the way, as described above, in a state in which the lens device 70 is mounted on the lens mount 22 of the surveillance camera body 20, there is a possibility that the X2 axis of the lens device 70 is inclined with respect to the X1 axis of the surveillance camera body 20, due to the influence of rattling and/or deformation of the lens mount 22. For example, in the example shown in FIG. 16, the X2 axis of the lens device 70 is inclined with respect to the X1 axis of the surveillance camera body 20 at the inclination angle θx. Therefore, in order to move the shake correction lens 76 along the X1 axis by the movement amount A1, it is required to move the shake correction lens 76 to the X2 axis and the Y2 axis by the X axis motor 136A and the Y axis motor 136B, respectively.

Accordingly, the calculation unit 174 calculates the movement amount A1 based on the shift amount of the image indicated by the image shift command described above, and calculates each of a movement amount Ax of the shake correction lens 76 along the X2 axis and a movement amount Ay of the shake correction lens 76 along the Y2 axis based on the calculated movement amount A1 and the inclination angle θx indicated by the inclination information acquired by the acquisition unit 172. In other words, the calculation unit 174 calculates the movement amount Ax of the shake correction lens 76 along the X2 axis by Expression (3), and calculates the movement amount Ay of the shake correction lens 76 along the Y2 axis by Expression (4).

$$Ax = A1 \times \cos\theta y / \cos(\theta y - \theta x) \tag{3}$$

$$Ay = -A1 \times \sin\theta x / \cos(\theta y - \theta x) \tag{4}$$

The movement amount Ax is calculated as a positive value in a case in which the shake correction lens 76 is moved in a positive direction of the X2 axis, and is calculated as a negative value in a case in which the shake correction lens 76 is moved in a negative direction of the X2 axis. Similarly, the movement amount Ay is calculated as a positive value in a case in which the shake correction lens 76 is moved in a positive direction of the Y2 axis, and is calculated as a negative value in a case in which the shake correction lens 76 is moved in a negative direction of the Y2 axis. The movement amount Ax is an example of a "first movement amount" according to the technology of the present disclosure, and the movement amount Ay is an example of a "second movement amount" according to the technology of the present disclosure.

Similarly, as shown in FIG. 17 as an example, in a case in which the Y axis image shift command is acquired by the acquisition unit 172, the calculation unit 174 calculates a movement amount B1 of the shake correction lens 76 for each frame period based on the shift amount of the image indicated by the Y axis image shift command, the frame period indicated by the frame period information, and the position detection result by the Y axis position sensor 156B. For example, in a case in which the shift amount of the image indicated by the Y axis image shift command is the same pitch as the pixel pitch of the image sensor 24, the calculation unit 174 calculates the movement amount B1 of the shake correction lens 76 that shifts the image by the same pitch as the pixel pitch of the image sensor 24. In addition, in a case in which the shift amount of the image indicated by the Y axis image shift command is the pitch larger than the pixel pitch of the image sensor 24, the calculation unit 174 calculates the movement amount B1 of the shake correction lens 76 that shifts the image in the Y1 axis direction by (n+d)×p. In addition, in a case in which the shift amount of the image indicated by the Y axis image shift command is the pitch smaller than the pixel pitch of the image sensor 24, the calculation unit 174 calculates the movement amount B1 of the shake correction lens 76 that shifts the image in the Y1 axis direction by D×p.

By the way, as described above, in a state in which the lens device 70 is mounted on the lens mount 22 of the surveillance camera body 20, there is a possibility that the Y2 axis of the lens device 70 is inclined with respect to the Y1 axis of the surveillance camera body 20, due to the influence of rattling and/or deformation of the lens mount 22. For example, in the example shown in FIG. 17, the Y2 axis of the lens device 70 is inclined with respect to the Y1 axis of the surveillance camera body 20 at the inclination angle θy. Therefore, in order to move the shake correction lens 76 along the Y1 axis by the movement amount B1, it is required to move the shake correction lens 76 to the X2 axis and the Y2 axis by the X axis motor 136A and the Y axis motor 136B, respectively.

Accordingly, the calculation unit 174 calculates the movement amount B1 based on the shift amount of the image indicated by the image shift command described above, and calculates each of a movement amount Bx of the shake correction lens 76 along the X2 axis and a movement amount By of the shake correction lens 76 along the Y2 axis based on the calculated movement amount B1 and the inclination angle θy indicated by the inclination information acquired by the acquisition unit 172. In other words, the calculation unit 174 calculates the movement amount Bx of the shake correction lens 76 along the X2 axis by Expression (5), and calculates the movement amount By of the shake correction lens 76 along the Y2 axis by Expression (6).

$$Bx=B1\times\sin\theta y/\cos(\theta y-\theta x) \tag{5}$$

$$By=B1\times\cos\theta x/\cos(\theta y-\theta x) \tag{6}$$

The movement amount Bx is calculated as a positive value in a case in which the shake correction lens 76 is moved in a positive direction of the X2 axis, and is calculated as a negative value in a case in which the shake correction lens 76 is moved in a negative direction of the X2 axis. Similarly, the movement amount By is calculated as a positive value in a case in which the shake correction lens 76 is moved in a positive direction of the Y2 axis, and is calculated as a negative value in a case in which the shake correction lens 76 is moved in a negative direction of the Y2 axis. The movement amount Bx is an example of the "first movement amount" according to the technology of the present disclosure, and the movement amount By is an example of the "second movement amount" according to the technology of the present disclosure.

In addition, in a case in which the XY axis image shift command is acquired by the acquisition unit 172, the calculation unit 174 calculates the movement amount A1 of the shake correction lens 76 in the same manner as in a case in which the X axis image shift command is acquired by the acquisition unit 172, and calculates the movement amount B1 of the shake correction lens 76 in the same manner as in a case in which the Y axis image shift command is acquired by the acquisition unit 172. Then, the calculation unit 174 calculates the movement amount of the shake correction lens 76 along the X2 axis and the movement amount of the shake correction lens 76 along the Y2 axis based on the movement amount A1 and the movement amount B1, which are calculated. In this case, the calculation unit 174 calculates the movement amount of the shake correction lens 76 along the X2 axis by adding the movement amount Ax, which is the positive value or the negative value, and the movement amount Bx, which is the positive value or the negative value, and calculates the movement amount of the shake correction lens 76 along the Y2 axis by adding the movement amount Ay, which is the positive value or the negative value, and the movement amount By, which is the positive value or the negative value.

The control unit 176 generates an X axis control command for each frame period according to the movement amount of the shake correction lens 76 along the X2 axis calculated by the calculation unit 174. The X axis control command is output to the X axis motor driver 116A by the control unit 176. Similarly, the control unit 176 generates a Y axis control command for each frame period according to the movement amount of the shake correction lens 76 along the Y2 axis calculated by the calculation unit 174. The Y axis control command is output to the Y axis motor driver 116B by the control unit 176.

The X axis motor driver 116A generates an X axis operation signal based on the X axis control command input from the control unit 176. The Y axis motor driver 116B generates a Y axis operation signal based on the Y axis control command input from the control unit 176. The X axis motor 136A is operated by an operation amount according to the X axis operation signal, and the Y axis motor 136B is operated by an operation amount according to the Y axis operation signal. As a result, the shake correction lens 76 is moved in a direction for shifting the image along the X1 axis and/or the Y1 axis for each frame period, and the image is shifted along the X1 axis and/or the Y1 axis.

The control of shifting the image by the control unit 176 is sequence control that is not based on the shake amount detection result (that is, the shake amount of the surveillance camera 10) by the shake amount detection sensor 56 and is based on predetermined shift sequence.

Figure 18:
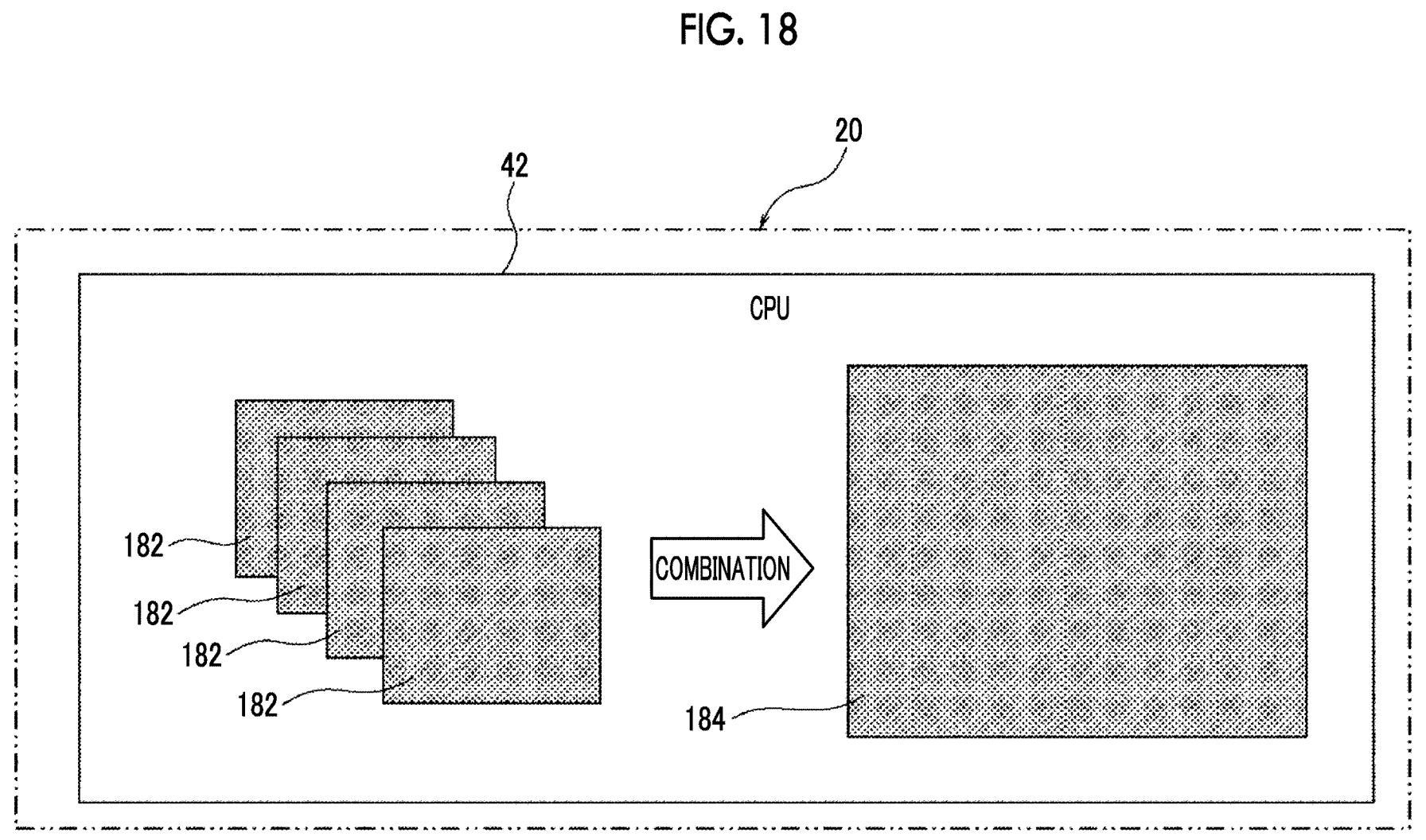

Then, the image is shifted for each frame period, and the CPU 42 of the surveillance camera body 20 performs, with respect to the image sensor 24, control of performing the imaging each time the image is shifted. As a result, as shown in FIG. 18 as an example, images 182 of a plurality of frames corresponding to the frame periods, respectively, are obtained. Then, a composite image 184 is obtained by combining the images 182 of the plurality of frames by the CPU 42 of the surveillance camera body 20.

The composite image 184 is obtained, for example, as follows. That is, in a case in which the shift amount of the image is the same pitch as the pixel pitch of the image sensor 24, the composite image 184 is obtained from the images 182 of the plurality of frames by superimposing a plurality of image pixels forming one image and a plurality of image pixels forming the other image among the images 182 of the plurality of frames. The composite image 184 obtained in this way is an image that does not require the demosaicing processing. In addition, in a case in which the shift amount of the image is the pitch larger than the pixel pitch of the image sensor 24 or in a case in which the shift amount of the image is the pitch smaller than the pixel pitch of the image sensor 24, the composite image 184 is obtained from the images 182 of the plurality of frames by allocating a plurality of image pixels forming one image between a plurality of image pixels forming the other image among the images 182 of the plurality of frames. The composite image 184 obtained in this way is an image having a higher resolution than the images 182 of the plurality of frames.

Figure 19:
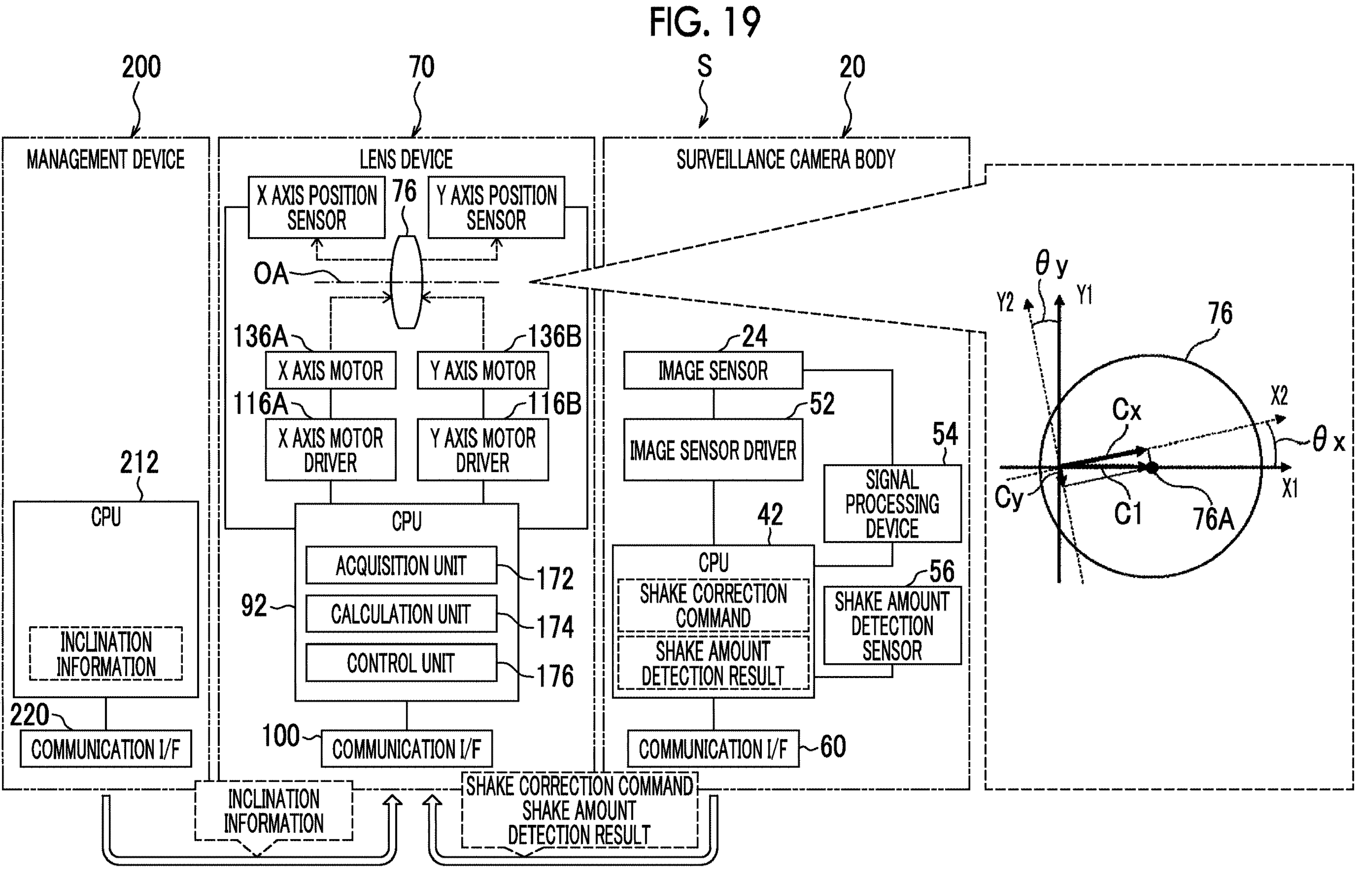
FIG. 19 is a block diagram showing an example of a configuration for executing shake correction processing of correcting a shake of the image according to the first embodiment of the technology of the present disclosure in the X1 axis direction.

In addition, as shown in FIG. 19 as an example, the CPU 42 of the surveillance camera body 20 outputs a shake correction command to the CPU 42 of the surveillance camera body 20 via the communication I/F 60 of the surveillance camera body 20 and the communication I/F 100 of the lens device 70. The acquisition unit 172 acquires the shake correction command output from the CPU 42 of the surveillance camera body 20 and the shake amount detection result by the shake amount detection sensor 56. The shake correction command is command information for requesting the shake correction, and the shake amount detection result by the shake amount detection sensor 56 is information indicating a result of the detection of the shake amount of the surveillance camera 10.

Further, the CPU 212 of the management device 200 outputs the inclination information to the CPU 212 of the management device 200 via the communication I/F 220 of the management device 200 and the communication I/F 100 of the lens device 70. The acquisition unit 172 acquires the inclination information output from the CPU 212 of the management device 200. The inclination information includes the inclination information related to the inclination angle θx of the X2 axis with respect to the X1 axis and the inclination information related to the inclination angle θy of the Y2 axis with respect to the Y1 axis. Moreover, the acquisition unit 172 acquires the position detection result by the X axis position sensor 156A and the position detection result by the Y axis position sensor 156B.

In a case in which the shake correction command is acquired by the acquisition unit 172, the calculation unit 174 calculates a movement amount C1 of the shake correction lens 76 for correcting the shake of the image in the X1 axis direction based on the shake amount detection result by the shake amount detection sensor 56. Specifically, the calculation unit 174 calculates the movement amount C1 of the shake correction lens 76 for restoring the position in the X1 axis direction of the image shaken due to the shake of the surveillance camera 10 to the position in the X1 axis direction of the image before the shake of the surveillance camera 10 occurs. The movement amount C1 for correcting the shake of the image in the X1 axis direction may be determined in advance according to the shake amount detection result by the shake amount detection sensor 56, or may be calculated using various calculation expressions.

By the way, as described above, in a state in which the lens device 70 is mounted on the lens mount 22 of the surveillance camera body 20, there is the possibility that the X2 axis of the lens device 70 is inclined with respect to the X1 axis of the surveillance camera body 20, due to the influence of rattling and/or deformation of the lens mount 22. For example, in the example shown in FIG. 19, the X2 axis of the lens device 70 is inclined with respect to the X1 axis of the surveillance camera body 20 at the inclination angle θx. Therefore, in order to move the shake correction lens 76 along the X1 axis by the movement amount C1, it is required to move the shake correction lens 76 to the X2 axis and the Y2 axis by the X axis motor 136A and the Y axis motor 136B, respectively.

Accordingly, the calculation unit 174 calculates the movement amount C1 based on the shake amount detection result by the shake amount detection sensor 56, and calculates each of a movement amount Cx of the shake correction lens 76 along the X2 axis and a movement amount Cy of the shake correction lens 76 along the Y2 axis based on the calculated movement amount C1 and the inclination angle θx indicated by the inclination information acquired by the acquisition unit 172. In other words, the calculation unit 174 calculates the movement amount Cx of the shake correction lens 76 along the X2 axis by Expression (7), and calculates the movement amount Cy of the shake correction lens 76 along the Y2 axis by Expression (8).

$$Cx = C1 \times \cos\theta y / \cos(\theta y - \theta x) \quad (7)$$

$$Cy = -C1 \times \sin\theta x / \cos(\theta y - \theta x) \quad (8)$$

The movement amount Cx is calculated as a positive value in a case in which the shake correction lens 76 is moved in a positive direction of the X2 axis, and is calculated as a negative value in a case in which the shake correction lens 76 is moved in a negative direction of the X2 axis. Similarly, the movement amount Cy is calculated as a positive value in a case in which the shake correction lens 76 is moved in a positive direction of the Y2 axis, and is calculated as a negative value in a case in which the shake correction lens 76 is moved in a negative direction of the Y2 axis. The movement amount Cx is an example of the "first movement amount" according to the technology of the present disclosure, and the movement amount Cy is an example of the "second movement amount" according to the technology of the present disclosure.

Similarly, as shown in FIG. 20 as an example, in a case in which the shake correction command is acquired by the acquisition unit 172, the calculation unit 174 calculates a movement amount D1 of the shake correction lens 76 for correcting the shake of the image in the Y1 axis direction based on the shake amount detection result by the shake amount detection sensor 56. Specifically, the calculation unit 174 calculates the movement amount D1 of the shake correction lens 76 for restoring the position in the Y1 axis direction of the image shaken due to the shake of the surveillance camera 10 to the position in the Y1 axis direction of the image before the shake of the surveillance camera 10 occurs. The movement amount D1 for correcting the shake of the image in the Y1 axis direction may be determined in advance according to the shake amount detection result by the shake amount detection sensor 56, or may be calculated using various calculation expressions.

By the way, as described above, in a state in which the lens device 70 is mounted on the lens mount 22 of the surveillance camera body 20, there is the possibility that the Y2 axis of the lens device 70 is inclined with respect to the Y1 axis of the surveillance camera body 20, due to the influence of rattling and/or deformation of the lens mount 22. For example, in the example shown in FIG. 20, the Y2 axis of the lens device 70 is inclined with respect to the Y1 axis of the surveillance camera body 20 at the inclination angle θy. Therefore, in order to move the shake correction lens 76 along the Y1 axis by the movement amount D1, it is required to move the shake correction lens 76 to the X2 axis and the Y2 axis by the X axis motor 136A and the Y axis motor 136B, respectively.

Accordingly, the calculation unit 174 calculates the movement amount D1 based on the shake amount detection result by the shake amount detection sensor 56, and calculates each of a movement amount Dx of the shake correction lens 76 along the X2 axis and a movement amount Dy of the shake correction lens 76 along the Y2 axis based on the calculated movement amount D1 and the inclination angle θy indicated by the inclination information acquired by the acquisition unit 172. In other words, the calculation unit 174 calculates the movement amount Dx of the shake correction lens 76 along the X2 axis by Expression (9), and calculates the movement amount Dy of the shake correction lens 76 along the Y2 axis by Expression (10).

$$Dx=D1\times\sin\theta y/\cos(\theta y-\theta x) \quad (9)$$

$$Dy=D1\times\cos\theta x/\cos(\theta y-\theta x) \quad (10)$$

The movement amount Dx is calculated as a positive value in a case in which the shake correction lens 76 is moved in a positive direction of the Y2 axis, and is calculated as a negative value in a case in which the shake correction lens 76 is moved in a negative direction of the Y2 axis. Similarly, the movement amount Dy is calculated as a positive value in a case in which the shake correction lens 76 is moved in a positive direction of the X2 axis, and is calculated as a negative value in a case in which the shake correction lens 76 is moved in a negative direction of the X2 axis. The movement amount Dx is an example of the "first movement amount" according to the technology of the present disclosure, and the movement amount Dy is an example of the "second movement amount" according to the technology of the present disclosure.

In addition, in a case in which the shake correction lens 76 is simultaneously moved along the X1 axis and the Y1 axis in order to simultaneously correct the shake in the X1 axis direction and the shake in the Y1 axis direction of the image, the calculation unit 174 calculates the movement amount of the shake correction lens 76 along the X2 axis by adding the movement amount Cx, which is the positive value or the negative value and is calculated based on the movement amount C1 of the shake correction lens 76, and the movement amount Dx, which is the positive value or the negative value and is calculated based on the movement amount D1 of the shake correction lens 76. In addition, the calculation unit 174 calculates the movement amount of the shake correction lens 76 along the Y2 axis by adding the movement amount Cy, which is the positive value or the negative value and is calculated based on the movement amount C1 of the shake correction lens 76, and the movement amount Dy, which is the positive value or the negative value and is calculated based on the movement amount D1 of the shake correction lens 76.

Further, in a case in which the shift of the image and the correction of the shake of the image are simultaneously performed, the calculation unit 174 calculates the movement amount of the shake correction lens 76 along the X2 axis by adding a plurality of movement amounts selected from the movement amount Ax, which is the positive value or the negative value and is calculated based on the movement amount A1 of the shake correction lens 76, the movement amount Bx, which is the positive value or the negative value and is calculated based on the movement amount B1 of the shake correction lens 76, the movement amount Cx, which is the positive value or the negative value and is calculated based on the movement amount C1 of the shake correction lens 76, and the movement amount Dx, which is the positive value or the negative value and is calculated based on the movement amount D1 of the shake correction lens 76, according to the direction for shifting the image and the direction for correcting the shake of the image.

In addition, in a case in which the shift of the image and the correction of the shake of the image are simultaneously performed, the calculation unit 174 calculates the movement amount of the shake correction lens 76 along the Y2 axis by adding a plurality of movement amounts selected from the movement amount Ay, which is the positive value or the negative value and is calculated based on the movement amount A1 of the shake correction lens 76, the movement amount By, which is the positive value or the negative value and is calculated based on the movement amount B1 of the shake correction lens 76, the movement amount Cy, which is the positive value or the negative value and is calculated based on the movement amount C1 of the shake correction lens 76, and the movement amount Dy, which is the positive value or the negative value and is calculated based on the movement amount D1 of the shake correction lens 76, according to the direction for shifting the image and the direction for correcting the shake of the image.

The control unit 176 sets the movement amount of the shake correction lens 76 calculated by the calculation unit 174 along the X2 axis as a target value, and generates the X axis control command based on the position detection result by the X axis position sensor 156A. The X axis control command is output to the X axis motor driver 116A. Similarly, the control unit 176 sets the movement amount of the shake correction lens 76 calculated by the calculation unit 174 along the Y2 axis as a target value, and generates the Y axis control command based on the position detection result by the Y axis position sensor 156B. The Y axis control command is output to the Y axis motor driver 116B.

The X axis motor driver 116A generates the X axis operation signal based on the X axis control command, and the Y axis motor driver 116B generates the Y axis operation signal based on the Y axis control command. The X axis motor 136A is operated by the operation amount according to the X axis operation signal, and the Y axis motor 136B is operated by an operation amount according to the Y axis operation signal. As a result, the shake correction lens 76 is moved in the direction in which the shake of the image is corrected, and the shake of the image is corrected.

The control by the control unit 176 of correcting the shake of the image is the feedback control based on the shake amount detection result (that is, the shake amount of the surveillance camera 10) by the shake amount detection sensor 56.

Hereinafter, an action of the surveillance system S (that is, an operation of the surveillance system S) according to the first embodiment will be described.

First, the inclination information output processing executed by the CPU 212 of the management device 200 will be described with reference to FIG. 21.

In step ST100, first, the inclination information generation unit 232 (see FIG. 9) moves the shake correction lens 76 to the center of the X2-Y2 coordinate system. That is, the inclination information generation unit 232 outputs the first control command to the CPU 92 of the lens device 70. In a case in which the first control command output from the management device 200 is received, the CPU 92 of the lens device 70 performs, with respect to the X axis motor 136A and the Y axis motor 136B, control of moving the shake correction lens 76 to the center of the X2-Y2 coordinate system via the X axis motor driver 116A and the Y axis motor driver 116B, respectively. As a result, the shake correction lens 76 is moved to the center of the X2-Y2 coordinate system.

In next step ST102, the inclination information generation unit 232 causes the image sensor 24 to perform the imaging to obtain the first image 262. That is, the inclination information generation unit 232 outputs the first imaging command to the CPU 42 of the surveillance camera body 20. In a case in which the first imaging command is received, the image sensor driver 52 performs, with respect to the image sensor 24, control of performing the imaging. As a result, the first image 262 is obtained by capturing the image by the image sensor 24.

In next step ST104, the inclination information generation unit 232 (see FIG. 10) moves the shake correction lens 76 along the X2 axis by the first movement amount. That is, the inclination information generation unit 232 outputs the second control command to the CPU 92 of the lens device 70. In a case in which the second control command output from the management device 200 is received, the CPU 92 of the lens device 70 performs, with respect to the X axis motor 136A, control of moving the shake correction lens 76 along the X2 axis by the first movement amount via the X axis motor driver 116A. As a result, the center 76A of the shake correction lens 76 is moved from the center of the X2-Y2 coordinate system along the X2 axis by the first movement amount, and the subject image 25A is moved from the coordinates (0, 0) to the coordinates (a1, b1) in the X1-Y1 coordinate system.

In next step ST106, the inclination information generation unit 232 causes the image sensor 24 to perform the imaging to obtain the second image 264. That is, the inclination information generation unit 232 outputs the second imaging command to the CPU 42 of the surveillance camera body 20. In a case in which the second imaging command is received, the image sensor driver 52 performs, with respect to the image sensor 24, control of performing the imaging. As a result, the second image 264 is obtained by capturing the image by the image sensor 24.

In next step ST108, the inclination information generation unit 232 (see FIG. 11) calculates the inclination angle θx of the X2 axis with respect to the X1 axis. That is, the inclination information generation unit 232 performs the first image analysis based on the first image 262 and the second image 264, and calculates the inclination angle θx of the X2 axis with respect to the X1 axis by Expression (1) in a case in which the subject image 25A positioned at the coordinates (0, 0) of the first image 262 in the X1-Y1 coordinate system is moved to the coordinates (a1, b1) of the second image 264.

$$\theta x = \tan^{-1}(b1/a1) \tag{1}$$

In next step ST110, the inclination information generation unit 232 (see FIG. 12) moves the shake correction lens 76 along the Y2 axis by the second movement amount. That is, the inclination information generation unit 232 outputs the third control command to the CPU 92 of the lens device 70. In a case in which the third control command output from the management device 200 is received, the CPU 92 of the lens device 70 performs, with respect to the Y axis motor 136B, control of moving the shake correction lens 76 along the Y2 axis by the second movement amount via the Y axis motor driver 116B. As a result, the center 76A of the shake correction lens 76 is moved from the position on the X2 axis along the Y2 axis by the second movement amount, and the subject image 25A is moved from the coordinates (a1, b1) to the coordinates (a2, b2) in the X1-Y1 coordinate system.

In next step ST112, the inclination information generation unit 232 causes the image sensor 24 to perform the imaging to obtain the third image 266. That is, the inclination information generation unit 232 outputs the third imaging command to the CPU 42 of the surveillance camera body 20. In a case in which the third imaging command is received, the image sensor driver 52 performs, with respect to the image sensor 24, control of performing the imaging. As a result, the third image 266 is obtained by capturing the image by the image sensor 24.

In next step ST114, the inclination information generation unit 232 (see FIG. 13) calculates the inclination angle θy of the Y2 axis with respect to the Y1 axis. That is, the inclination information generation unit 232 performs the second image analysis based on the second image 264 and the third image 266, and calculates the inclination angle θy of the Y2 axis with respect to the Y1 axis by Expression (2) in a case in which the subject image 25A positioned at the coordinates (a1, b1) of the second image 264 in the X1-Y1 coordinate system is moved to the coordinates (a2, b2) of the third image 266.

$$\theta y = \tan^{-1}\{(b2-b1)/(a2-a1)\} \tag{2}$$

In next step ST116, the inclination information output unit 234 (see FIG. 14) outputs the inclination information related to the inclination angle θx and the inclination angle θy to the CPU 92 of the lens device 70 via the communication I/F 220 of the management device 200 and the communication I/F 100 of the lens device 70.

Hereinafter, the shake correction/shift processing executed by the CPU 92 of the lens device 70 will be described. The shake correction/shift processing includes the shift processing (see FIG. 22) and the shake correction processing (see FIG. 23). The shift processing will be described first with reference to FIG. 22.

In step ST200, first, the acquisition unit 172 (see FIG. 16) acquires the image shift command output from the CPU 42 of the surveillance camera body 20.

In next step ST202, the acquisition unit 172 acquires the frame period information output from the CPU 42 of the surveillance camera body 20.

In next step ST204, the acquisition unit 172 acquires the inclination information output from the CPU 212 of the management device 200.

In next step ST206, the calculation unit 174 calculates the movement amount for shifting the image of the shake correction lens 76. That is, in a case in which the X axis image shift command is acquired by the acquisition unit 172 (see FIG. 16), the calculation unit 174 calculates the movement amount A1 of the shake correction lens 76 for each frame period based on the shift amount of the image indicated by the X axis image shift command, the frame period indicated by the frame period information, and the position detection result by the X axis position sensor 156A. In addition, in a case in which the Y axis image shift command is acquired by the acquisition unit 172 (see FIG. 17), the calculation unit 174 calculates the movement amount B1 of the shake correction lens 76 for each frame period based on the shift amount of the image indicated by the Y axis image shift command, the frame period indicated by the frame period information, and the position detection result by the Y axis position sensor 156B. In addition, in a case in which the XY axis image shift command is acquired by the acquisition unit 172 (see FIGS. 16 and 17), the calculation unit 174 calculates the movement amount A1 of the shake correction lens 76 for each frame period in the same manner as in a case in which the X axis image shift command is acquired by the acquisition unit 172, and calculates the movement amount B1 of the shake correction lens 76 for each frame period in the same manner as in a case in which the Y axis image shift command is acquired by the acquisition unit 172.

In next step ST208, the calculation unit 174 calculates the movement amount of the shake correction lens 76 along the X2 axis and the movement amount of the shake correction lens 76 along the Y2 axis, respectively. That is, in a case in which the X axis image shift command is acquired by the acquisition unit 172 (see FIG. 16), the calculation unit 174 calculates the movement amount Ax of the shake correction lens 76 along the X2 axis by Expression (3).

The movement amount Ay of the shake correction lens 76 along the Y2 axis is calculated by Expression (4).

$$Ax=A1\times\cos\theta y/\cos(\theta y-\theta x) \quad (3)$$

$$Ay=-A1\times\sin\theta x/\cos(\theta y-\theta x) \quad (4)$$

In addition, in a case in which the Y axis image shift command is acquired by the acquisition unit 172 (see FIG. 17), the calculation unit 174 calculates the movement amount Bx of the shake correction lens 76 along the X2 axis by Expression (5), and calculates the movement amount By of the shake correction lens 76 along the Y2 axis by Expression (6).

$$Bx=B1\times\sin\theta y/\cos(\theta y-\theta x) \quad (5)$$

$$By=B1\times\cos\theta x/\cos(\theta y-\theta x) \quad (6)$$

In addition, in a case in which the XY axis image shift command is acquired by the acquisition unit 172 (see FIGS. 16 and 17), the calculation unit 174 calculates the movement amount of the shake correction lens 76 along the X2 axis and the movement amount of the shake correction lens 76 along the Y2 axis based on the movement amount A1 of the shake correction lens 76 calculated in the same manner in a case in which the X axis image shift command is acquired by the acquisition unit 172, and the movement amount B1 of the shake correction lens 76 calculated in the same manner in a case in which the Y axis image shift command is acquired by the acquisition unit 172. In this case, the calculation unit 174 calculates the movement amount of the shake correction lens 76 along the X2 axis by adding the movement amount Ax, which is the positive value or the negative value, and the movement amount Bx, which is the positive value or the negative value, and calculates the movement amount of the shake correction lens 76 along the Y2 axis by adding the movement amount Ay, which is the positive value or the negative value, and the movement amount By, which is the positive value or the negative value.

In next step ST210, the control unit 176 moves the shake correction lens 76 to shift the image. That is, the control unit 176 generates the X axis control command for each frame period according to the movement amount of the shake correction lens 76 along the X2 axis calculated by the calculation unit 174. The X axis control command is output to the X axis motor driver 116A. Similarly, the control unit 176 generates the Y axis control command for each frame period according to the movement amount of the shake correction lens 76 along the Y2 axis calculated by the calculation unit 174. The Y axis control command is output to the Y axis motor driver 116B.

The X axis motor driver 116A generates the X axis operation signal based on the X axis control command, and the Y axis motor driver 116B generates the Y axis operation signal based on the Y axis control command. The X axis motor 136A is operated by the operation amount according to the X axis operation signal, and the Y axis motor 136B is operated by an operation amount according to the Y axis operation signal. As a result, the shake correction lens 76 is moved in the direction for shifting the image along the X1 axis and/or the Y1 axis for each frame period, and the image is shifted along the X1 axis and/or the Y1 axis.

Hereinafter, the shake correction processing will be described with reference to FIG. 23.

In step ST300, first, the acquisition unit 172 (see FIGS. 19 and 20) acquires the shake correction command output from the CPU 42 of the surveillance camera body 20.

In next step ST302, the acquisition unit 172 acquires the shake amount detection result by the shake amount detection sensor 56 output from the CPU 42 of the surveillance camera body 20.

In next step ST304, the acquisition unit 172 acquires the inclination information output from the CPU 212 of the management device 200.

In next step ST306, the calculation unit 174 calculates the movement amount of the shake correction lens 76 for correcting the shake of the image. That is, the calculation unit 174 calculates the movement amount C1 (see FIG. 19) of the shake correction lens 76 for correcting the shake of the image in the X1 axis direction. In addition, the calculation unit 174 calculates the movement amount D1 (see FIG. 20) of the shake correction lens 76 for correcting the shake of the image in the Y1 axis direction based on the shake amount detection result by the shake amount detection sensor 56.

In next step ST308, the calculation unit 174 calculates the movement amount of the shake correction lens 76 along the X2 axis and the movement amount of the shake correction lens 76 along the Y2 axis, respectively. That is, the calculation unit 174 calculates the movement amount Cx of the shake correction lens 76 along the X2 axis by Expression (7), and calculates the movement amount Cy of the shake correction lens 76 along the Y2 axis by Expression (8).

$$Cx=C1\times\cos\theta y/\cos(\theta y-\theta x) \quad (7)$$

$$Cy=-C1\times\sin\theta x/\cos(\theta y-\theta x) \quad (8)$$

In addition, the calculation unit 174 calculates the movement amount Dx of the shake correction lens 76 along the X2 axis by Expression (9), and calculates the movement amount Dy of the shake correction lens 76 along the Y2 axis by Expression (10).

$$Dx=D1\times\sin\theta y/\cos(\theta y-\theta x) \quad (9)$$

$$Dy=D1\times\cos\theta x/\cos(\theta y-\theta x) \quad (10)$$

In addition, in a case in which the shake correction lens 76 is simultaneously moved along the X1 axis and the Y1 axis in order to simultaneously correct the shake in the X1 axis direction and the shake in the Y1 axis direction of the image, the calculation unit 174 calculates the movement amount of the shake correction lens 76 along the X2 axis by adding the movement amount Cx, which is the positive value or the negative value and is calculated based on the movement amount C1 of the shake correction lens 76, and the movement amount Dx, which is the positive value or the negative value and is calculated based on the movement amount D1 of the shake correction lens 76. In addition, the calculation unit 174 calculates the movement amount of the shake correction lens 76 along the Y2 axis by adding the movement amount Cy, which is the positive value or the negative value and is calculated based on the movement amount C1 of the shake correction lens 76, and the movement amount Dy, which is the positive value or the negative value and is calculated based on the movement amount D1 of the shake correction lens 76.

Further, in a case in which the shift of the image and the correction of the shake of the image are simultaneously performed, the calculation unit 174 calculates the movement amount of the shake correction lens 76 along the X2 axis by adding a plurality of movement amounts selected from the movement amount Ax, which is the positive value or the negative value and is calculated based on the movement amount A1 of the shake correction lens 76, the movement amount Bx, which is the positive value or the negative value and is calculated based on the movement amount B1 of the shake correction lens 76, the movement amount Cx, which is the positive value or the negative value and is calculated based on the movement amount C1 of the shake correction lens 76, and the movement amount Dx, which is the positive value or the negative value and is calculated based on the movement amount D1 of the shake correction lens 76, according to the direction for shifting the image and the direction for correcting the shake of the image.

In addition, in a case in which the shift of the image and the correction of the shake of the image are simultaneously performed, the calculation unit 174 calculates the movement amount of the shake correction lens 76 along the Y2 axis by adding a plurality of movement amounts selected from the movement amount Ay, which is the positive value or the negative value and is calculated based on the movement amount A1 of the shake correction lens 76, the movement amount By, which is the positive value or the negative value and is calculated based on the movement amount B1 of the shake correction lens 76, the movement amount Cy, which is the positive value or the negative value and is calculated based on the movement amount C1 of the shake correction lens 76, and the movement amount Dy, which is the positive value or the negative value and is calculated based on the movement amount D1 of the shake correction lens 76, according to the direction for shifting the image and the direction for correcting the shake of the image.

In next step ST310, the control unit 176 sets the movement amount of the shake correction lens 76 calculated by the calculation unit 174 along the X2 axis as the target value, and generates the X axis control command based on the position detection result by the X axis position sensor 156A. The X axis control command is output to the X axis motor driver 116A. Similarly, the control unit 176 sets the movement amount of the shake correction lens 76 calculated by the calculation unit 174 along the Y2 axis as the target value, and generates the Y axis control command based on the position detection result by the Y axis position sensor 156B. The Y axis control command is output to the Y axis motor driver 116B.

The X axis motor driver 116A generates the X axis operation signal based on the X axis control command, and the Y axis motor driver 116B generates the Y axis operation signal based on the Y axis control command. The X axis motor 136A is operated by the operation amount according to the X axis operation signal, and the Y axis motor 136B is operated by an operation amount according to the Y axis operation signal. As a result, the shake correction lens 76 is moved in the direction in which the shake of the image is corrected, and the shake of the image is corrected.

Figure 22:
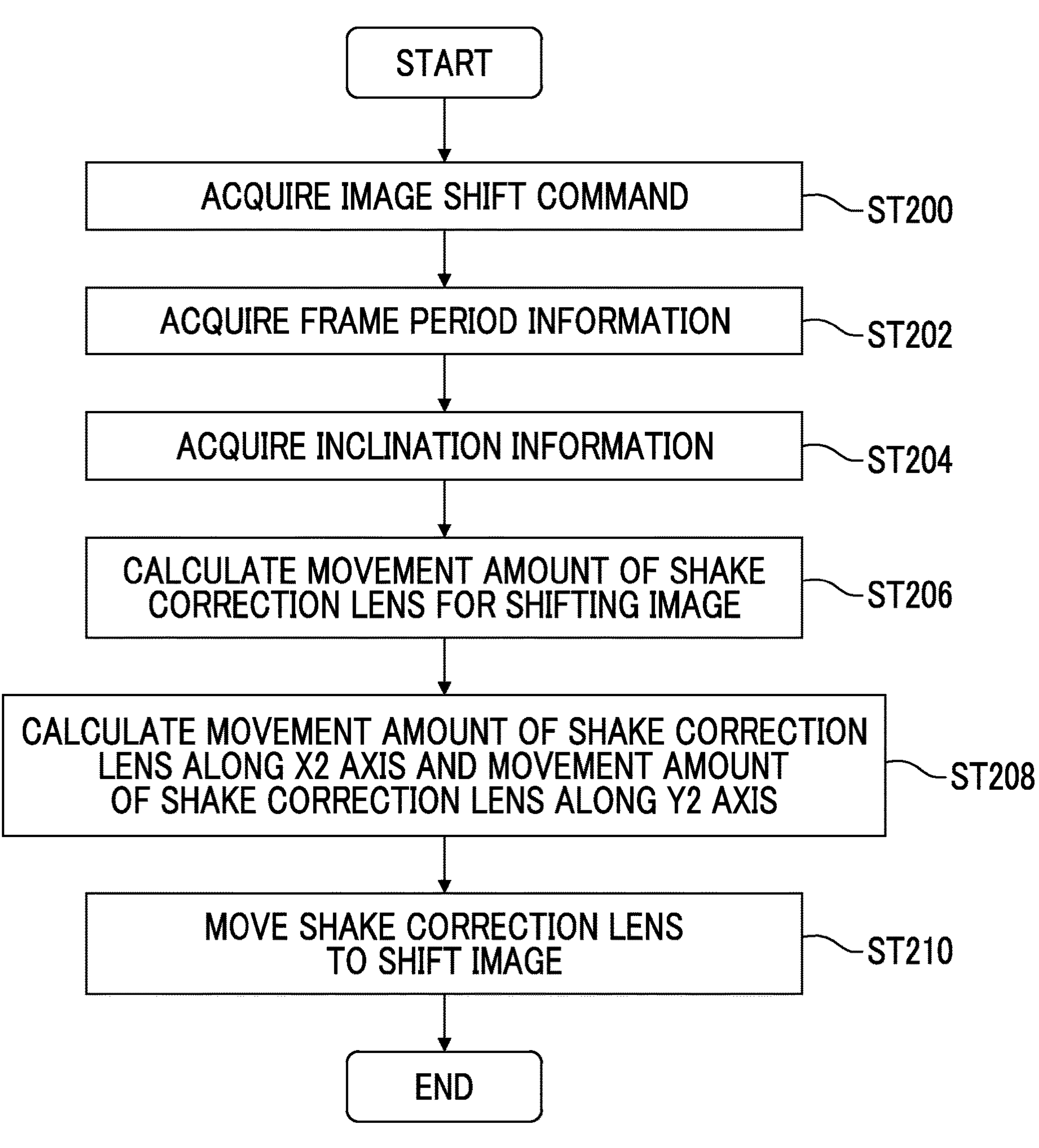
FIG. 22 is a flowchart showing an example of a flow of the shift processing according to the first embodiment of the technology of the present disclosure.
Figure 23:
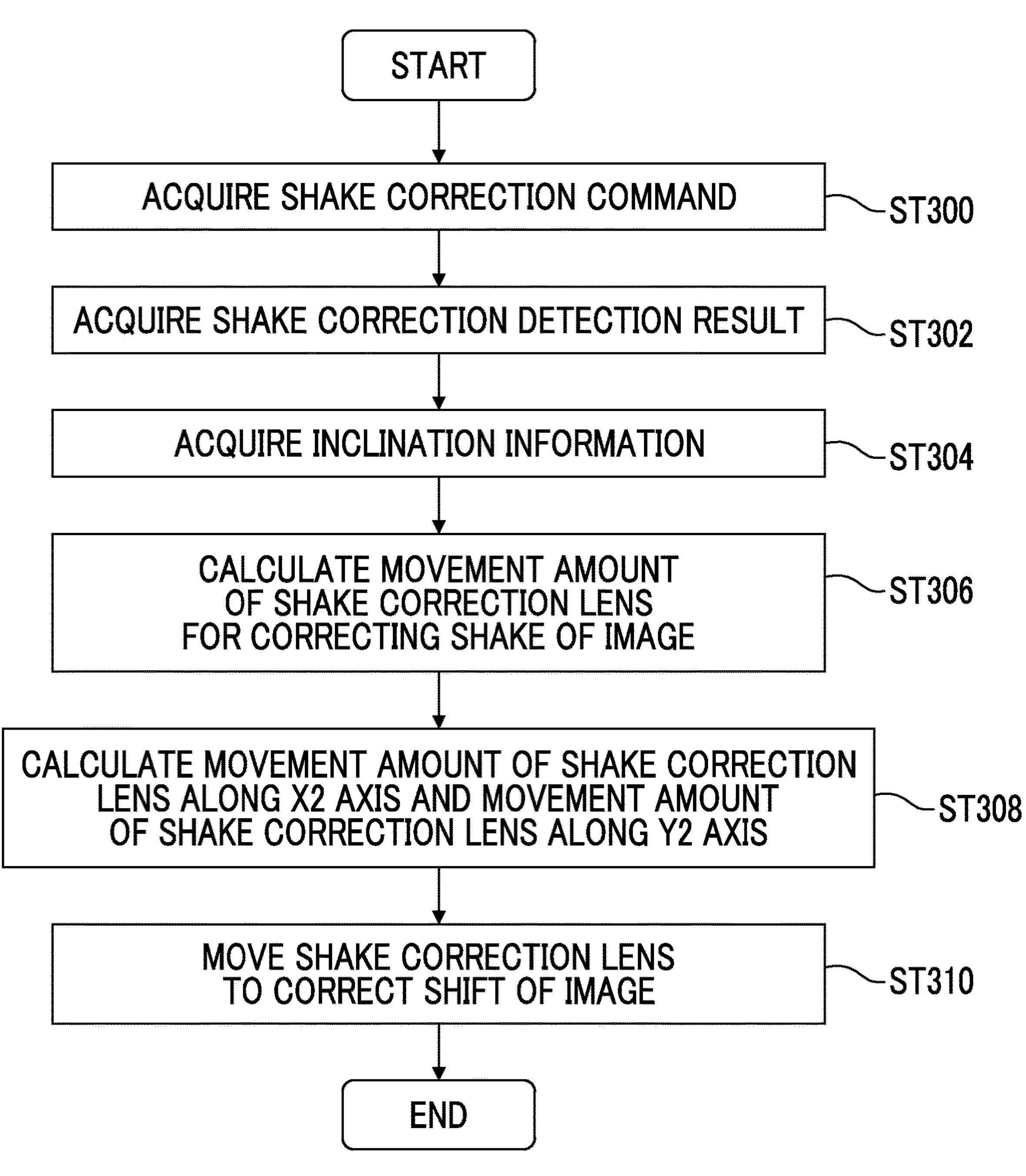
FIG. 23 is a flowchart showing an example of a flow of the shake correction processing according to the first embodiment of the technology of the present disclosure.

It should be noted that the operation method the surveillance camera 10 described with reference to FIGS. 22 and 23 is an example of an "operation method for an imaging apparatus" according to the technology of the present disclosure. In addition, the operation method the lens device 70 included in the operation method the surveillance camera 10 described with reference to FIGS. 22 and 23 is an example of an "operation method of the lens device" according to the technology of the present disclosure.

Hereinafter, the effects of the first embodiment will be described.

As shown in FIGS. 16 and 19, the CPU 92 of the lens device 70 acquires the inclination information related to the inclination of the X2 axis of the lens device 70 with respect to the X1 axis of the image sensor 24, and performs, with respect to the X axis motor 136A and the Y axis motor 136B, control of moving the shake correction lens 76 along the X1 axis of the image sensor 24 based on the inclination information. Therefore, even in a case in which the X2 axis of the lens device 70 is inclined with respect to the X1 axis of the image sensor 24, the image can be moved along the X1 axis of the image sensor 24 by moving the shake correction lens 76 along the X1 axis of the image sensor 24 by receiving the power of the X axis motor 136A and the Y axis motor 136B.

Similarly, as shown in FIGS. 17 and 20, the CPU 92 of the lens device 70 acquires the inclination information related to the inclination of the Y2 axis of the lens device 70 with respect to the Y1 axis of the image sensor 24, and performs, with respect to the X axis motor 136A and the Y axis motor 136B, control of moving the shake correction lens 76 along the Y1 axis of the image sensor 24 based on the inclination information. Therefore, even in a case in which the Y2 axis of the lens device 70 is inclined with respect to the Y1 axis of the image sensor 24, the image can be moved along the Y1 axis of the image sensor 24 by moving the shake correction lens 76 along the Y1 axis of the image sensor 24 by receiving the power of the X axis motor 136A and the Y axis motor 136B.

In addition, as shown in FIG. 16, for example, in a case in which the X axis image shift command is received, the CPU 92 of the lens device 70 performs, with respect to the X axis motor 136A and the Y axis motor 136B, control of moving the shake correction lens 76 in the direction in which the image is shifted in the X1 axis direction. Therefore, it is possible to shift the image in the X1 axis direction by moving the shake correction lens 76 in the X1 axis direction.

Similarly, as shown in FIG. 17, for example, in a case in which the Y axis image shift command is received, the CPU 92 of the lens device 70 performs, with respect to the X axis motor 136A and the Y axis motor 136B, control of moving the shake correction lens 76 in the direction in which the image is shifted in the Y1 axis direction. Therefore, it is possible to shift the image in the Y1 axis direction by moving the shake correction lens 76 in the Y1 axis direction.

In addition, as shown in FIG. 19, for example, in a case in which the shake of the image in the X1 axis direction occurs, the CPU 92 of the lens device 70 performs, with respect to the X axis motor 136A and the Y axis motor 136B, control of moving the shake correction lens 76 in a direction in which the shake of the image in the X1 axis direction is corrected. Therefore, it is possible to correct the shake of the image in the X1 axis direction by moving the shake correction lens 76 in the X1 axis direction.

Similarly, as shown in FIG. 20, for example, in a case in which the shake of the image in the Y1 axis direction occurs, the CPU 92 of the lens device 70 performs, with respect to the X axis motor 136A and the Y axis motor 136B, control of moving the shake correction lens 76 in a direction in which the shake of the image in the Y1 axis direction is corrected. Therefore, it is possible to correct the shake of the image in the Y1 axis direction by moving the shake correction lens 76 in the Y1 axis direction.

In addition, the lens device 70 comprises the communication I/F 100 that communicates with the management device 200, and the CPU 92 of the lens device 70 acquires the inclination information transmitted from the management device 200, and is received by the communication I/F 100. Therefore, the CPU 92 of the lens device 70 can perform the control of moving the shake correction lens 76 based on the inclination information generated by the management device 200.

Also, the CPU 92 of the lens device 70 stores the acquired inclination information in the NVM 94 (see FIG. 5). Therefore, even in a case in which the power supply to the lens device 70 is stopped, the inclination information can be maintained in a state of being stored in the NVM 94, and the inclination information stored in the NVM 94 can be used until new inclination information is obtained.

Also, since the inclination information stored in the NVM 94 can be used, it is not necessary to calculate the inclination information each time the power is supplied to the lens device 70 and the lens device 70 is started.

In addition, as shown in FIG. 11, the inclination information indicating the inclination angle θx is the information calculated based on the second control command for moving the shake correction lens 76 along the X2 axis of the lens device 70, and the first image 262 and the second image 264 obtained by being captured by the image sensor 24 before and after the shake correction lens 76 is moved based on the second control command. Therefore, for example, it is possible to calculate the inclination angle θx without using an inclination angle detection sensor that detects the inclination angle θx.

Similarly, as shown in FIG. 13, the inclination information indicating the inclination angle θy is the information calculated based on the third control command for moving the shake correction lens 76 along the Y2 axis of the lens device 70, and the second image 264 and the third image 266 obtained by being captured by the image sensor 24 before and after the shake correction lens 76 is moved based on the third control command. Therefore, for example, it is possible to calculate the inclination angle θy without using an inclination angle detection sensor that detects the inclination angle θy.

In addition, the inclination information is information calculated based on a plurality of images obtained by performing the imaging by the image sensor 24 under the imaging condition in which the image having less noise than the image obtained by the normal imaging is obtained. Therefore, for example, the inclination angles θx and θy indicated by the inclination information can be calculated with higher accuracy than in a case in which the inclination information is calculated based on the plurality of images obtained under the condition of the normal imaging.

In addition, the inclination information is the information related to the inclination angle θx of the X2 axis of the lens device 70 with respect to the X1 axis of the image sensor 24 and the inclination angle of the Y2 axis of the lens device 70 with respect to the Y1 axis of the image sensor 24. Therefore, as compared to a case in which the inclination information is information that does not include specific inclination angle (for example, information related to a rotational position of the lens device 70 with respect to the surveillance camera body 20), the movement amount of the shake correction lens 76 along the X2 axis and the movement amount of the shake correction lens 76 along the Y2 axis can be calculated with higher accuracy.

In addition, the CPU 92 of the lens device 70 calculates the movement amount of the shake correction lens 76 along the X2 axis and the movement amount of the shake correction lens 76 along the Y2 axis based on the inclination information related to the inclination angle θx, and performs, with respect to the X axis motor 136A and the Y axis motor 136B, control of moving the shake correction lens 76 by the calculated movement amount of the shake correction lens 76 along the X2 axis and the calculated movement amount of the shake correction lens 76 along the Y2 axis. Therefore, even in a case in which the X2 axis of the lens device 70 is inclined with respect to the X1 axis of the image sensor 24, the shake correction lens 76 can be moved along the X1 axis of the image sensor 24.

Similarly, the CPU 92 of the lens device 70 calculates the movement amount of the shake correction lens 76 along the X2 axis and the movement amount of the shake correction lens 76 along the Y2 axis based on the inclination information related to the inclination angle θy, and performs, with respect to the X axis motor 136A and the Y axis motor 136B, control of moving the shake correction lens 76 by the calculated movement amount of the shake correction lens 76 along the X2 axis and the calculated movement amount of the shake correction lens 76 along the Y2 axis. Therefore, even in a case in which the Y2 axis of the lens device 70 is inclined with respect to the Y1 axis of the image sensor 24, the shake correction lens 76 can be moved along the Y1 axis of the image sensor 24.

Hereinafter, a modification example of the first embodiment will be described.

In the first embodiment, the shake correction lens 76 is used to perform the shift of the image the correction of the shake of the image, but the lens device 70 may separately comprise a shift lens that performs the shift of the image and the shake correction lens that performs the correction of the shake of the image. In addition, in a case in which the lens device 70 separately comprises the shift lens that performs the shift of the image and the shake correction lens that performs the correction of the shake of the image, the shift lens may be moved by the shift processing described above, and the shake correction lens may be moved by the shake correction processing described above. It should be noted that the shift lens and the shake correction lens in this case each correspond to an example of the "movement lens" according to the technology of the present disclosure.

In addition, in the first embodiment, both the control of moving the shake correction lens 76 along the X1 axis based on the inclination information related to the inclination angle θx and the control of moving the shake correction lens 76 along the Y1 axis based on the inclination information related to the inclination angle θy are executed, but any one of the control of moving the shake correction lens 76 along the X1 axis based on the inclination information related to the inclination angle θx or the control of moving the shake correction lens 76 along the Y1 axis based on the inclination information related to the inclination angle θy may only be executed.

Moreover, in the first embodiment, the inclination information includes the inclination angle, but may include a detection value other than the inclination angle.

In addition, in the first embodiment, the control of moving the shake correction lens 76 based on the inclination information is executed by both the shift processing of moving the shake correction lens 76 to shift the image and the shake correction processing of moving the shake correction lens 76 to correct the shake of the image, but the control of moving the shake correction lens 76 based on the inclination information may be executed only by any one of the shift processing or the shake correction processing.

In addition, in the first embodiment, the management device 200 generates the inclination information and outputs the generated inclination information to the lens device 70, but the surveillance camera body 20 may generate the inclination information and output the generated inclination information as the lens device 70. In addition, the lens device 70 may generate the inclination information. In addition, in a case in which the surveillance camera body 20 generates the inclination information or the lens device 70 generates the inclination information, the communication I/F 220 of the management device 200 and the communication I/F 100 of the lens device 70 do not have to be connected to each other in a communicable manner.

In addition, in the first embodiment, the communication I/F 60 of the surveillance camera body 20 and the communication I/F 100 of the lens device 70 are connected to each other in a communicable manner, but the communication I/F 60 of the surveillance camera body 20 and the communication I/F 100 of the lens device 70 do not have to be connected to each other in a communicable manner. In a case in which the communication I/F 60 of the surveillance camera body 20 and the communication I/F 100 of the lens device 70 are not connected to each other in a communicable manner, the information generated by the surveillance camera body 20 may be output to the lens device 70 via the management device 200.

In addition, in the first embodiment, the CPU 92 of the lens device 70 stores the acquired inclination information in the NVM 94, but the acquired inclination information may be stored in the RAM 96 without being stored in the NVM 94.

In addition, in the first embodiment, the inclination angle θx and the inclination angle θy are calculated based on the second control command for moving the shake correction lens 76 along the X2 axis, the third control command for moving the shake correction lens 76 along the Y2 axis, and the first image 262, the second image 264, and the third image 266, which are obtained by being captured by the image sensor 24 before and after the shake correction lens 76 is moved based on the second control command and the third control command. However, for example, the inclination angle θx may be calculated based on the second control command, and the first image 262 and the second image 264, which are obtained by being captured by the image sensor 24 before and after the shake correction lens 76 is moved based on the second control command, and the inclination angle θy may be set as the same value as the inclination angle θx by assuming that the Y2 axis is perpendicular to the X2 axis.

In addition, in the first embodiment, for example, the inclination angle θy may be calculated based on the plurality of images obtained by being captured by the image sensor 24 before and after the shake correction lens 76 is moved from the center of the X2-Y2 coordinate system along the Y2 axis, and the inclination angle θx may be set as the same value as the inclination angle θy by assuming that the X2 axis is perpendicular to the Y2 axis.

In addition, in the first embodiment, the inclination angle θy is calculated based on the second image 264 and the third image 266, which are obtained by being captured by the image sensor 24 before and after the shake correction lens 76 is moved along the Y2 axis from the position at which the shake correction lens 76 is moved from the center of the X2-Y2 coordinate system along the X2 axis, but the inclination angle θy may be calculated based on the plurality of images obtained by being captured by the image sensor 24 before and after the shake correction lens 76 is moved from the center of the X2-Y2 coordinate system along the Y2 axis.

In addition, in the first embodiment, the inclination information is calculated based on the plurality of images obtained by being captured by the image sensor 24 to which the sensitivity lower than the sensitivity of the image sensor 24 that performs the normal imaging is applied, but the inclination information may be calculated based on the plurality of images obtained by being captured by the image sensor 24 to which the sensitivity of the image sensor 24 that performs the normal imaging is applied.

In addition, in the first embodiment, in a case in which only the control of moving the shake correction lens 76 along the X1 axis is executed, the inclination angle θy does not have to be calculated. Similarly, in a case in which only the control of moving the shake correction lens 76 along the Y1 axis is executed, the inclination angle θx does not have to be calculated.

In addition, in the first embodiment, the CPU 92 of the lens device 70 calculates the movement amount for moving the shake correction lens 76 along the X2 axis and the movement amount for moving the shake correction lens 76 along the Y2 axis, respectively, based on the inclination information. However, the CPU 212 of the management device 200 may calculate the movement amount for moving the shake correction lens 76 along the X2 axis and the movement amount for moving the shake correction lens 76 along the Y2 axis, respectively, based on the inclination information. In addition, the CPU 42 of the surveillance camera body 20 may calculate the movement amount for moving the shake correction lens 76 along the X2 axis and the movement amount for moving the shake correction lens 76 along the Y2 axis, respectively, based on the inclination information.

Moreover, among the plurality of modification examples according to the first embodiment, the modification examples that can be combined may be appropriately combined.

Second Embodiment

Hereinafter, a second embodiment will be described. In the second embodiment, the configuration of the surveillance system S is changed as follows with respect to the first embodiment. It should be noted that, in the second embodiment, the same elements and members as the elements and members in the first embodiment are designated by the same reference numerals as the reference numerals in the first embodiment, and the detailed description thereof is omitted.

As an example, as shown in FIG. 24, association information is stored in the NVM 214 of the management device 200. The association information is information in which first registration information, second registration information, and the inclination information are associated with each other. The first registration information is information related to the surveillance camera body 20, and is information in which an individual number of the surveillance camera body 20 is registered, for example. The second registration information is information related to the lens device 70, and is information in which an individual number of the lens device 70 is registered, for example. The inclination information is information calculated in a state in which the lens device 70 registered in the second registration information is mounted on the surveillance camera body 20 registered in the first registration information. The calculation method of the inclination information is as described in the first embodiment.

In a case in which a combination of the first registration information, the second registration information, and the inclination information is acquired, the CPU 212 of the management device 200 stores the information in which the first registration information, the second registration information, and the inclination information are associated with each other in the NVM 214 as the association information.

First identification information is stored in the NVM 44 of the surveillance camera body 20. Similarly to the first registration information, the first identification information is information related to the surveillance camera body 20, and is information in which the individual number of the surveillance camera body 20 is registered, for example.

Second identification information is stored in the NVM 94 of the lens device 70. The second identification information is information about the lens device 70, like the second registration information, and is information in which the individual number of the lens device 70 is registered, for example. In a case in which the lens device 70 is mounted on the surveillance camera body 20, the first identification information is output from the surveillance camera body 20, and the second identification information is output from the lens device 70.

By executing an inclination information output processing program 240 stored in the NVM 214 on the RAM 216, the CPU 212 of the management device 200 is operated as an acquisition unit 242, a determination unit 244, an extraction unit 246, an output unit 248, and a notification control unit 250.

The acquisition unit 242 acquires the first identification information output from the surveillance camera body 20 via the communication I/F 220 of the management device 200 and the communication I/F 60 of the surveillance camera body 20. Moreover, the acquisition unit 242 acquires the second identification information output from the lens device 70 via the communication I/F 220 of the management device 200 and the communication I/F 100 of the lens device 70. Furthermore, the acquisition unit 242 acquires the association information stored in the NVM 214.

The determination unit 244 determines whether or not the first registration information included in the association information matches the first identification information acquired by the acquisition unit 242 and whether or not the second registration information included in the association information matches the second identification information acquired by the acquisition unit 242, based on the first identification information, the second identification information, and the association information acquired by the acquisition unit 242.

In a case in which an affirmative determination is made by the determination unit 244, the extraction unit 246 extracts the inclination information from the association information acquired by the acquisition unit 242. The output unit 248 outputs the inclination information extracted by the extraction unit 246. The inclination information output from the output unit 248 is transmitted to the lens device 70 via the communication I/F 220 of the management device 200. In the lens device 70, as described in the first embodiment, the control of moving the shake correction lens 76 (see FIGS. 16, 17, 19, and 20) is executed based on the inclination information.

In a case in which a negative determination is made by the determination unit 244, that is, in a case in which the first registration information included in the association information and the first identification information of the surveillance camera body 20 acquired by the acquisition unit 242 are different from each other or in a case in which the second registration information included in the association information and the second identification information of the lens device 70 acquired by the acquisition unit 242 are different from each other, the notification control unit 250 performs, for example, control of giving a notification as processing that contributes to update of the inclination information.

The notification may be, for example, a notification that processing of updating the inclination information needs to be executed, or may be a notification that the surveillance camera body 20 and the lens device 70 are not in a known combination. In addition, the notification may be, for example, a notification displayed on the display 222 (see FIG. 6) of the management device 200, a notification by a sound output from a speaker of the management device 200, or a notification by emitting light of a warning light of the management device 200. As a result, an administrator who has received the notification performs the operation of updating the inclination information to the surveillance system S.

Hereinafter, the inclination information output processing according to the second embodiment will be described with reference to FIG. 25.

In step ST400, first, the acquisition unit 242 acquires the first identification information output from the surveillance camera body 20. Also, the acquisition unit 172 acquires the second identification information output from the lens device 70. Furthermore, the acquisition unit 242 acquires the association information stored in the NVM 214.

In next step ST402, the determination unit 244 determines whether or not the first registration information included in the association information matches the first identification information acquired by the acquisition unit 242 and whether or not the second registration information included in the association information matches the second identification information acquired by the acquisition unit 242, based on the first identification information, the second identification information, and the association information acquired by the acquisition unit 242. In a case in which an affirmative determination is made by the determination unit 244, step ST404 is executed.

In next step ST404, the extraction unit 246 extracts the inclination information from the association information acquired by the acquisition unit 242.

In next step ST406, the output unit 248 outputs the inclination information extracted by the extraction unit 246. The inclination information output from the output unit 248 is transmitted to the lens device 70. In the lens device 70, as described in the first embodiment, the control of moving the shake correction lens 76 (see FIGS. 16, 17, 19, and 20) is executed based on the inclination information.

On the other hand, in a case in which a negative determination is made by the determination unit 244 in step ST402, step ST408 is executed. In step ST408, the notification control unit 250 performs, for example, the control of giving the notification as the processing that contributes to the update of the inclination information.

Hereinafter, the effects of the second embodiment will be described.

The CPU 212 of the management device 200 stores, in the NVM 214, the association information in which the first registration information related to the surveillance camera body 20, the second registration information related to the lens device 70, and the inclination information are associated with each other. Therefore, even in a case in which the power supply to the management device 200 is stopped, the association information can be maintained in a state of being stored in the NVM 214, and the association information stored in the NVM 214 can be used until new association information is obtained.

In addition, since the association information stored in the NVM 214 can be used, it is not necessary to generate the association information each time the lens device 70 is mounted on the surveillance camera body 20.

In addition, in a case in which the first registration information included in the association information matches the first identification information of the surveillance camera body 20 and the second registration information included in the association information matches the second identification information of the lens device 70, the CPU 212 of the management device 200 extracts the inclination information from the association information. Therefore, the inclination information included in the association information can be applied to a known combination of the surveillance camera body 20 and the lens device 70.

In addition, in a case in which the first registration information included in the association information and the first identification information of the surveillance camera body 20 acquired by the acquisition unit 242 are different from each other or in a case in which the second registration information included in the association information and the second identification information of the lens device 70 acquired by the acquisition unit 242 are different from each other, the CPU 212 of the management device 200 performs, for example, the control of giving the notification as the processing that contributes to the update of the inclination information. Therefore, it is possible to prompt the administrator who has received the notification to perform the operation of updating the inclination information.

Hereinafter, a modification example of the second embodiment will be described.

In the second embodiment, a plurality of pieces of association information may be stored in the NVM 214 of the management device 200. In addition, the CPU 212 of the management device 200 may extract the association information corresponding to a target combination of the surveillance camera body 20 and the lens device 70 from the plurality of pieces of association information stored in the NVM 214 of the management device 200, and output the inclination information included in the extracted association information.

In addition, in the second embodiment, the association information in which the first registration information related to the surveillance camera body 20, the second registration information related to the lens device 70, and the inclination information are associated with each other is stored in the NVM 214 of the management device 200. However, the association information may be stored in the NVM 44 of the surveillance camera body 20 or may be stored in the NVM 94 of the lens device 70.

Also, in the second embodiment, the inclination information output processing is executed by the CPU 212 of the management device 200. However, the inclination information output processing may be executed by the CPU 42 of the surveillance camera body 20 or may be executed by the CPU 92 of the lens device 70.

In addition, a plurality of modification examples according to the second embodiment may be combined as appropriate. In addition, a plurality of modification examples of the first embodiment may be applied to the second embodiment.

Third Embodiment

Hereinafter, a third embodiment will be described.

Figure 26:
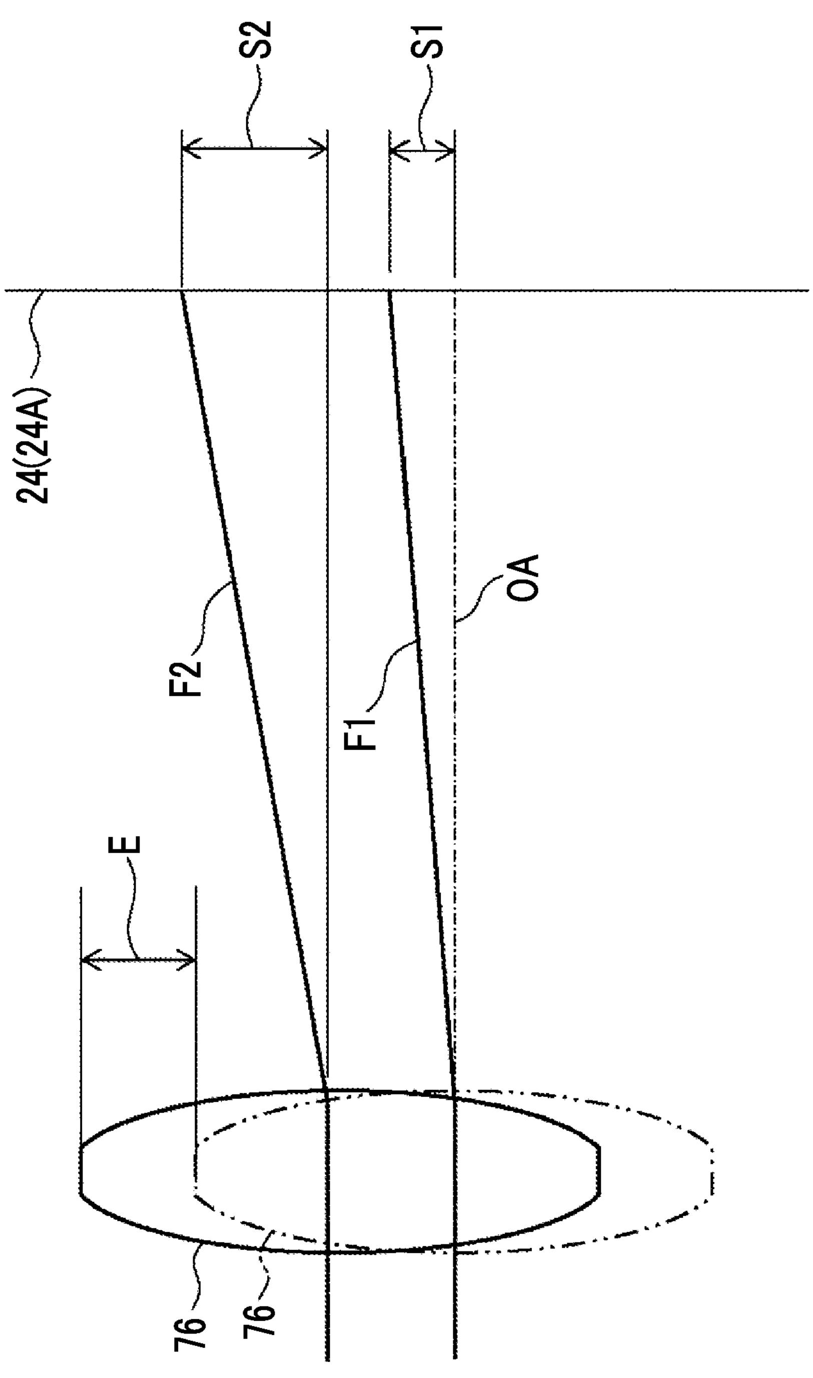
FIG. 26 is a side view showing an example of an optical characteristic of a shake correction lens according to a third embodiment of the technology of the present disclosure.

FIG. 26 shows an example of an optical characteristic of the shake correction lens 76. In FIG. 26, the shake correction lens 76 shown by a two-point chain line represents the shake correction lens 76 before the image is shifted, and the shake correction lens 76 shown by a solid line represents the shake correction lens 76 moved to the position at which the image is shifted.

The optical axis OA represents the optical axis OA that passes through the center of the light-receiving surface 24A of the image sensor 24 and is perpendicular to the light-receiving surface 24A.

A shift amount S1 is a shift amount of a central ray F1 passing through the shake correction lens 76 after the movement on the optical axis OA on the light-receiving surface 24A of the image sensor 24 with respect to the movement of the shake correction lens 76 by a movement amount E, and a shift amount S2 is a shift amount of a peripheral ray F2 passing through the shake correction lens 76 after the movement on a region other than the optical axis OA on the light-receiving surface 24A of the image sensor 24 with respect to the movement of the shake correction lens 76 by the movement amount E. In a comparison using the same movement amount E, the shift amount S2 is larger than the shift amount S1. Therefore, in general, it is difficult to obtain the same shift amount over the entire surface of the image obtained by imaging the light on the image sensor 24.

Accordingly, in the third embodiment, the surveillance system S is configured as follows. In the third embodiment, the same elements and members as the elements and members in the first embodiment are designated by the same reference numerals as the reference numerals in the first embodiment, and the detailed description thereof is omitted.

Figure 27:
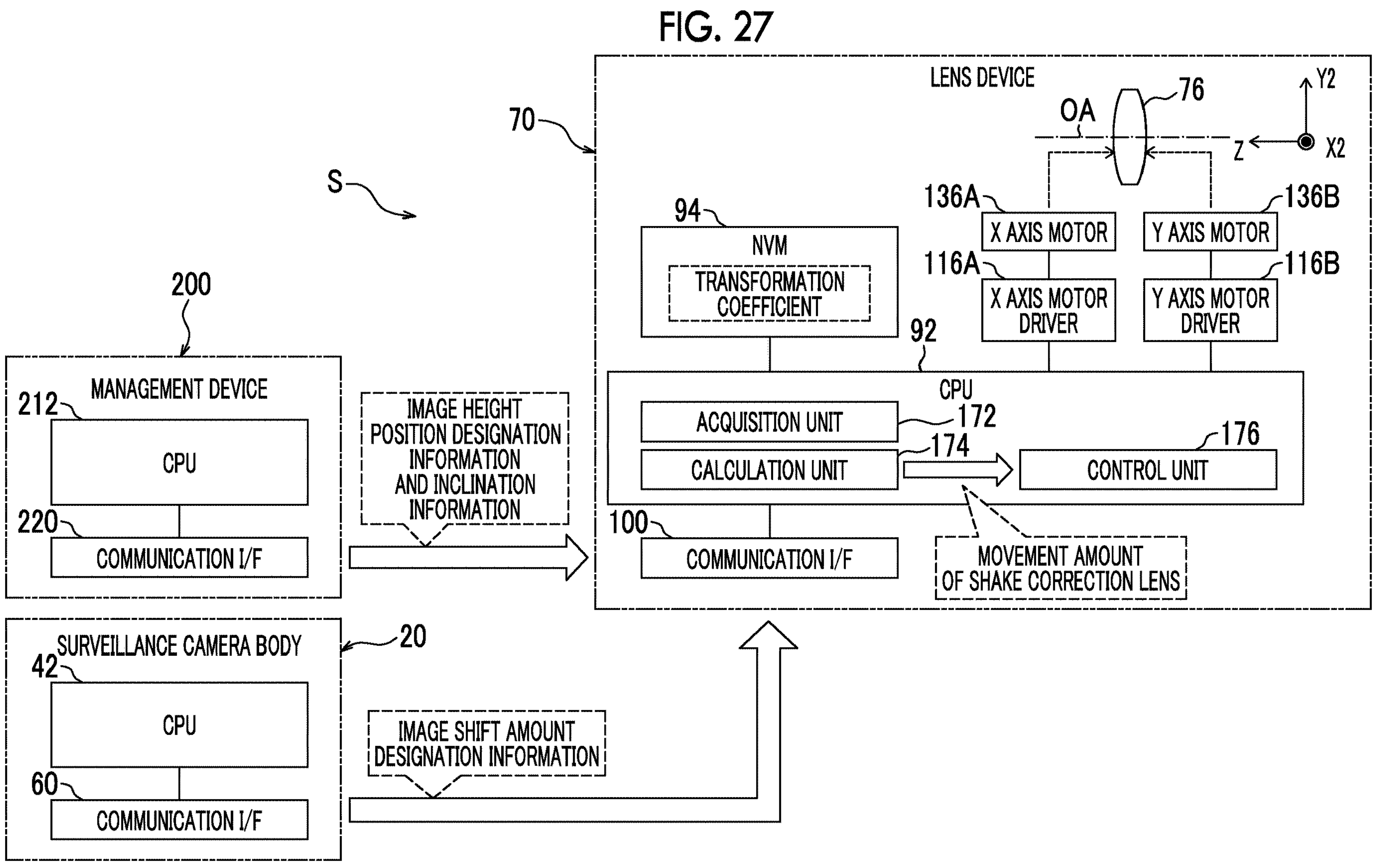
FIG. 27 is a block diagram showing an example of a configuration of a surveillance system according to the third embodiment of the technology of the present disclosure.

As shown in FIG. 27 as an example, the CPU 212 of the management device 200 outputs image height position designation information and the inclination information. The image height position designation information is information for designating an image height position on the light-receiving surface 24A (see FIG. 26) of the image sensor 24. The image height position is a position of an image height obtained by imaging the light on the image sensor 24, and the image height is a distance from the optical axis OA to the center of the image. In other words, the image height position designation information is information for designating the image height position indicating the height position on the light-receiving surface 24A at the center of the image obtained by imaging the light on the image sensor 24. The position of the center of the image with the optical axis OA as a reference is designated by the image height position designation information. For example, the management device 200 performs object detection processing to specify a position at which a main subject is shown in the captured image, and the specified position is set to the image height position (that is, a reference image position). It should be noted that the image height position may be designated by an administrator who manages the management device 200.

The inclination information is as described in the first embodiment. The image height position designation information and the inclination information are transmitted from the communication I/F 220 of the management device 200, and is received by the communication I/F 100 of the lens device 70.

The CPU 42 of the surveillance camera body 20 outputs image shift amount designation information. The image shift amount designation information is information for designating the shift amount for shifting the image. The image shift amount designation information is the same information as the image shift command in the first embodiment. The movement amount of the center of the image with the movement of the shake correction lens 76 is designated by the image shift amount designation information. The image shift amount designation information is transmitted from the communication I/F 60 of the surveillance camera body 20, and is received by the communication I/F 100 of the lens device 70.

A transformation coefficient is stored in the NVM 94 of the lens device 70. The transformation coefficient is a coefficient for transforming the shift amount for shifting the image into the movement amount of the shake correction lens 76. The transformation coefficient is represented by a value obtained by dividing the movement amount [mm] of the shake correction lens by the shift amount [pitch (p)] for shifting the image. The transformation coefficient is determined in advance according to an optical characteristic value (that is, the design value) of the shake correction lens 76. Also, the transformation coefficient is determined according to the image height position. The transformation coefficient is stored in the NVM 94 in a lookup table format, for example. It should be noted that the transformation coefficient may be stored in the NVM 94 in a format other than the lookup table format.

As in the first embodiment, the CPU 92 of the lens device 70 is operated as the acquisition unit 172, the calculation unit 174, and the control unit 176. The acquisition unit 172 acquires the image height position designation information, the inclination information, and the image shift amount designation information, which are received by the communication I/F 100 of the lens device 70. It should be noted that, for example, in a case in which the management device 200 does not output the image height position designation information due to stop of an object detection function of the management device 200 or the image height position which is not designated by the administrator who manages the management device 200, a position, which is designated in advance by the CPU 92 of the lens device 70, may be set as the image height position.

The calculation unit 174 decides the shift amount of the image at the image height position designated by the image height position designation information as the shift amount designated by the image shift amount designation information based on the image height position designation information and the image shift amount designation information. In addition, the calculation unit 174 calculates the movement amount of the shake correction lens 76 for which the shift amount of the image at the decided image height position is obtained, by using the transformation coefficient.

For example, in a case in which the shift amount designated by the image shift amount designation information is denoted by x [pitch (p)], the image height position designated by the image height position designation information is denoted by r [mm], the transformation coefficient at the image height position r is denoted by (3, and the movement amount of the shake correction lens 76 corresponding to the shift amount designated by the image shift amount designation information is denoted by y, the movement amount y [mm] of the shake correction lens 76 is obtained by Expression (11).

$$y = x \times \beta \tag{11}$$

In addition, the calculation unit 174 calculates the movement amount of the shake correction lens 76 along the X2 axis and the movement amount of the shake correction lens 76 along the Y2 axis, respectively, based on the movement amount of the shake correction lens 76 calculated by using the transformation coefficient and the inclination information. The method of calculating the movement amount of the shake correction lens 76 along the X2 axis and the movement amount of the shake correction lens 76 along the Y2 axis, respectively, based on the movement amount of the shake correction lens 76 calculated by using the transformation coefficient and the inclination information is the same as in the first embodiment.

As in the first embodiment, the control unit 176 performs, with respect to the X axis motor 136A and the Y axis motor 136B, the control of moving the shake correction lens 76 in the direction for shifting the image along the X1 axis and/or the Y1 axis. By the processing described above, the shift amount of the image at the image height position designated by the image height position designation information is set as the shift amount designated by the image shift amount designation information.

As described above, the CPU 92 of the lens device 70 acquires the image height position designation information for designating the image height position indicating the height position of the image on the image sensor 24, the image shift amount designation information for designating the shift amount for shifting the image, and the inclination information. Then, the CPU 92 of the lens device 70 performs, with respect to the X axis motor 136A and the Y axis motor 136B, the control of moving the movement lens by the movement amount in which the shift amount designated by the image shift amount designation information is obtained at the image height position designated by the image height position designation information based on the image height position designation information, the image shift amount designation information, and the inclination information. Therefore, the shift amount of the image at the image height position designated by the image height position designation information can be set as the shift amount designated by the image shift amount designation information.

In addition, in this way, the image is shifted for each frame period, and the CPU 42 of the surveillance camera body 20 performs, with respect to the image sensor 24 (see FIGS. 16 and 17), the control of performing the imaging each time the image is shifted. As a result, as shown in FIG. 18 as an example, the images 182 of the plurality of frames corresponding to the frame periods, respectively, are obtained. Then, the composite image 184 is obtained by combining the images 182 of the plurality of frames by the CPU 42 of the surveillance camera body 20.

In addition, in the third embodiment, since the shift amount of the image at the image height position designated by the image height position designation information can be set as the shift amount designated by the image shift amount designation information, it is possible to obtain the composite image 184 in which the image quality at the image height position designated by the image height position designation information is the best.

In addition, in the third embodiment as well, as in the first embodiment, even in a case in which the X2 axis of the lens device 70 is inclined with respect to the X1 axis of the image sensor 24 based on the inclination information.

It is possible to move the shake correction lens 76 along the X1 axis of the image sensor 24 by the X axis motor 136A and the Y axis motor 136B. Similarly, even in a case in which the Y2 axis of the lens device 70 is inclined with respect to the Y1 axis of the image sensor 24, it is possible to move the shake correction lens 76 along the Y1 axis of the image sensor 24 by the X axis motor 136A and the Y axis motor 136B.

It should be noted that the processing of the calculation unit 174 in the third embodiment may be performed by the CPU 212 of the management device 200 or by the CPU 42 of the surveillance camera body 20.

In addition, a plurality of modification examples of the first embodiment may be applied to the third embodiment, or a plurality of modification examples of the second embodiment may be applied to the third embodiment. In addition, the first embodiment, the second embodiment, and the third embodiment may be combined and carried out as appropriate.

Hereinafter, a modification example common to the first embodiment, the second embodiment, and the third embodiment (hereinafter, referred to as the embodiments described above) will be described.

In the embodiments described above, the lens device 70 comprises the controller 90 different from the controller 40 of the surveillance camera body 20, but the lens device 70 does not have to comprise the controller 90. Moreover, the functions of the controller 90 of the lens device 70 may be integrated into the controller 40 of the surveillance camera body 20, and the control of the lens device 70 may be performed by the controller 40 of the surveillance camera body 20. In this case, the controller 40 is an example of a "computer applied to an imaging apparatus". In addition, in a case in which the functions of the controller 90 of the lens device 70 are integrated into the controller 40 of the surveillance camera body 20, the communication I/F 100 of the lens device 70 may be omitted.

In addition, in the embodiments described above, the form example is described in which the imaging processing is executed by the controller 40 of the surveillance camera body 20, but the technology of the present disclosure is not limited to this. The imaging processing may be executed by, for example, the controller 210 of the management device 200. In addition, the management device 200 and the surveillance camera body 20 may execute the imaging processing in a distributed manner, or a plurality of devices including the management device 200 and the surveillance camera body 20 may execute the imaging processing in a distributed manner.

In addition, in the embodiments described above, the surveillance camera 10 is described as an example of the imaging apparatus, but the technology of the present disclosure is not limited to this, and the technology shown in the embodiments described above can be applied to various imaging apparatuses. Examples of the imaging apparatus described herein include a digital camera that is a lens interchangeable type and does not use a reflex mirror, a digital camera that is a lens stationary type, a digital camera that uses a reflex mirror, and a digital camera built in various electronic apparatuses, such as a smart device, a wearable terminal, and a cell observation device, an ophthalmology observation device, and a surgical microscope. In addition, the technology shown in the embodiments described above may be applied to an imaging apparatus comprising the image sensor 24 having sensitivity to light having a wavelength range other than a wavelength range of the near-infrared light.

In addition, in the embodiments described above, the form example is described in which the inclination information output processing program 230 is stored in the NVM 214 of the management device 200, but the inclination information output processing program 230 may be stored in a portable storage medium, such as an SSD or a USB memory, and the inclination information output processing program 230 need only be stored in a non-transitory storage medium. The inclination information output processing program 230 stored in the non-transitory storage medium is installed and used in the management device 200, for example.

In addition, in the embodiments described above, the form example is described in which the shake correction/shift processing program 110 is stored in the NVM 94 of the lens device 70, but the shake correction/shift processing program 110 may be stored in a portable storage medium, such as an SSD or a USB memory, and the shake correction/shift processing program 110 need only be stored in a non-transitory storage medium. The shake correction/shift processing program 110 stored in the non-transitory storage medium is installed and used in the lens device 70, for example.

In addition, in the embodiments described above, the aspect example is shown in which the controller 40 is built in the surveillance camera body 20, but the technology of the present disclosure is not limited to this, and for example, the controller 40 may be provided in the outside of the surveillance camera body 20.

In addition, in the embodiments described above, the aspect example is shown in which the controller 90 is built in the lens device 70, but the technology of the present disclosure is not limited to this, and for example, the controller 90 may be provided in the outside of the lens device 70.

In addition, in the embodiments described above, the CPU 42 of the surveillance camera body 20 is a single CPU, but may be a plurality of CPUs. In addition, a GPU may be applied instead of the CPU 42. Similarly, the CPU 92 of the lens device 70 is a single CPU, but may be a plurality of CPUs. In addition, a GPU may be applied instead of the CPU 92.

In addition, in the embodiments described above, the surveillance camera body 20 comprises the controller 40, but the technology of the present disclosure is not limited to this, and a device including an ASIC, an FPGA, and/or a PLD may be applied instead of the controller 40. In addition, a hardware configuration and a software configuration may be used in combination, instead of the controller 40.

In addition, in the embodiments described above, the lens device 70 comprises the controller 90, but the technology of the present disclosure is not limited to this, and a device including an ASIC, an FPGA, and/or a PLD may be applied instead of the controller 90. In addition, a hardware configuration and a software configuration may be used in combination, instead of the controller 90.

The following various processors can be used as a hardware resource for executing the inclination information output processing in the embodiments described above. Examples of the processor include a CPU which is a general-purpose processor functioning as the hardware resource for executing the inclination information output processing by executing software, that is, a program. Examples of the processor also include a dedicated electric circuit which is a processor having a circuit configuration specially designed for executing specific processing, such as an FPGA, a PLD, or an ASIC. A memory is also built in or connected to any processor, and any processor executes the inclination information output processing using the memory.

The hardware resource for executing the inclination information output processing may be configured by one of these various processors, or may be configured by a combination of two or more processors of the same type or different types (for example, a combination of a plurality of FPGAs or a combination of a CPU and an FPGA). Moreover, the hardware resource for executing the inclination information output processing may be one processor.

As an example of the configuration using one processor, first, there is a form in which one processor is configured by a combination of one or more CPUs and software, and the processor functions as the hardware resource for executing the inclination information output processing. Secondly, as represented by the SoC, there is a form in which a processor that realizes the functions of the entire system including a plurality of hardware resources for executing the inclination information output processing with one IC chip is used. In this way, the inclination information output processing is realized by using one or more of the various processors described above as the hardware resource.

Further, more specifically, an electric circuit in which circuit elements, such as semiconductor elements, are combined can be used as the hardware structure of these various processors.

Moreover, the inclination information output processing is merely an example. Accordingly, it is obvious that unnecessary steps may be deleted, new steps may be added, or the processing sequence may be changed within a range that does not deviate from the gist.

The contents described and shown so far are the detailed description of the parts according to the technology of the present disclosure, and are merely examples of the technology of the present disclosure. For example, the descriptions of the configurations, the functions, the actions, and the effects are the descriptions of examples of the configurations, the functions, the actions, and the effects of the parts according to the technology of the present disclosure. It is needless to say that unnecessary parts may be deleted, new elements may be added, or replacements may be made with respect to the contents described and shown so far within a range that does not deviate from the gist of the technology of the present disclosure. In addition, in order to avoid complications and facilitate understanding of the parts according to the technology of the present disclosure, in the contents described and shown so far, the descriptions of common technical knowledge and the like that do not particularly require the description for enabling carrying out of the technology of the present disclosure are omitted.

In the present specification, "A and/or B" is synonymous with "at least one of A or B". In other words, "A and/or B" means that it may be only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated into the present specification by reference to the same extent as in a case in which the individual documents, patent applications, and technical standards are specifically and individually stated to be described by reference.

What is claimed is:

1. A lens device mounted on an imaging apparatus body including an image sensor, the lens device comprising:

a processor;

a memory coupled to or integrated with the processor;

a lens that includes a movement lens and that images incident light on the image sensor; and a drive mechanism that moves the movement lens by applying power to the movement lens along each of a first drive axis intersecting an optical axis of the lens and a second drive axis intersecting each of the optical axis of the lens and the first drive axis, wherein the processor is configured to:

acquire inclination information related to at least one of an inclination of the first drive axis with respect to a first axis of the image sensor viewed along the optical axis or an inclination of the second drive axis with respect to a second axis of the image sensor viewed along the optical axis, and perform, with respect to the drive mechanism, control of moving the movement lens along at least one of the first axis or the second axis based on the inclination information.

2. The lens device according to claim 1, wherein the processor is configured to perform, with respect to the drive mechanism, control of moving the movement lens in a direction in which an image obtained by imaging the light on the image sensor is shifted.

3. The lens device according to claim 1, wherein the processor is configured to perform, with respect to the drive mechanism, control of moving the movement lens in a direction in which a shake of an image obtained by imaging the light on the image sensor is corrected.

4. The lens device according to claim 1, further comprising:

a communication interface that communicates with at least one of an external control device provided in an outside of an imaging apparatus including the imaging apparatus body and the lens device or the imaging apparatus body, wherein the processor is configured to acquire the inclination information that is transmitted from at least one of the external control device or the imaging apparatus body and received by the communication interface.

5. The lens device according to claim 1, further comprising:

a non-volatile memory, wherein the processor is configured to:

cause the acquired inclination information to be stored in the non-volatile memory, and perform, with respect to the drive mechanism, control of moving the movement lens based on the inclination information stored in the non-volatile memory.

6. The lens device according to claim 1, wherein the inclination information is information calculated based on a control command for moving the movement lens along at least one of the first drive axis or the second drive axis and a plurality of images obtained by being captured by the image sensor before and after the movement lens is moved based on the control command.

7. The lens device according to claim 1, wherein the inclination information is information calculated based on a plurality of images obtained by performing imaging by the image sensor under an imaging condition in which an image having less noise than an image obtained by normal imaging is obtained.

8. The lens device according to claim 1, wherein the inclination information is information calculated based on a plurality of images obtained by performing imaging by the image sensor to which a sensitivity lower than a sensitivity of the image sensor that performs normal imaging is applied.

9. The lens device according to claim 1, wherein the inclination information is information related to at least one of a first inclination angle of the first drive axis with respect to the first axis viewed along the optical axis or a second inclination angle of the second drive axis with respect to the second axis viewed along the optical axis.

10. The lens device according to claim 9, wherein the processor is configured to:

calculate a first movement amount for moving the movement lens along the first drive axis and a second movement amount for moving the movement lens along the second drive axis based on the inclination information, and perform, with respect to the drive mechanism, control of moving the movement lens along the first drive axis by the first movement amount and moving the movement lens along the second drive axis by the second movement amount.

11. The lens device according to claim 1, wherein the inclination information includes a first movement amount for moving the movement lens along the first drive axis and a second movement amount for moving the movement lens along the second drive axis, and the first movement amount and the second movement amount are movement amounts calculated based on at least one of the inclination of the first drive axis with respect to the first axis viewed along the optical axis or the inclination of the second drive axis with respect to the second axis viewed along the optical axis.

12. The lens device according to claim 1, further comprising:

a non-volatile memory, wherein the processor is configured to cause the non-volatile memory to store association information in which first registration information related to the imaging apparatus body, second registration information related to the lens device, and the inclination information are associated with each other.

13. The lens device according to claim 12, wherein the processor is configured to:

acquire first identification information related to the imaging apparatus body on which the lens device is mounted, second identification information related to the lens device, and the association information, and extract the inclination information from the association information in a case in which the first registration information and the first identification information are matched, and the second registration information and the second identification information are matched.

14. The lens device according to claim 13, wherein the processor performs processing that contributes to update of the inclination information in a case in which the first registration information and the first identification information are different from each other or in a case in which the second registration information and the second identification information are different from each other.

15. The lens device according to claim 13, wherein the processor performs control of giving a notification in a case in which the first registration information and the first identification information are different from each other or in a case in which the second registration information and the second identification information are different from each other.

16. The lens device according to claim 1, wherein the processor is configured to:

acquire image height position designation information for designating an image height position indicating a height position of a center of an image obtained by imaging the light on the image sensor on a light-receiving surface of the image sensor, image shift amount designation information for designating a shift amount for shifting the image, and the inclination information, and perform, with respect to the drive mechanism, control of moving the movement lens by a movement amount in which the shift amount is obtained at the image height position based on the image height position designation information, the image shift amount designation information, and the inclination information.

17. The lens device according to claim 1, further comprising:

an optical filter that is disposed on a subject side with respect to the image sensor and transmits near-infrared light included in the light.

18. An imaging apparatus comprising:

an imaging apparatus body including an image sensor; and a lens device mounted on the imaging apparatus body, wherein the lens device includes:

a processor, a memory coupled to or integrated with the processor, a lens that includes a movement lens and that images incident light on the image sensor, and a drive mechanism that moves the movement lens by applying power to the movement lens along each of a first drive axis intersecting an optical axis of the lens and a second drive axis intersecting each of the optical axis of the lens and the first drive axis, and wherein the processor is configured to:

acquire inclination information related to at least one of an inclination of the first drive axis with respect to a first axis of the image sensor viewed along the optical axis or an inclination of the second drive axis with respect to a second axis of the image sensor viewed along the optical axis, and perform, with respect to the drive mechanism, control of moving the movement lens along at least one of the first axis or the second axis based on the inclination information.

19. The imaging apparatus according to claim 18, wherein the processor is configured to:

perform, with respect to the drive mechanism, control of moving the movement lens to a position at which an image obtained by imaging the light on the image sensor is shifted at a pitch equal to or larger than a pixel pitch of the image sensor or a pitch smaller than the pixel pitch of the image sensor, cause the image sensor to perform imaging according to the shift of the image, and combine images of a plurality of frames obtained by the imaging.

20. An operation method for a lens device that is mounted on an imaging apparatus body and that includes a lens that includes a movement lens and images incident light on an image sensor of the imaging apparatus body, and a drive mechanism that moves the movement lens by applying power to the movement lens along each of a first drive axis intersecting an optical axis of the lens and a second drive axis intersecting each of the optical axis of the lens and the first drive axis, the operation method comprising:

acquiring inclination information related to at least one of an inclination of the first drive axis with respect to a first axis of the image sensor viewed along the optical axis or an inclination of the second drive axis with respect to a second axis of the image sensor viewed along the optical axis; and performing, with respect to the drive mechanism, control of moving the movement lens along at least one of the first axis or the second axis based on the inclination information.

21. An operation method for an imaging apparatus including an imaging apparatus body including an image sensor, and a lens device mounted on the imaging apparatus body, in which the lens device includes a lens that includes a movement lens and that images incident light on the image sensor, and a drive mechanism that moves the movement lens by applying power to the movement lens along each of a first drive axis intersecting an optical axis of the lens and a second drive axis intersecting each of the optical axis of the lens and the first drive axis, the operation method comprising:

acquiring inclination information related to at least one of an inclination of the first drive axis with respect to a first axis of the image sensor viewed along the optical axis or an inclination of the second drive axis with respect to a second axis of the image sensor viewed along the optical axis; and performing, with respect to the drive mechanism, control of moving the movement lens along at least one of the first axis or the second axis based on the inclination information.

22. A non-transitory computer-readable storage medium storing a program causing a computer to perform a process, wherein the computer is applied to a lens device that is mounted on an imaging apparatus body and includes a lens that includes a movement lens and images incident light on an image sensor of the imaging apparatus body, and a drive mechanism that moves the movement lens by applying power to the movement lens along each of a first drive axis intersecting an optical axis of the lens and a second drive axis intersecting each of the optical axis of the lens and the first drive axis, the program being executable by the computer to perform the process comprising:

acquiring inclination information related to at least one of an inclination of the first drive axis with respect to a first axis of the image sensor viewed along the optical axis or an inclination of the second drive axis with respect to a second axis of the image sensor viewed along the optical axis; and performing, with respect to the drive mechanism, control of moving the movement lens along at least one of the first axis or the second axis based on the inclination information.

23. A non-transitory computer-readable storage medium storing a program causing a computer to perform a process, wherein the computer is applied to an imaging apparatus including an imaging apparatus body including an image sensor, and a lens device mounted on the imaging apparatus body, in which the lens device includes a lens that includes a movement lens and images incident light on the image sensor, and a drive mechanism that moves the movement lens by applying power to the movement lens along each of a first drive axis intersecting an optical axis of the lens and a second drive axis intersecting each of the optical axis of the lens and the first drive axis, the program being executable by the computer to perform the process comprising:

acquiring inclination information related to at least one of an inclination of the first drive axis with respect to a first axis of the image sensor viewed along the optical axis or an inclination of the second drive axis with respect to a second axis of the image sensor viewed along the optical axis; and performing, with respect to the drive mechanism, control of moving the movement lens along at least one of the first axis or the second axis based on the inclination information.

* * * * *